US012761716B2

(12) United States Patent
Cline, Jr. et al.

(10) Patent No.: US 12,761,716 B2
(45) Date of Patent: Oct. 13, 2026

(54) DYNAMIC UPDATING OF A POWER AVAILABLE LEVEL FOR A DATACENTER

(71) Applicant: LANCIUM LLC, Houston, TX (US)

(72) Inventors: Raymond E. Cline, Jr., Houston, TX (US); Vitor De Miranda Henrique, Houston, TX (US)

(73) Assignee: Lancium LLC, Houston, TX (US)

( * ) Notice: Subject to any disclaimer, the term of this patent is extended or adjusted under 35 U.S.C. 154(b) by 307 days.

(21) Appl. No.: 18/199,259

(22) Filed: May 18, 2023

(65) Prior Publication Data

US 2023/0384852 A1 Nov. 30, 2023

Related U.S. Application Data

(60) Provisional application No. 63/345,626, filed on May 25, 2022.

(51) Int. Cl.
*G06F 1/3206* (2019.01)
*G06F 1/26* (2006.01)
(Continued)

(52) U.S. Cl.
CPC ........ *G06F 1/3206* (2013.01); *G06F 11/3062* (2013.01); *G06F 1/26* (2013.01); *G06F 1/3203* (2013.01)

(58) Field of Classification Search
CPC ........ G06F 1/3206; G06F 1/3203; G06F 1/26; G06F 11/3062
(Continued)

(56) References Cited

U.S. PATENT DOCUMENTS

| | | | |
|---|---|---|---|
| 4,106,097 | A | 8/1978 | Fox et al. |
| 4,245,319 | A | 1/1981 | Hedges |

(Continued)

FOREIGN PATENT DOCUMENTS

| | | | |
|---|---|---|---|
| CN | 101803148 | A | 8/2010 |
| CN | 102185382 | A | 9/2011 |

(Continued)

OTHER PUBLICATIONS

Non-Final Office Action mailed on Dec. 20, 2022 for U.S. Appl. No. 17/513,558 (Year: 2022).*

(Continued)

*Primary Examiner* — Ji H Bae
(74) *Attorney, Agent, or Firm* — Barnes & Thornburg

(57) ABSTRACT

A method of dynamically updating a reported maximum power consumption for a site is provided. The method includes determining an initial MPC for the site based at least in part on a power consumption of the plurality of computing systems each operating at full power at a respective steady state temperature and reporting the initial MPC. The method further incudes operating the plurality of computing systems at full power at the steady state temperature and then actively reducing power consumption of one or more computing systems of the plurality of computing systems. The method includes determining a reduced MPC based at least in part on the reduced power consumption of the one or more computing systems and reporting the reduced MPC and then actively increasing power consumption of the one or more computing systems. An intermediate MPC is determined, and then a new steady-state MPC is determined and reported.

12 Claims, 12 Drawing Sheets

(51) Int. Cl.
*G06F 1/3203* (2019.01)
*G06F 11/30* (2006.01)
(58) Field of Classification Search
USPC .................................................. 713/300, 320
See application file for complete search history.

(56) References Cited

U.S. PATENT DOCUMENTS

| | | | |
|---|---|---|---|
| 4,247,786 | A | 1/1981 | Hedges |
| 4,371,779 | A | 2/1983 | Maynard et al. |
| 4,551,812 | A | 11/1985 | Gurr et al. |
| 5,142,672 | A | 8/1992 | Johnson et al. |
| 5,367,669 | A | 11/1994 | Holland et al. |
| 5,544,046 | A | 8/1996 | Niwa |
| 5,761,083 | A | 6/1998 | Brown, Jr. et al. |
| 5,913,046 | A | 6/1999 | Barth et al. |
| 6,115,698 | A | 9/2000 | Tuck et al. |
| 6,244,516 | B1 | 6/2001 | Langervik et al. |
| 6,288,456 | B1 | 9/2001 | Cratty |
| 6,437,692 | B1 | 8/2002 | Petite et al. |
| 6,473,744 | B1 | 10/2002 | Tuck et al. |
| 6,519,509 | B1 | 2/2003 | Nierlich et al. |
| 6,618,709 | B1 | 9/2003 | Sneeringer |
| 6,633,823 | B2 | 10/2003 | Bartone et al. |
| 6,643,567 | B2 | 11/2003 | Kolk et al. |
| 6,681,154 | B2 | 1/2004 | Nierlich et al. |
| 6,745,105 | B1 | 6/2004 | Fairlie et al. |
| 6,748,932 | B1 | 6/2004 | Sorter et al. |
| 6,772,013 | B1 | 8/2004 | Ingle et al. |
| 6,775,595 | B1 | 8/2004 | Yabutani et al. |
| 6,785,592 | B1 | 8/2004 | Smith et al. |
| 6,868,293 | B1 | 3/2005 | Schurr et al. |
| 6,912,450 | B2 | 6/2005 | Fairlie et al. |
| 7,010,363 | B2 | 3/2006 | Donnelly et al. |
| 7,027,992 | B2 | 4/2006 | Zaccaria et al. |
| 7,035,179 | B2 | 4/2006 | Chen et al. |
| 7,053,767 | B2 | 5/2006 | Petite et al. |
| 7,054,271 | B2 | 5/2006 | Brownrigg et al. |
| 7,062,360 | B2 | 6/2006 | Fairlie et al. |
| 7,076,339 | B2 | 7/2006 | Yabutani et al. |
| 7,088,014 | B2 | 8/2006 | Nierlich et al. |
| 7,127,328 | B2 | 10/2006 | Ransom |
| 7,130,832 | B2 | 10/2006 | Bannai et al. |
| 7,135,956 | B2 | 11/2006 | Bartone et al. |
| 7,143,300 | B2 | 11/2006 | Potter et al. |
| 7,149,605 | B2 | 12/2006 | Chassin et al. |
| 7,181,316 | B2 | 2/2007 | Fairlie et al. |
| 7,188,003 | B2 | 3/2007 | Ransom et al. |
| 7,206,670 | B2 | 4/2007 | Pimputkar et al. |
| 7,278,273 | B1 | 10/2007 | Whitted et al. |
| 7,305,282 | B2 | 12/2007 | Chen |
| 7,333,880 | B2 | 2/2008 | Brewster et al. |
| 7,369,968 | B2 | 5/2008 | Johnson et al. |
| 7,376,851 | B2 | 5/2008 | Kim |
| 7,420,293 | B2 | 9/2008 | Donnelly et al. |
| 7,460,930 | B1 | 12/2008 | Howell et al. |
| 7,468,661 | B2 | 12/2008 | Petite et al. |
| 7,519,453 | B2 | 4/2009 | Fairlie et al. |
| 7,561,977 | B2 | 7/2009 | Horst et al. |
| 7,565,224 | B2 | 7/2009 | Fairlie et al. |
| 7,647,516 | B2 | 1/2010 | Ranganathan et al. |
| 7,702,931 | B2 | 4/2010 | Goodrum et al. |
| 7,779,276 | B2 | 8/2010 | Bolan et al. |
| 7,783,907 | B2 | 8/2010 | Dubinsky |
| 7,861,102 | B1 | 12/2010 | Ranganathan et al. |
| 7,921,315 | B2 | 4/2011 | Langgood et al. |
| 7,970,561 | B2 | 6/2011 | Pfeiffer |
| 8,001,403 | B2 | 8/2011 | Hamilton et al. |
| 8,006,108 | B2 | 8/2011 | Brey et al. |
| 8,080,900 | B2 | 12/2011 | Corhodzic et al. |
| 8,214,843 | B2 | 7/2012 | Boss et al. |
| 8,260,913 | B2 | 9/2012 | Knapp et al. |
| 8,327,123 | B2 | 12/2012 | Juffa et al. |
| 8,374,928 | B2 | 2/2013 | Gopisetty et al. |
| 8,447,993 | B2 | 5/2013 | Greene et al. |
| 8,571,820 | B2 | 10/2013 | Pfeiffer |
| 8,595,094 | B1 | 11/2013 | Forbes, Jr. |
| 8,595,515 | B1 | 11/2013 | Weber et al. |
| 8,601,287 | B1 | 12/2013 | Weber et al. |
| 8,627,123 | B2 | 1/2014 | Jain et al. |
| 8,639,392 | B2 | 1/2014 | Chassin |
| 8,700,929 | B1 | 4/2014 | Weber et al. |
| 8,706,914 | B2 | 4/2014 | Duchesneau |
| 8,706,915 | B2 | 4/2014 | Duchesneau |
| 8,719,223 | B2 | 5/2014 | Knapp et al. |
| 8,789,061 | B2 | 7/2014 | Pavel et al. |
| 8,799,690 | B2 | 8/2014 | Dawson et al. |
| 8,839,551 | B2 | 9/2014 | Swann |
| 8,849,469 | B2 | 9/2014 | Belady et al. |
| 9,003,211 | B2 | 4/2015 | Pfeiffer |
| 9,003,216 | B2 | 4/2015 | Sankar et al. |
| 9,026,814 | B2 | 5/2015 | Aasheim et al. |
| 9,027,024 | B2 | 5/2015 | Mick et al. |
| 9,143,392 | B2 | 9/2015 | Duchesneau |
| 9,207,993 | B2 | 12/2015 | Jain |
| 9,218,035 | B2 | 12/2015 | Li et al. |
| 9,252,598 | B2 | 2/2016 | Belady et al. |
| 9,282,022 | B2 | 3/2016 | Matthews et al. |
| 9,416,904 | B2 | 8/2016 | Belady et al. |
| 9,477,279 | B1 | 10/2016 | Piszczek et al. |
| 9,542,231 | B2 | 1/2017 | Khan et al. |
| 9,552,234 | B2 | 1/2017 | Boldyrev et al. |
| 9,557,792 | B1 | 1/2017 | Potlapally et al. |
| 9,563,216 | B1 * | 2/2017 | Barroso .................... G05F 1/66 |
| 9,618,991 | B1 | 4/2017 | Clidaras et al. |
| 9,645,596 | B1 | 5/2017 | Lee et al. |
| 9,800,052 | B2 | 10/2017 | Li et al. |
| 9,946,815 | B1 | 4/2018 | Weber et al. |
| 9,994,118 | B2 | 6/2018 | Williams et al. |
| 10,033,210 | B2 | 7/2018 | Peterson et al. |
| 10,250,039 | B2 | 4/2019 | Wenzel et al. |
| 10,340,696 | B2 | 7/2019 | Paine et al. |
| 10,360,077 | B2 | 7/2019 | Mahindru et al. |
| 10,367,335 | B2 | 7/2019 | Kawashima et al. |
| 10,367,353 | B1 | 7/2019 | McNamara et al. |
| 10,367,535 | B2 | 7/2019 | Corse et al. |
| 10,444,818 | B1 | 10/2019 | McNamara et al. |
| 10,452,127 | B1 | 10/2019 | McNamara et al. |
| 10,452,532 | B2 | 10/2019 | McVay et al. |
| 10,497,072 | B2 | 12/2019 | Hooshmand et al. |
| 10,545,560 | B2 | 1/2020 | Mahindru et al. |
| 10,608,433 | B1 | 3/2020 | McNamara et al. |
| 10,618,427 | B1 | 4/2020 | McNamara et al. |
| 10,637,353 | B2 | 4/2020 | Ohyama et al. |
| 10,709,076 | B2 | 7/2020 | Pham |
| 10,795,428 | B2 | 10/2020 | Walsh |
| 10,819,599 | B2 | 10/2020 | Mahindru et al. |
| 10,822,992 | B2 | 11/2020 | Spears |
| 10,838,482 | B2 | 11/2020 | Mahindru et al. |
| 10,857,899 | B1 | 12/2020 | McNamara et al. |
| 10,862,307 | B2 | 12/2020 | Cavness et al. |
| 10,862,309 | B2 | 12/2020 | Cavness et al. |
| 10,873,211 | B2 | 12/2020 | McNamara et al. |
| 10,931,117 | B2 | 2/2021 | Shoemaker |
| 11,016,456 | B2 | 5/2021 | Henson et al. |
| 11,016,458 | B2 | 5/2021 | McNamara et al. |
| 11,016,553 | B2 | 5/2021 | McNamara et al. |
| 11,025,060 | B2 | 6/2021 | McNamara et al. |
| 11,031,787 | B2 | 6/2021 | McNamara et al. |
| 11,031,813 | B2 | 6/2021 | McNamara et al. |
| 11,042,948 | B1 | 6/2021 | McNamara et al. |
| 11,128,165 | B2 | 9/2021 | McNamara et al. |
| 11,163,280 | B2 | 11/2021 | Henson et al. |
| 11,169,592 | B2 | 11/2021 | Mahindru et al. |
| 11,194,150 | B2 | 12/2021 | Baba |
| 11,256,320 | B2 | 2/2022 | McNamara et al. |
| 11,275,427 | B2 | 3/2022 | McNamara et al. |
| 11,283,261 | B2 | 3/2022 | McNamara et al. |
| 11,342,746 | B2 | 5/2022 | McNamara et al. |
| 11,397,999 | B2 | 7/2022 | McNamara et al. |
| 11,418,037 | B2 | 8/2022 | Cavness et al. |
| 11,431,195 | B2 | 8/2022 | McNamara et al. |
| 11,451,059 | B2 | 9/2022 | Cavness et al. |
| 11,537,183 | B2 | 12/2022 | Lewis et al. |

(56) References Cited

U.S. PATENT DOCUMENTS 11,669,144 B2 6/2023 Mcnamara et al.
11,669,920 B2 6/2023 McNamara et al.
11,682,902 B2 6/2023 McNamara et al.
2002/0072868 A1 6/2002 Bartone et al.
2002/0158749 A1 10/2002 Ikeda et al.
2002/0196124 A1 12/2002 Howard et al.
2003/0037150 A1 2/2003 Nakagawa
2003/0074464 A1 4/2003 Bohrer et al.
2003/0171851 A1 9/2003 Brickfield et al.
2004/0027004 A1 2/2004 Bayoumi et al.
2004/0117330 A1 6/2004 Ehlers et al.
2005/0005528 A1 1/2005 Brault et al.
2005/0034128 A1 2/2005 Nagashima et al.
2005/0102539 A1 5/2005 Hepner et al.
2005/0154499 A1 7/2005 Aldridge et al.
2005/0165512 A1 7/2005 Peljto
2005/0203761 A1 9/2005 Barr et al.
2006/0031180 A1 2/2006 Tamarkin et al.
2006/0059772 A1 3/2006 Brault et al.
2006/0161765 A1 7/2006 Cromer et al.
2006/0253675 A1 11/2006 Johannes Bloks
2007/0228837 A1 10/2007 Nielsen et al.
2008/0000151 A1 1/2008 Houweling et al.
2008/0013596 A1 1/2008 Dunne et al.
2008/0030078 A1 2/2008 Whitted et al.
2008/0082844 A1 4/2008 Ghiasi et al.
2008/0094797 A1 4/2008 Coglitore et al.
2008/0238195 A1 10/2008 Shaver et al.
2008/0263373 A1* 10/2008 Meier .................. G06F 9/3885 713/300
2008/0288193 A1* 11/2008 Claassen ............ H05K 7/20836 702/61
2009/0012523 A1 1/2009 Ruuttu et al.
2009/0055665 A1 2/2009 Maglione et al.
2009/0070611 A1 3/2009 Bower, III et al.
2009/0078401 A1 3/2009 Cichanowicz
2009/0089595 A1 4/2009 Brey et al.
2009/0144566 A1 6/2009 Bletsch et al.
2009/0254660 A1 10/2009 Hanson et al.
2010/0088261 A1 4/2010 Montalvo
2010/0145542 A1 6/2010 Chapel et al.
2010/0211810 A1 8/2010 Zacho
2010/0235004 A1 9/2010 Thind
2010/0280675 A1 11/2010 Tate, Jr. et al.
2010/0313203 A1 12/2010 Dawson et al.
2010/0328849 A1 12/2010 Ewing et al.
2010/0333113 A1 12/2010 Johnson et al.
2011/0072289 A1 3/2011 Kato
2011/0144818 A1* 6/2011 Li ............................ G06F 1/26 700/291
2011/0239015 A1 9/2011 Boyd et al.
2011/0282982 A1 11/2011 Jain
2011/0316337 A1 12/2011 Pelio et al.
2012/0032665 A1 2/2012 Shaver, II et al.
2012/0072745 A1 3/2012 Ahluwalia et al.
2012/0078430 A1 3/2012 Fan et al.
2012/0109705 A1 5/2012 Belady et al.
2012/0150679 A1 6/2012 Lazaris
2012/0290865 A1 11/2012 Kansal et al.
2012/0300524 A1 11/2012 Fornage et al.
2012/0306271 A1 12/2012 Kuriyama
2012/0321309 A1 12/2012 Barry et al.
2012/0324245 A1 12/2012 Sinha et al.
2012/0324259 A1 12/2012 Aasheim et al.
2012/0326511 A1 12/2012 Johnson
2013/0006401 A1 1/2013 Shan
2013/0007515 A1 1/2013 Shaw et al.
2013/0030734 A1* 1/2013 Ware ...................... G01R 19/00 702/62
2013/0054987 A1 2/2013 Pfeiffer et al.
2013/0063991 A1 3/2013 Xiao et al.
2013/0111494 A1 5/2013 Hyser et al.
2013/0117621 A1 5/2013 Saraiya et al.
2013/0187464 A1 7/2013 Smith et al.
2013/0213038 A1 8/2013 Lazaris
2013/0227139 A1 8/2013 Suffling
2013/0304903 A1 11/2013 Mick et al.
2013/0306276 A1 11/2013 Duchesneau
2013/0328395 A1 12/2013 Krizman et al.
2014/0070756 A1 3/2014 Kearns et al.
2014/0114829 A1 4/2014 Forbes, Jr.
2014/0137468 A1 5/2014 Ching
2014/0149761 A1 5/2014 Allen-Ware et al.
2014/0150336 A1 6/2014 Houweling
2014/0180886 A1 6/2014 Forbes, Jr.
2014/0191579 A1 7/2014 Szu
2014/0222225 A1 8/2014 Rouse et al.
2014/0365402 A1 12/2014 Belady et al.
2014/0365795 A1 12/2014 Nielsen et al.
2014/0379156 A1 12/2014 Kamel et al.
2015/0006940 A1 1/2015 Kim et al.
2015/0012113 A1 1/2015 Celebi
2015/0058845 A1 2/2015 Song et al.
2015/0106811 A1 4/2015 Holler et al.
2015/0121113 A1 4/2015 Ramamurthy et al.
2015/0155712 A1 6/2015 Mondal
2015/0212122 A1 7/2015 Sobotka et al.
2015/0229227 A1 8/2015 Aeloiza et al.
2015/0277410 A1 10/2015 Gupta et al.
2015/0278968 A1 10/2015 Steven et al.
2015/0278969 A1 10/2015 Benoy et al.
2015/0280492 A1 10/2015 Narita
2015/0288183 A1 10/2015 Villanueva, Jr. et al.
2015/0363132 A1 12/2015 Uehara
2015/0363515 A1* 12/2015 Singh ...................... G06F 30/13 703/1
2015/0372538 A1 12/2015 Siegler et al.
2016/0006066 A1 1/2016 Robertson
2016/0011617 A1 1/2016 Liu et al.
2016/0043552 A1 2/2016 Villanueva, Jr. et al.
2016/0054774 A1 2/2016 Song et al.
2016/0087909 A1 3/2016 Chatterjee et al.
2016/0091948 A1 3/2016 Mitchell et al.
2016/0109916 A1 4/2016 Li et al.
2016/0126783 A1 5/2016 Cheng et al.
2016/0170469 A1 6/2016 Sehgal et al.
2016/0172900 A1 6/2016 Welch, Jr.
2016/0187906 A1 6/2016 Bodas et al.
2016/0198656 A1 7/2016 Mcnamara et al.
2016/0202744 A1 7/2016 Castro-Leon
2016/0212954 A1 7/2016 Argento
2016/0248631 A1 8/2016 Duchesneau
2016/0261226 A1 9/2016 Hamilton et al.
2016/0324077 A1 11/2016 Frantzen et al.
2016/0377306 A1 12/2016 Drees et al.
2017/0023969 A1 1/2017 Shows et al.
2017/0104336 A1 4/2017 Elbsat et al.
2017/0104337 A1 4/2017 Drees
2017/0104342 A1 4/2017 Eibsat et al.
2017/0104343 A1 4/2017 Eibsat et al.
2017/0185132 A1 6/2017 Bodas et al.
2017/0192483 A1 7/2017 Boss et al.
2017/0194791 A1 7/2017 Budde
2017/0201098 A1 7/2017 Carpenter
2017/0214070 A1 7/2017 Wang et al.
2017/0237261 A1 8/2017 Maug et al.
2017/0261949 A1 9/2017 Hoffmann et al.
2017/0300359 A1 10/2017 Kollur et al.
2017/0366412 A1 12/2017 Piga
2017/0373500 A1 12/2017 Shafi et al.
2018/0026478 A1 1/2018 Peloso
2018/0052431 A1 2/2018 Shaikh et al.
2018/0060106 A1 3/2018 Madtha et al.
2018/0101220 A1 4/2018 Mahindru et al.
2018/0116070 A1 4/2018 Broadbent et al.
2018/0144414 A1 5/2018 Lee et al.
2018/0175666 A1 6/2018 Ayer et al.
2018/0202825 A1 7/2018 You et al.
2018/0240112 A1 8/2018 Castinado et al.
2018/0267839 A1 9/2018 Maisuria et al.
2018/0294649 A1 10/2018 Bright et al.
2018/0366978 A1 12/2018 Matan et al.
2018/0367320 A1 12/2018 Montalvo
2019/0005576 A1 1/2019 Mick et al.

(56) References Cited

U.S. PATENT DOCUMENTS

| | | | |
|---|---|---|---|
| 2019/0052094 | A1 | 2/2019 | Pmsvvsv et al. |
| 2019/0082618 | A1 | 3/2019 | Lopez |
| 2019/0168630 | A1 | 6/2019 | Mrlik et al. |
| 2019/0173283 | A1 | 6/2019 | Epel et al. |
| 2019/0258307 | A1 | 8/2019 | Shaikh et al. |
| 2019/0280521 | A1 | 9/2019 | Lundstrom et al. |
| 2019/0318327 | A1 | 10/2019 | Sowell et al. |
| 2019/0324820 | A1 | 10/2019 | Krishnan et al. |
| 2019/0339756 | A1 | 11/2019 | Lewis et al. |
| 2020/0051184 | A1 | 2/2020 | Barbour |
| 2020/0167197 | A1 | 5/2020 | Bahramshahry et al. |
| 2020/0177100 | A1 | 6/2020 | Wang et al. |
| 2020/0318843 | A1 | 10/2020 | Wenzel et al. |
| 2020/0321776 | A1 | 10/2020 | Shaver, II et al. |
| 2021/0021135 | A1 | 1/2021 | Eibsat et al. |
| 2021/0036547 | A1 | 2/2021 | McNamara et al. |
| 2021/0101499 | A1 | 4/2021 | Mcnamara et al. |
| 2021/0126456 | A1 | 4/2021 | McNamara et al. |
| 2021/0175710 | A1 | 6/2021 | Campbell et al. |
| 2021/0287309 | A1 | 9/2021 | Gebhardt et al. |
| 2021/0294405 | A1 | 9/2021 | McNamara et al. |
| 2021/0296893 | A1 | 9/2021 | Mcnamara et al. |
| 2021/0296928 | A1 | 9/2021 | Mcnamara et al. |
| 2021/0298195 | A1 | 9/2021 | Barbour |
| 2022/0033517 | A1 | 2/2022 | Hendry et al. |
| 2022/0039333 | A1 | 2/2022 | Avila |
| 2022/0366517 | A1 | 11/2022 | McNamara et al. |
| 2022/0407350 | A1 | 12/2022 | McNamara et al. |

FOREIGN PATENT DOCUMENTS

| | | | |
|---|---|---|---|
| CN | 102591921 | A | 7/2012 |
| CN | 103163904 | A | 6/2013 |
| CN | 103440028 | A | 12/2013 |
| CN | 103748757 | A | 4/2014 |
| CN | 104144183 | A | 11/2014 |
| CN | 104715340 | A | 6/2015 |
| CN | 104969434 | A | 10/2015 |
| CN | 106226718 | A | 12/2016 |
| CN | 107967536 | A | 4/2018 |
| EP | 3850462 | A1 | 7/2021 |
| JP | 2011123873 | A | 6/2011 |
| JP | 2013524317 | A | 6/2013 |
| JP | 2017530449 | A | 10/2017 |
| KR | 20090012523 | A | 2/2009 |
| WO | WO-2008039773 | A2 | 4/2008 |
| WO | WO-2010050249 | A1 | 5/2010 |
| WO | WO-2014005156 | A2 | 1/2014 |
| WO | WO-2015039122 | A1 | 3/2015 |
| WO | WO-2015199629 | A1 | 12/2015 |
| WO | WO-2017163126 | A1 | 9/2017 |
| WO | WO-2018068042 | A1 | 4/2018 |
| WO | WO-2019060180 | A2 | 3/2019 |
| WO | WO-2019116375 | A1 | 6/2019 |
| WO | WO-2019139632 | A1 | 7/2019 |
| WO | WO-2019139633 | A1 | 7/2019 |
| WO | WO-2020056322 | A1 | 3/2020 |
| WO | WO-2020227811 | A1 | 11/2020 |
| WO | WO-2022031836 | A1 | 2/2022 |

OTHER PUBLICATIONS

Notice of Allowance for U.S. Appl. No. 17/896,376, filed Aug. 26, 2022, mailed on Sep. 10, 2024 (Year: 2024).*
Notice of Allowance for U.S. Appl. No. 18/403,905, filed Jan. 4, 2024, mailed on Apr. 13, 2026 (Year: 2026).*
Abhyankar et al., "Using PETSc to Develop Scalable Applications for Next-Generation Power Grid," High Performance Computing, Networking and Analytics for the Power Grid, Nov. 2011 pp. 67-74 https://doi.org/10.1145/2096123.2096138.
Advisory Action mailed on Nov. 13, 2020 for U.S. Appl. No. 16/529,360, filed Aug. 1, 2019, 182 pages.
Advisory Action mailed on Mar. 22, 2023 for U.S. Appl. No. 17/101,784, filed Nov. 23, 2020, 3 pages.
Advisory Action mailed on Oct. 22, 2020 for U.S. Appl. No. 16/528,348, filed Jul. 31, 2019, 3 pages.
Bakar et al., "Microgrid and Load Shedding Scheme During Islanded Mode: a Review," Elsevier, May 26, 2020, vol. 71, pp. 161-169. https://www.sciencedirect.com/science/article/pii/S1364032116311030.
Bird et al., "Wind and Solar Energy Curtailment: Experience and Practices in the United States," National Renewable Energy Lab (NREL), Technical Report NREL/TP-6A20-60983, Mar. 2014, 58 pages.
Chen et al., "Power Trading Model for Distributed Power Generation Systems Based on Consortium Blockchains," Proceedings of the 12th Asia-Pacific Symposium on Internetware, Jul. 2021, pp. 91-98. https://doi.org/10.1145/3457913.3457929.
Choi et al., "Optimal Load Shedding for Maximizing Satisfaction in an Islanded Microgrid," Energies, 2017, vol. 10, pp. 45. doi: 10.3390/en10010045.
EPEX Spot, "How They Occur, What They Mean," 2018, 2 pages. Retrieved from Internet:[URL: https://www.epexspot.com/en/company-info/basics_of_the_power_market/negative_prices ].
ERCOT, Business Procedures, Load Resource Qualification, Initial Qualification and Periodic Testing, Controllable Load Qualification Test Procedure for Ancillary Services (Jun. 1, 2014).
ERCOT, Business Procedures, Load Resource Qualification, Non-Controllable Load Resource Qualification and Testing Procedure, V1.1 (Apr. 1, 2011).
ERCOT, Controllable Load Resource (CLR) Participation in the ERCOT Market (Dec. 20, 2007).
ERCOT, Emergency Response Service Technical Requirements & Scope of Work, Oct. 1, 2018 through Jan. 31, 2019.
ERCOT, ERS QSE Training 101, Updated Apr. 6, 2022.
ERCOT, Large Flexible Load Resource Participation in the ERCOT Region, presentation to Large Flexible Load Task Force (Apr. 26, 2022).
ERCOT, Load Resource Participation in the ERCOT Region, presentation (Sep. 27, 2022).
ERCOT, Nodal Protocols (Oct. 18, 2019)—Applicant particularly notes the following pp. 2-4, 2-5, 2-15, 2-17, 2-24 to 26, 2-28, 2-29, 2-38, 2-41, 2-51, 2-52, 2-58, 2-62 to 63, 2-67, 2-69, 3-77 to 80, 3-176 to 3-186, 3-208 to 213, 3-214 to 216, 4-1 to 4, 4-10, 4-20, 4-25 to 27, 4-59 to 62, 4-64 to 67, 6-100 to 116, 8-1 to 58.
European Patent Application No. 19878191.6, Extended European Search Report dated Jul. 4, 2022.
European Patent Application No. 18900411.2, Extended European Search Report dated Dec. 13, 2021.
European Patent Application No. 19858739.6, Extended European Search Report dated May 31, 2022.
European Patent Application No. 19858812.1, Extended European Search Report dated May 2, 2022.
European Patent Application No. 19861222.8, Extended European Search Report dated May 2, 2022.
European Patent Application No. 19861223.6, Extended European Search Report dated Apr. 19, 2022.
European Patent Application No. 19877576.9, Extended European Search Report dated Jun. 3, 2022.
European Patent Application No. 20738289.6, Extended European Search Report dated Aug. 8, 2022.
European Patent Application No. 22157111.0, Extended European Search Report dated Aug. 17, 2022.
European Patent Application No. EP18900411.2, Partial Supplementary European Search Report dated Sep. 9, 2021.
Examination Report mailed Jan. 17, 2023 for EP Application No. EP19858812.1 filed on Mar. 25, 2021.
Examination Report mailed Dec. 9, 2022 for EP Application No. EP2019086122.3 filed on Sep. 13, 2019.
Final Office Action mailed Jul. 23, 2020 on for U.S. Appl. No. 16/132,062, filed Sep. 14, 2018, 26 pages.
Final Office Action mailed on May 19, 2020 for U.S. Appl. No. 16/809,111, filed Mar. 4, 2020, 36 pages.
Final Office Action mailed on Jun. 3, 2020 for U.S. Appl. No. 16/528,348, filed Jul. 31, 2019, 33 pages.

(56) References Cited

OTHER PUBLICATIONS

Final Office Action mailed on May 28, 2020 for U.S. Appl. No. 16/132,098, filed Sep. 14, 2018, 24 pages.
Final Office Action mailed Jan. 6, 2022 on for U.S. Appl. No. 16/529,360, filed Aug. 1, 2019, 40 pages.
Final Office Action mailed Aug. 9, 2021 on for U.S. Appl. No. 16/529,402, filed Aug. 1, 2019, 43 pages.
Final Office Action mailed Aug. 9, 2021 on for U.S. Appl. No. 16/573,577, filed Sep. 17, 2019, 16 pages.
Final Office Action mailed Jul. 9, 2021 on for U.S. Appl. No. 16/525,142, filed Jul. 29, 2019, 18 pages.
Final Office Action mailed Apr. 11, 2023 on for U.S. Appl. No. 16/529,360, filed Aug. 1, 2019, 46 pages.
Final Office Action mailed on Oct. 1, 2019 for U.S. Appl. No. 16/175,246, filed Oct. 30, 2018, 18 pages.
Final Office Action mailed on Jun. 2, 2023 for U.S. Appl. No. 17/513,558, filed Oct. 28, 2021, 15 pages.
Final Office Action mailed on Dec. 1, 2022 for U.S. Appl. No. 17/101,784, filed Mar. 16, 2013, 14 pages.
Final Office Action mailed on Apr. 17, 2020 for U.S. Appl. No. 16/529,402, filed Aug. 1, 2019, 59 pages.
Final Office Action mailed on Jan. 20, 2023 for U.S. Appl. No. 17/331,440, filed May 26, 2021, 17 pages.
Final Office Action mailed on Jul. 29, 2020 for U.S. Appl. No. 16/132,092, filed Sep. 14, 2018, 5 pages.
Gao et al., "Dynamic Load Shedding for an Islanded Microgrid With Limited Generation Resources," IET Generation, Transmission & Distribution, Sep. 2016, vol. 10(12), pp. 2953-2961. doi: 10.1049/iet-gtd.2015.1452.
Ghamkhari et al., "Energy and Performance Management of Green Data Centers: A Profit Maximization Approach," IEEE Transactions on Smart Grid, Jun. 2013, vol. 4 (2), pp. 1017-1025.
Ghamkhari et al., "Optimal Integration of Renewable Energy Resources in Data Centers with Behind-the-Meter Renewable Generator," Department of Electrical and Computer Engineering Texas Tech University, 2012, pp. 3340-3444.
Ghatikar et al., "Demand Response Opportunities and Enabling Technologies for DataCenters: Findings from Field Studies," Lawrence Berkeley National Laboratory, Aug. 2012, 57 pages.
Hayes, Adam S., "A Cost of Production Model for Bitcoin," Department of Economics, The New School for Social Research, Mar. 2015, 5 pages.
Huang et al., "Data Center Energy Cost Optimization in Smart Grid: a Review," Journal of Zhejiang University (Engineering Science), 2016, vol. 50 (12), pp. 2386-2399.
Hung et al., "Application of Improved Differential Evolution Algorithm for Economic and Emission Dispatch of Thermal Power Generation Plants," Proceedings of the 3rd International Conference on Machine Learning and Soft Computing, Jan. 2019, pp. 93-98. https://doi.org/10.1145/3310986.3311003.
International Search Report and Written Opinion of PCT Application No. PCT/US2018/017955, mailed on Apr. 30, 2018, 22 pages.
International Search Report and Written Opinion of PCT Application No. PCT/US2018/017950, mailed on May 31, 2018, 15 pages.
International Search Report and Written Opinion of PCT Application No. PCT/US2020/044536, mailed on Aug. 26, 2020, 24 pages.
International Search Report and Written Opinion of PCT Application No. PCT/US2020/044539, mailed on Aug. 26, 2020, 7 pages.
International Search Report and Written Opinion of PCT Application No. PCT/US2021/019875, mailed on Apr. 29, 2021, 12 pages.
International Search Report and Written Opinion of PCT Application No. PCT/US2021/045972, mailed on Nov. 15, 2021, 16 pages.
International Search Report and Written Opinion of PCT Application No. PCT/US20/57686, mailed on Feb. 22, 2021, 67 pages.
ISO, "Distributed Energy Resources Roadmap for New York's Wholesale Electricity Markets," Distributed Energy Resource Roadmap, Jan. 2017, pp. 1-39. [retrieved on Dec. 15, 2020], Retrieved from the Internet: <url: https://www.nyiso.com/documents/20142/1391862/Distributed_Energy_Resources_Roadmap.pdf/ec0b3b64-4de2-73e0-ffef-49a4b8b1 b3ca.</url:>.
John, "Stem and CPower to Combine Behind-the-Meter Batteries and Demand Response," Energy Storage, Aug. 8, 2017, 1 pages.
Kewl, "Start-Up From the Heart of Berlin Has Pioneered Decentralized Mobile Mining by Combining Blockchain With Regenerative Energy" Nov. 13, 2017, 3 pages. Retrieved from Internet:[URL: www.crypto-news.net/start-up-from-the-heart-of-berlin-has-pioneered-decentralized-mobile-mining-by-combining-blockchain-with-regenerative-energy/].
Kiani et al., "Profit Maximization for Geographical Dispersed Green Data Centers," Arxiv.org, Cornell University Library, 201 Olin Library Cornell University Ithaca, Apr. 2015, pp. 1-5.
Kim et al., "Automated di/dt Stressmark Generation for Microprocessor Power Delivery Networks," IEEE/ACM International Symposium on Low Power Electronics and Design, Aug. 2011, pp. 253-258.
Ko., "Ultra-Low Power Challenges for the next Generation ASIC," International Symposium on Low Power Electronics and Design, Jul. 2012, pp. 365-366. https://doi.org/10.1145/2333660.2333743.
Li et al., "iSwitch: Coordinating and Optimizing Renewable Energy Powered Server Clusters," 2012 39th Annual International Symposium on Computer Architecture, Jun. 2012, pp. 512-523.
Li et al., "Research on Evaluation Method of Integrated Energy Service Level of Power Generation Enterprises," Informatics, Environment, Energy and Applications, Jun. 2021, pp. 57-62. https://doi.org/10.1145/3458359.3458372.
Lim et al., "Distributed Load-shedding System for Agent-based Autonomous Microgrid Operations," Energies, 2014, vol. 7(1), pp. 385-401. doi: 10.3390/en7010385.
Lin et al., "Automated Classification of Power Plants by Generation Type," E-Energy '20: Proceedings of the Eleventh ACM International Conference on Future Energy Systems, Jun. 2020, pp. 86-96. https://doi.org/10.1145/3396851.3397708.
Liu et al., "Improved Average Consensus Algorithm Based Distributed Cost Optimization for Loading Shedding of Autonomous Microgrids," International Journal of Electrical Power & Energy Systems, Dec. 2015, vol. 73, pp. 89-96. doi: 10.1016/j.ijepes.2015.04.006.
Marcano et al., "Soil Power?: Can Microbial Fuel Cells Power Non-Trivial Sensors?," LP-IoT'21, Proceedings of the 1st ACM Workshop on No Power and Low Power Internet-of-Things, Jan. 2022, pp. 8-13. https://doi.org/10.1145/3477085.3478989.
Mcnamara et al., U.S. Appl. No. 16/175,246, mailed on Oct. 30, 2018, 64 pages.
Miyazaki et al., "Electric-Energy Generation Using Variable-Capacitive Resonator for Power-Free LSI: Efficiency Analysis and Fundamental Experiment," International Symposium on Low Power Electronics and Design, Aug. 2003, pp. 193-198, Doi: 10.1109/LPE.2003.1231861.
Mousavizadeh et al., "A Linear Two-stage Method for Resiliency Analysis in Distribution Systems Considering Renewable Energy and Demand Response Resources," Elsevier, 2017, pp. 443-460. doi: 10.1016/j.apenergy.2017.11.067.
Nawaz et al., "Assisting the Power Generation Sector Toward Sustainability—an Lot Based System for Power Theft Detection With Theft Location Identification," Proceedings of the 2nd International Conference on Computing Advancements, Aug. 2022, pp. 309-315, https://doi.org/10.1145/3542954.3542999.
Non-Final Office Action mailed on Dec. 5, 2019 for U.S. Appl. No. 16/529,360, filed Aug. 1, 2019, 72 pages.
Non-Final Office Action mailed on Dec. 10, 2019 for U.S. Appl. No. 16/596,190, filed Oct. 8, 2019, 72 pages.
Non-Final Office Action mailed on Jun. 12, 2020 for U.S. Appl. No. 16/803,109, filed Dec. 27, 2020, 31 pages.
Non-Final Office Action mailed on Nov. 14, 2019 for U.S. Appl. No. 16/132,098, filed Sep. 14, 2018, 25 pages.
Non-Final Office Action mailed on Feb. 20, 2020 for U.S. Appl. No. 16/702,894, filed Dec. 4, 2019, 30 pages.
Non-Final Office Action mailed on Nov. 21, 2019 for U.S. Appl. No. 16/529,402, filed Aug. 1, 2019, 57 pages.
Non-Final Office Action mailed Feb. 4, 2021 on for U.S. Appl. No. 16/284,610, filed Feb. 25, 2019, 9 pages.
Non-Final Office Action mailed Apr. 1, 2021 on for U.S. Appl. No. 16/482,495, filed Jul. 31, 2019, 59 pages.

(56) References Cited

OTHER PUBLICATIONS

Non-Final Office Action mailed Apr. 2, 2020 on for U.S. Appl. No. 16/132,011, filed Sep. 14, 2018, 5 pages.
Non-Final Office Action mailed Aug. 6, 2012 for U.S. Appl. No. 12/587,564, filed Oct. 8, 2009, 24 pages.
Non-Final Office Action mailed Oct. 6, 2022 on for U.S. Appl. No. 17/331,440, filed May 26, 2021, 46 pages.
Non-Final Office Action mailed Nov. 7, 2022 on for U.S. Appl. No. 17/692,636, filed Mar. 11, 2022, 9 pages.
Non-Final Office Action mailed Dec. 8, 2022 for U.S. Appl. No. 17/340,643, filed Jun. 7, 2021, 5 pages.
Non-Final Office Action mailed Mar. 8, 2021 on for U.S. Appl. No. 16/525,142, filed Jul. 29, 2019, 71 pages.
Non-Final Office Action mailed Dec. 11, 2019 on for U.S. Appl. No. 16/132,062, filed Sep. 14, 2018, 17 pages.
Non-Final Office Action mailed May 11, 2023 for U.S. Appl. No. 18/114,503, filed Feb. 27, 2023.
Non-Final Office Action mailed Feb. 12, 2021 on for U.S. Appl. No. 16/528,348, filed Jul. 31, 2019, 54 pages.
Non-Final Office Action mailed May 14, 2020 on for U.S. Appl. No. 16/834,987, filed Mar. 30, 2020, 30 pages.
Non-Final Office Action mailed Mar. 17, 2023 for U.S. Appl. No. 17/868,381, filed Jul. 19, 2022, 49 pages.
Non-Final Office Action mailed Sep. 21, 2018 for U.S. Appl. No. 15/289,272, filed Oct. 10, 2016, 27 pages.
Non-Final Office Action mailed Sep. 22, 2022 on for U.S. Appl. No. 16/961,386, filed Jul. 10, 2020, 52 pages.
Non-Final Office Action mailed Dec. 24, 2021 on for U.S. Appl. No. 17/128,830, filed Dec. 21, 2020, 4 pages.
Non-Final Office Action mailed Apr. 25, 2023 for U.S. Appl. No. 17/340,643, filed Jun. 7, 2021, 4 pages.
Non-Final Office Action mailed Aug. 25, 2022 on for U.S. Appl. No. 16/529,360, filed Aug. 1, 2019, 91 pages.
Non-Final Office Action mailed Mar. 25, 2021 on for U.S. Appl. No. 16/573,577, filed Sep. 17, 2019, 65 pages.
Non-Final Office Action mailed Mar. 29, 2023 for U.S. Appl. No. 18/066,616, filed Dec. 15, 2022, 120 pages.
Non-Final Office Action mailed Sep. 29, 2022 on for U.S. Appl. No. 17/353,285, filed Jun. 21, 2021, 16 pages.
Non-Final Office Action mailed on Dec. 10, 2019 for U.S. Appl. No. 16/528,348, filed Jul. 31, 2019, 33 pages.
Non-Final Office Action mailed on Apr. 11, 2023 for U.S. Appl. No. 17/353,285, filed Jun. 21, 2021, 4 pages.
Non-Final Office Action mailed on May 11, 2021 for U.S. Appl. No. 16/529,360, filed Aug. 1, 2019, 64 pages.
Non-Final Office Action mailed on May 28, 2021 for U.S. Appl. No. 16/658,983, filed Oct. 21, 2019, 23 pages.
Non-Final Office Action mailed on Mar. 30, 2020 for U.S. Appl. No. 16/132,092, filed Sep. 14, 2018, 19 pages.
Notice of Allowance mailed May 12, 2021 on for U.S. Appl. No. 16/132,062, filed Sep. 14, 2018, 2 pages.
Notice of Allowance mailed Oct. 13, 2020 on for U.S. Appl. No. 16/132,098, filed Sep. 14, 2018, 5 pages.
Notice of Allowance mailed Dec. 2, 2022 for U.S. Appl. No. 17/328,337, filed May 24, 2021, 30 pages.
Notice of Allowance mailed Jun. 12, 2020 on for U.S. Appl. No. 16/834,987, filed Mar. 30, 2020, 9 pages.
Notice of Allowance mailed on Jun. 9, 2021 for U.S. Appl. No. 16/528,348, filed Jul. 31, 2019, 11 pages.
Notice of Allowance mailed Dec. 2, 2022 on for U.S. Appl. No. 17/673,318, filed Feb. 16, 2022, 17 pages.
Notice of Allowance mailed Nov. 2, 2022 on for U.S. Appl. No. 17/340,886, filed Jun. 7, 2021, 9 pages.
Notice of Allowance mailed Feb. 8, 2021 on for U.S. Appl. No. 16/132,062, filed Sep. 14, 2018, 21 pages.
Notice of Allowance mailed Feb. 8, 2021 on for U.S. Appl. No. 16/803,109, filed Feb. 27, 2020, 29 pages.
Notice of Allowance mailed Feb. 8, 2021 on for U.S. Appl. No. 16/834,987, filed Mar. 30, 2020, 180 pages.
Notice of Allowance mailed Aug. 10, 2022 on for U.S. Appl. No. 17/328,337, filed May 24, 2021, 9 pages.
Notice of Allowance mailed Jan. 13, 2021 on for U.S. Appl. No. 16/175,246, filed Oct. 30, 2018, 5 pages.
Notice of Allowance mailed Sep. 17, 2020 on for U.S. Appl. No. 16/175,246, filed Oct. 30, 2018, 5 pages.
Notice of Allowance mailed Nov. 19, 2020 on for U.S. Appl. No. 16/132,062, filed Sep. 14, 2018, 7 pages.
Notice of Allowance mailed Apr. 20, 2021 on for U.S. Appl. No. 16/482,495, filed Jul. 31, 2019, 5 pages.
Notice of Allowance mailed Nov. 23, 2022 on for U.S. Appl. No. 17/340,664, filed Jun. 7, 2021, 2 pages.
Notice of Allowance mailed Jan. 25, 2021 on for U.S. Appl. No. 16/132,098, filed Sep. 14, 2018, 5 pages.
Notice of Allowance mailed Jan. 25, 2021 on for U.S. Appl. No. 16/702,894, filed Dec. 4, 2019, 24 pages.
Notice of Allowance mailed Jul. 26, 2021 on for U.S. Appl. No. 16/284,610, filed Feb. 25, 2019, 2 pages.
Notice of Allowance mailed Jan. 27, 2021 on for U.S. Appl. No. 16/132,092, filed Sep. 14, 2018, 8 pages.
Notice of Allowance mailed May 27, 2021 on for U.S. Appl. No. 16/284,610, filed Feb. 25, 2019, 16 pages.
Notice of Allowance mailed Jul. 29, 2020 on for U.S. Appl. No. 16/132,011, filed Sep. 14, 2018, 5 pages.
Notice of Allowance mailed Oct. 29, 2020 on for U.S. Appl. No. 16/132,092, filed Sep. 14, 2018, 8 pages.
Notice of Allowance mailed May 31, 2022 on for U.S. Appl. No. 16/529,402, filed Aug. 1, 2019, 22 pages.
Notice of Allowance mailed Oct. 8, 2021 on for U.S. Appl. No. 16/528,348, filed Jul. 31, 2019, 5 pages.
Notice of Allowance mailed on Apr. 2, 2019, for U.S. Appl. No. 16/175,335, filed Oct. 30, 2018, 12 pages.
Notice of Allowance mailed on Mar. 2, 2020, for U.S. Appl. No. 16/596,190, filed Oct. 8, 2019, 15 pages.
Notice of Allowance mailed on Aug. 3, 2022, for U.S. Appl. No. 17/340,886, filed Jun. 7, 2021, 09 pages.
Notice of Allowance mailed on Feb. 3, 2022, for U.S. Appl. No. 16/573,577, filed Sep. 17, 2019, 8 pages.
Notice of Allowance mailed on Apr. 4, 2023, for U.S. Appl. No. 17/673,318, filed Feb. 16, 2022, 2 pages.
Notice of Allowance mailed on Jan. 5, 2022, for U.S. Appl. No. 16/658,983, filed Oct. 21, 2019, 14 pages.
Notice of Allowance mailed on Apr. 6, 2020, for U.S. Appl. No. 16/175,246, filed Oct. 30, 2018, 12 pages.
Notice of Allowance mailed on Mar. 8, 2023, for U.S. Appl. No. 16/961,386, filed Jul. 10, 2020, 2 pages.
Notice of Allowance mailed on Nov. 9, 2022, for U.S. Appl. No. 17/340,664, filed Dec. 16, 2013, 4 pages.
Notice of Allowance mailed on Jan. 13, 2023, for U.S. Appl. No. 16/961,386 , filed on Jul. 10, 2020, 13 pages.
Notice of Allowance mailed on Aug. 15, 2019, for U.S. Appl. No. 16/175,146, filed Oct. 30, 2018, 17 pages.
Notice of Allowance mailed on Apr. 18, 2022, for U.S. Appl. No. 17/128,830, filed Dec. 21, 2020, 7 pages.
Notice of Allowance mailed on Feb. 21, 2023, for U.S. Appl. No. 17/340,664, filed Jun. 7, 2021, 2 pages.
Notice of Allowance mailed on Mar. 21, 2023 for U.S. Appl. No. 17/692,636, filed Mar. 11, 2022, 09 pages.
Notice of Allowance mailed on Feb. 23, 2022, for U.S. Appl. No. 16/525,142, filed Jul. 29, 2019, 5 pages.
Notice of Allowance mailed on Feb. 23, 2023, for U.S. Appl. No. 17/353,285, filed Jun. 21, 2021, 5 pages.
Notice of Allowance mailed on Apr. 24, 2023, for U.S. Appl. No. 16/961,386, filed Jul. 10, 2020, 10 pages.
Notice of Allowance mailed on Apr. 24, 2023 for U.S. Appl. No. 17/692,636, filed Mar. 11, 2022, 08 pages.
Notice of Allowance mailed on Apr. 24, 2023 for U.S. Appl. No. 17/750,883, filed May 23, 2022, 10 pages.
Notice of Allowance mailed on Jan. 24, 2022, for U.S. Appl. No. 16/525,142, filed Jul. 29, 2019, 9 pages.
Notice of Allowance mailed on Sep. 24, 2021 for U.S. Appl. No. 16/528,348, filed Jul. 31, 2019, 9 pages.

(56) References Cited

OTHER PUBLICATIONS

Notice of Allowance mailed on Jan. 26, 2022, for U.S. Appl. No. 17/328,275, filed May 24, 2021, 10 pages.
Notice of Allowance mailed on Jan. 27, 2020, for U.S. Appl. No. 16/702,931, filed Dec. 4, 2019, 23 pages.
Notice of Allowance mailed on Jul. 29, 2019, for U.S. Appl. No. 16/245,532, filed Jan. 11, 2019, 13 pages.
Pashajavid et al., "A Multimode Supervisory Control Scheme for Coupling Remote Droop- Regulated Microgrids," IEEE Transactions on Smart Grid, May 26, 2020, vol. 9(5), pp. 5381-5392. https://ieeexplore.ieee.org/abstract/document/7888570/.
Pashajavid et al., "Frequency Support for Remote Microgrid Systems With Intermittent Distributed Energy Resources—A Two-level Hierarchical Strategy," IEEE Systems Journal, May 26, 2020, vol. 12(3), pp. 2760-2771. https://ieeexplore.ieee.org/abstract/document/7862156/.
Rahimi, Farrokh, "Using a Transactive Energy Framework," IEEE Electrification Magazine, Dec. 2016, pp. 23-29.
Response to Non-Final Office Action mailed Feb. 6, 2021 for U.S. Appl. No. 12/587,564, filed Oct. 8, 2009, 14 pages.
Response to Non-Final Office Action mailed Dec. 21, 2018 for U.S. Appl. No. 15/289,272, filed Oct. 10, 2016, 10 pages.
Rudez and Mihalic, "Predictive Underfrequency Load Shedding Scheme for Islanded Power Systems With Renewable Generation," Electric Power Systems Research, May 2015, vol. 126, pp. 21-28. doi: 10.1016/j.epsr.2015.04.017.
Sakurai., "Next-Generation Power-Aware Design," ISLPED, Aug. 2008, pp. 383-384.
Sankaragomathi et al., "Optimal Power and Noise for Analog and Digital Sections of a Low Power Radio Receiver," International Symposium on Low Power Electronics & Design, Aug. 2008, pp. 271-276. https://doi.org/10.1145/1393921.1393993.
Sethuraman et al., "Multicasting Based Topology Generation and Core Mapping for a Power Efficient Networks-On-Chip," International Symposium on Low Power Electronics & Design, Aug. 2007, pp. 399-402. https://doi.org/10.1145/1283780.1283868.
Sharma et al., "Microgrids: A New Approach To Supply-Side Design For Data Centers," 2009, 7 pages.
Singh et al., "Targeted Random Test Generation for Power-Aware Multicore Designs," ACM Transactions on Design Automation of Electronic Systems, Jun. 2012, vol. 17(3), pp. 1-19. https://doi.org/10.1145/2209291.2209298.
Soluna., "Powering the Block Chain," Aug. 2018, version 1.1, 29 pages.
Tao et al., "Simulation Model of Photo-Voltaic Grid-Connected Power Generation," Artificial Intelligence and Advanced Manufacture, Mar. 2022, pp. 2921-2926. https://doi.org/10.1145/3495018.3501208.
U.S. Appl. No. 62/556,880, filed Sep. 11, 2017, 9 pages.
Villani et al., "RF Power Transmission: Energy Harvesting for Self-Sustaining Miniaturized Sensor Nodes," Embedded Networked Sensor Systems, Sensys, Nov. 2021, pp. 592-593. https://doi.org/10.1145/3485730.3493365.
Wang et al., "SHIP: Scalable Hierarchical Power Control for Large-scale Data Centers," 2009 18th International Conference onParallel Architectures and Compilation Techniques, Sep. 2009, pp. 91-100.
Wierman et al., "Opportunities and Challenges for Data Center Demand Response," International Green Computing Conference, IEEE, Nov. 2014, pp. 1-10.
Wilson, Joseph Nathanael, "A Utility-Scale Deployment Project of Behind-the-Meter Energy Storage for Use in Ancillary Services, Energy Resiliency, Grid Infrastructure Investment Deferment, and Demand-Response Integration," Portland State University, 2016, 154 pages.
Xu et al., "Distributed Load Shedding for Microgrid With Compensation Support via Wireless Network," IET Generation, Transmission & Distribution, May 2018, vol. 12(9), pp. 2006-2018. doi: 10.1049/iet-gtd.2017.1029.
Yang et al., "Investment Value Analysis of Household Rooftop PV Power Generation Project under Carbon Trading Mode," Information Management and Management Science, Aug. 2019, pp. 160-165. https://doi.org/10.1145/3357292.3357330.
Yaramasu V., et al., "High-Power Wind Energy Conversion Systems: State-of-the-Art and Emerging Technologies", Proceedings of the IEEE, May 2015, vol. 103 (5), 49 pages.
Zhang et al., "Calculation of the Carrying Capacity of Distrubuted Power Generation in Distribution Network Under Carbon Peaking and Carbon Neutrality Goals," Electrical, Power and Computer Engineering, Apr. 2022, pp. 1-5. https://doi.org/10.1145/3529299.3529308.
Zhang et al., "Wind Power Generation Prediction Based on LSTM," International Conference on Mathematics and Artificial Intelligence, Apr. 2019, pp. 85-89. https://doi.org/10.1145/3325730.3325735.
Zhou et al., "An Online Power Generation Dispatching Method to Improve the Small Signal Stability of Power System with Fluctuated Wind Power," Electrical Power and Computer Engineering, Apr. 2022, pp. 1-12. https://doi.org/10.1145/3529299.3529302.
Zhou et al., "Two-Stage Load Shedding for Secondary Control in Hierarchical Operation of Islanded Microgrids," IEEE Transactions on Smart Grid, May 2019, vol. 10(3), pp. 3103-3111. doi: 10.1109/TSG.2018.2817738.
Non-Final Office Action from U.S. Appl. No. 17/513,558 (Dec. 20, 2022).
Non-Final Office Action issued in U.S. Appl. No. 18/143,280, filed May 4, 2023. (Aug. 15, 2024).
Notice of Allowance issued in U.S. Appl. No. 18/139,134, filed Apr. 25, 2023. (Nov. 20, 2024).
Notice of Allowance issued in U.S. Appl. No. 18/618,013, filed Mar. 27, 2024. (Oct. 25, 2024).
Office Action issued in U.S. Appl. No. 18/106,102, filed Feb. 6, 2023. (Aug. 29, 2024).
Notice of Allowance issued in U.S. Appl. No. 17/101,784, filed Nov. 23, 2020. (May 20, 2025).
European Examination Report issued in application No. 19877576.9. (Apr. 4, 2025).

* cited by examiner

DYNAMIC UPDATING OF A POWER AVAILABLE LEVEL FOR A DATACENTER

CROSS-REFERENCE TO RELATED APPLICATIONS

This application claims priority from U.S. Provisional Application No. 63/345,626, filed on May 25, 2022, the entirety of which is fully incorporated by reference herein.

FIELD

This specification relates to a system using a datacenter that is configured to received electrical power either from an electrical grid or directly from an electrical power generator.

BACKGROUND

"Electrical grid" or "grid," as used herein, refers to a Wide Area Synchronous Grid (also known as an Interconnection), and is a regional scale or greater electric power grid that that operates at a synchronized frequency and is electrically tied together during normal system conditions. An electrical grid delivers electricity from generation stations to consumers. An electrical grid includes: (i) generation stations that produce electrical power at large scales for delivery through the grid, (ii) high voltage transmission lines that carry that power from the generation stations to demand centers, and (iii) distribution networks carry that power to individual customers.

FIG. 1 illustrates a typical electrical grid, such as a North American Interconnection or the synchronous grid of Continental Europe (formerly known as the UCTE grid). The electrical grid of FIG. 1 can be described with respect to the various segments that make up the grid.

A generation segment 102 includes one or more generation stations that produce utility-scale electricity (typically >50 MW), such as a nuclear plant 102*a*, a coal plant 102*b*, a wind power station (i.e., wind farm) 102*c*, and/or a photovoltaic power station (i.e., a solar farm) 102*d*. Generation stations are differentiated from building-mounted and other decentralized or local wind or solar power applications because they supply power at the utility level and scale (>50 MW), rather than to a local user or users. The primary purpose of generation stations is to produce power for distribution through the grid, and in exchange for payment for the supplied electricity. Each of the generation stations 102*a-d* includes power generation equipment 102*e-h*, respectively, typically capable of supply utility-scale power (>50 MW). For example, the power generation equipment 102*g* at wind power station 102*c* includes wind turbines, and the power generation equipment 102*h* at photovoltaic power station 102*d* includes photovoltaic panels.

Each of the generation stations 102*a-d* may further include station electrical equipment 102*i*-1 respectively. Station electrical equipment 102*i*-1 are each illustrated in FIG. 1 as distinct elements for simplified illustrative purposes only and may, alternatively or additionally, be distributed throughout the power generation equipment, 102*e-h*, respectively. For example, at wind power station 102*c*, each wind turbine may include transformers, frequency converters, power converters, and/or electrical filters. Energy generated at each wind turbine may be collected by distribution lines along strings of wind turbines and move through collectors, switches, transformers, frequency converters, power converters, electrical filters, and/or other station electrical equipment before leaving the wind power station 102*c*. Similarly, at photovoltaic power station 102*d*, individual photovoltaic panels and/or arrays of photovoltaic panels may include inverters, transformers, frequency converters, power converters, and/or electrical filters. Energy generated at each photovoltaic panel and/or array may be collected by distribution lines along the photovoltaic panels and move through collectors, switches, transformers, frequency converters, power converters, electrical filters, and/or other station electrical equipment before leaving the photovoltaic power station 102*d*.

Each generation station 102*a-d* may produce AC or DC electrical current which is then typically stepped up to a higher AC voltage before leaving the respective generation station. For example, wind turbines may typically produce AC electrical energy at 600V to 700V, which may then be stepped up to 34.5 kV before leaving the generation station 102*d*. In some cases, the voltage may be stepped up multiple times and to a different voltage before exiting the generation station 102*c*. As another example, photovoltaic arrays may produce DC voltage at 600V to 900V, which is then inverted to AC voltage and may be stepped up to 34.5 kV before leaving the generation station 102*d*. In some cases, the voltage may be stepped up multiple times and to a different voltage before exiting the generation station 102*d*.

Upon exiting the generation segment 102, electrical power generated at generation stations 102*a-d* passes through a respective Point of Interconnection ("POI") 103 between a generation station (e.g., 102*a-d*) and the rest of the grid. A respective POI 103 represents the point of connection between a generation station's (e.g. 102*a-d*) equipment and a transmission system (e.g., transmission segment 104) associated with electrical grid. In some cases, at the POI 103, generated power from generation stations 102*a-d* may be stepped up at transformer systems 103*e-h* to high voltage scales suitable for long-distance transmission along transmission lines 104*a*. Typically, the generate electrical energy leaving the POI 103 will be at 115 kV AC or above, but in some cases it may be as low as, for example, 69 kV for shorter distance transmissions along transmission lines 104*a*. Each of transformer systems 103*e-h* may be a single transformer or may be multiple transformers operating in parallel or series and may be co-located or located in geographically distinct locations. Each of the transformer systems 103*e-h* may include substations and other links between the generation stations 102*a-d* and the transmission lines 104*a*.

A key aspect of the POI 103 is that this is where generation-side metering occurs. One or more utility-scale generation-side meters 103*a-d* (e.g., settlement meters) are located at settlement metering points at the respective POI 103 for each generation station 102*a-d*. The utility-scale generation-side meters 103*a-d* measure power supplied from generation stations 102*a-d* into the transmission segment 104 for eventual distribution throughout the grid.

For electricity consumption, the price consumers pay for power distributed through electric power grids is typically composed of, among other costs, Generation, Administration, and Transmission & Distribution ("T&D") costs. T&D costs represent a significant portion of the overall price paid by consumers for electricity. These costs include capital costs (land, equipment, substations, wire, etc.), costs associated with electrical transmission losses, and operation and maintenance costs.

For utility-scale electricity supply, operators of generation stations (e.g., 102*a-d*) are paid a variable market price for the amount of power the operator generates and provides to the grid, which is typically determined via a power purchase agreement (PPA) between the contracting parties to the PPA or locational marginal pricing (LMP). The amount of power the generation station operator generates and provides to the grid is measured by utility-scale generation-side meters (e.g., 103*a-d*) at settlement metering points. As illustrated in FIG. 1, the utility-scale generation-side meters 103*a-d* are shown on a low side of the transformer systems 103*e-h*), but they may alternatively be located within the transformer systems 103*e-h* or on the high side of the transformer systems 103*e-h*. A key aspect of a utility-scale generation-side meter is that it is able to meter the power supplied from a specific generation station into the grid. As a result, the grid operator can use that information to calculate and process payments for power supplied from the generation station to the grid. That price paid for the power supplied from the generation station is then subject to T&D costs, as well as other costs, in order to determine the price paid by consumers.

After passing through the utility-scale generation-side meters in the POI 103, the power originally generated at the generation stations 102*a-d* is transmitted onto and along the transmission lines 104*a* in the transmission segment 104. Typically, the electrical energy is transmitted as AC at 115 kV+ or above, though it may be as low as 69 kV for short transmission distances. In some cases, the transmission segment 104 may include further power conversions to aid in efficiency or stability. For example, transmission segment 104 may include high-voltage DC ("HVDC") portions (along with conversion equipment) to aid in frequency synchronization across portions of the transmission segment 104. As another example, transmission segment 104 may include transformers to step AC voltage up and then back down to aid in long distance transmission (e.g., 230 kV, 500 kV, 765 kV, etc.).

Power generated at the generation stations 104*a-d* is ultimately destined for use by consumers connected to the grid. Once the energy has been transmitted along the transmission segment 104, the voltage will be stepped down by transformer systems 105*a-c* in the step down segment 105 so that it can move into the distribution segment 106.

In the distribution segment 106, distribution networks 106*a-c* take power that has been stepped down from the transmission lines 104*a* and distribute it to local customers, such as local sub-grids (illustrated at 106*a*), industrial customers, including large EV charging networks (illustrated at 106*b*), and/or residential and retail customers, including individual EV charging stations (illustrated at 106*c*). Customer meters 106*d*, 106*f* measure the power used by each of the grid-connected customers in distribution networks 106*a-c*. Customer meters 106*d* are typically load meters that are unidirectional and measure power use. Some of the local customers in the distribution networks 106*a-d* may have local wind or solar power systems 106*e* owned by the customer. As discussed above, these local customer power systems 106*e* are decentralized and supply power directly to the customer(s). Customers with decentralized wind or solar power systems 106*e* may have customer meters 106*f* that are bidirectional or net-metering meters that can track when the local customer power systems 106*e* produce power in excess of the customer's use, thereby allowing the utility to provide a credit to the customer's monthly electricity bill. Customer meters 106*d*, 106*f* differ from utility-scale generation-side meters (e.g., settlement meters) in at least the following characteristics: design (electro-mechanical or electronic vs current transformer), scale (typically less than 1600 amps vs. typically greater than 50 MW; typically less than 600V vs. typically greater than 14 kV), primary function (use vs. supply metering), economic purpose (credit against use vs payment for power), and location (in a distribution network at point of use vs. at a settlement metering point at a Point of Interconnection between a generation station and a transmission line).

To maintain stability of the grid, the grid operator strives to maintain a balance between the amount of power entering the grid from generation stations (e.g., 102*a-d*) and the amount of grid power used by loads (e.g., customers in the distribution segment 106). In order to maintain grid stability and manage congestion, grid operators may take steps to reduce the supply of power arriving from generation stations (e.g., 102*a-d*) when necessary (e.g., curtailment). Particularly, grid operators may decrease the market price paid for generated power to dis-incentivize generation stations (e.g., 102*a-d*) from generating and supplying power to the grid. In some cases, the market price may even go negative such that generation station operators must pay for power they allow into the grid. In addition, some situations may arise where grid operators explicitly direct a generation station (e.g., 102*a-d*) to reduce or stop the amount of power the station is supplying to the grid.

Power market fluctuations, power system conditions (e.g., power factor fluctuation or generation station startup and testing), and operational directives resulting in reduced or discontinued generation all can have disparate effects on renewal energy generators and can occur multiple times in a day and last for indeterminate periods of time. Curtailment, in particular, is particularly problematic.

Curtailment may result in available energy being wasted because solar and wind operators have zero variable cost (which may not be true to the same extent for fossil generation units which can simply reduce the amount of fuel that is being used). With wind generation, in particular, it may also take some time for a wind farm to become fully operational following curtailment. As such, until the time that the wind farm is fully operational, the wind farm may not be operating with optimum efficiency and/or may not be able to provide power to the grid.

SUMMARY

A first representative embodiment of the disclosure is provided. The embodiment include a method of dynamically updating a reported maximum power consumption for a site with a plurality of computing systems. The method includes the steps of determining an initial maximum power consumption ("MPC") for the site based at least in part on a power consumption of the plurality of computing systems each operating at full power at a respective steady state temperature; reporting the initial MPC; operating the plurality of computing systems at full power at the steady state temperature; actively reducing power consumption of one or more computing systems of the plurality of computing systems; determining a reduced MPC based at least in part on the reduced power consumption of the one or more computing systems and reporting the reduced MPC; actively increasing power consumption of the one or more computing systems; determining an intermediate MPC based at least in part on the increased power consumption of the one or more computing systems and reporting the intermediate MPC; and determining a new steady-state MPC based at least in part on a passive increased power consumption of the one or more computing systems and reporting the new steady-state MPC.

Another representative embodiment of the disclosure is provided. The embodiment includes a method of dynamically updating a reported maximum power consumption for a site with a plurality of computing systems. The method includes the steps of determining a low power consumption ("LPC") based at least in part on a minimum power consumption of the plurality of computing systems at the site and a power consumption of supporting equipment, wherein the supporting equipment is co-located at the site and supports operation of the plurality of computing systems; determining a full power consumption ("FPC") based at least in part on a power consumption of the plurality of computing systems when operating at full power; determining a maximum power consumption ("MPC") comprising at least the sum of the LPC and the FPC; reporting the MPC via a telemetry system; determining power consumption for a time period at the site cannot achieve the MPC; determining a modified MPC; and reporting the modified MPC via the telemetry system.

Another representative embodiment of the disclosure is provided. The embodiment includes A method of dynamically updating a reported maximum power consumption for a site with a plurality of computing systems. The method includes the steps of determining a temperature profile for a future time period, wherein the temperature profile comprise at least a first temperature during a first time interval in the future time period and a second temperature during a second time interval in the future time period; determining a low power consumption ("LPC") for the first time interval and the second time interval, wherein determining the LPC is based at least in part on a minimum power consumption of the plurality of computing systems at the site and a power consumption of supporting equipment, wherein the supporting equipment is co-located at the site and supports operation of the plurality of computing systems; determining a full power consumption ("FPC") for the first time interval and the second time interval based at least in part on a power consumption of the plurality of computing systems when operating at full power and further based at least in part on the respective first temperature and second temperature for each time interval; determining a maximum power consumption ("MPC") for the first time interval and the second time interval comprising at least the sum of the LPC and the FPC for each respective time interval; and reporting the MPC for each of the first and second time intervals via a telemetry system prior to the respective time interval.

Another representative embodiment of the disclosure is provided. The embodiment is a method of dynamically updating a reported maximum power consumption for a site with a plurality of computing systems. The method includes the steps of determining a low power consumption ("LPC") based at least in part on a minimum power consumption of the plurality of computing systems at the site and a power consumption of supporting equipment, wherein the supporting equipment is co-located at the site and supports operation of the plurality of computing systems; determining a full power consumption ("FPC") based at least in part on a power consumption of the plurality of computing systems when operating at full power; determining a maximum power consumption ("MPC") comprising at least the sum of the LPC and the FPC; reporting the MPC; determining that actual power consumption at the site exceeds or will exceed the MPC; reducing power consumption of one or more computing systems of the plurality of computing systems based at least in part on maintaining actual power consumption at or below the MPC; determining a reduced power consumption ("RPC") amount as a consequence of reducing power consumption of one or more computing systems of the plurality of computing systems; determining a modified MPC based at least in part on the RPC; and reporting the modified MPC.

Other aspects of the present invention will be apparent from the following description and claims.

DETAILED DESCRIPTION

Figure 1:
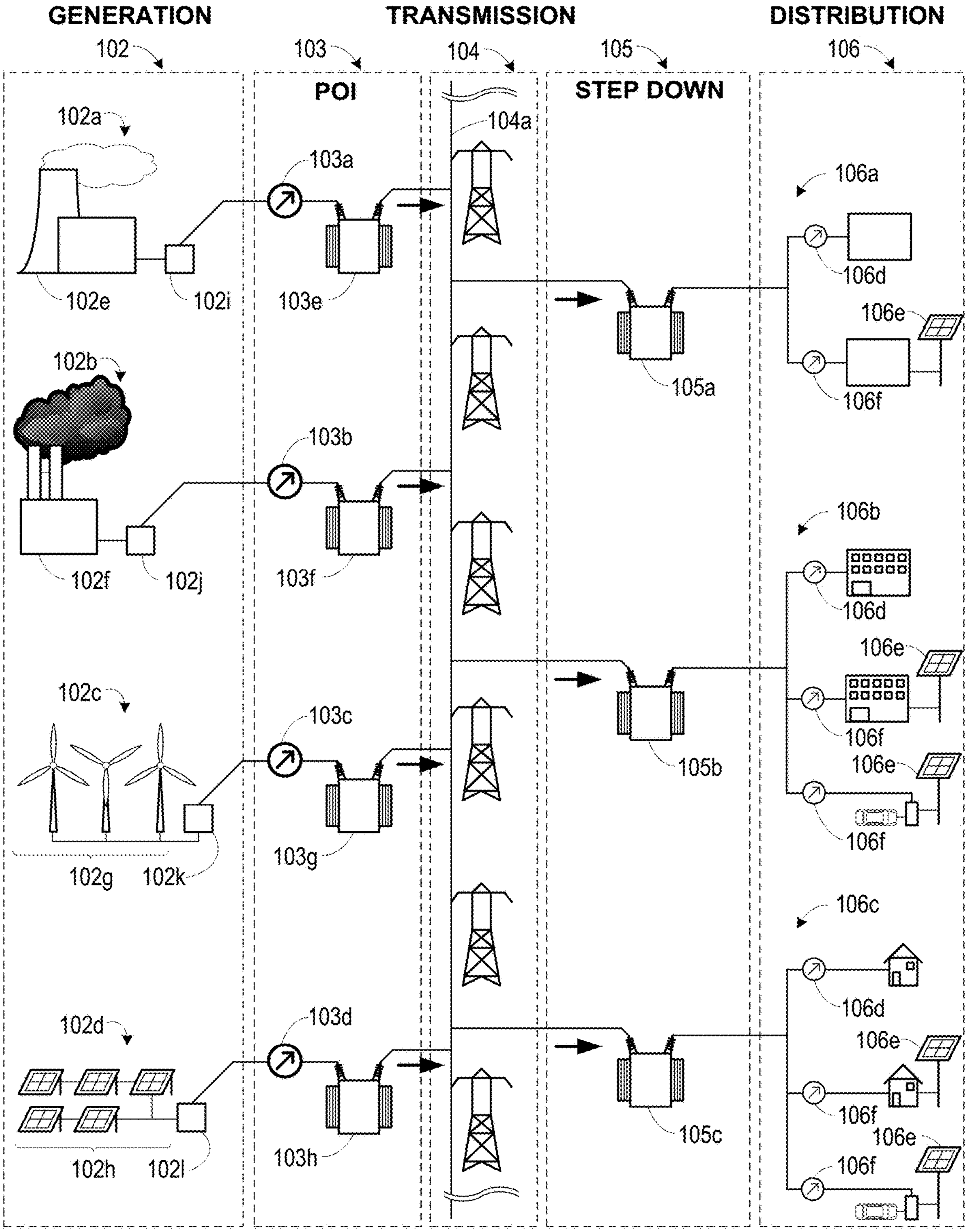
PRIOR ART FIGURE 1
FIG. 1 shows a typical electrical grid.

Disclosed examples will now be described more fully hereinafter with reference to the accompanying drawings, in which some, but not all of the disclosed examples are shown. Different examples may be described and should not be construed as limited to the examples set forth herein.

As discussed above, the market price paid to generation stations for supplying power to the grid often fluctuates due to various factors, including the need to maintain grid stability and based on current demand and usage by connected loads in distribution networks. Due to these factors, situations can arise where generation stations are offered substantially lower prices to deter an over-supply of power to the grid. Although these situations typically exist temporarily, generation stations are sometimes forced to either sell power to the grid at much lower prices or adjust operations to decrease the amount of power generated. Furthermore, some situations may even require generation stations to incur costs in order to offload power to the grid or to shut down generation temporarily.

The volatility in the market price offered for power supplied to the grid can be especially problematic for some types of generation stations. In particular, wind farms and some other types of renewable resource power producers may lack the ability to quickly adjust operations in response to changes in the market price offered for supplying power to the grid. As a result, power generation and management at some generation stations can be inefficient, which can frequently result in power being sold to the grid at low or negative prices. In some situations, a generation station may even opt to halt power generation temporarily to avoid such unfavorable pricing. As such, the time required to halt and to restart the power generation at a generation station can reduce the generation station's ability to take advantage of rising market prices for power supplied to the grid.

Example embodiments provided herein aim to assist generation stations in managing power generation operations and avoid unfavorable power pricing situations like those described above. In particular, example embodiments may involve providing a load that is positioned behind-the-meter ("BTM") and enabling the load to utilize power received behind-the-meter at a generation station in a timely manner.

For purposes herein, a generation station is considered to be configured for the primary purpose of generating utility-scale power for supply to the electrical grid (e.g., a Wide Area Synchronous Grid or a North American Interconnect).

In one embodiment, equipment located behind-the-meter ("BTM equipment") is equipment that is electrically connected to a generation station's power generation equipment behind (i.e., prior to) the generation station's POI with an electrical grid.

In one embodiment, behind-the-meter power ("BTM power") is electrical power produced by a generation station's power generation equipment and utilized behind (i.e., prior to) the generation station's POI with an electrical grid.

In another embodiment, equipment may be considered behind-the-meter if it is electrically connected to a generation station that is subject to metering by a utility-scale generation-side meter (e.g., settlement meter), and the BTM equipment receives power from the generation station, but the power received by the BTM equipment from the generation station has not passed through the utility-scale generation-side meter. In one embodiment, the utility-scale generation-side meter for the generation station is located at the generation station's POI. In another embodiment, the utility-scale generation-side meter for the generation station is at a location other than the POI for the generation station—for example, a substation between the generation station and the generation station's POI.

In another embodiment, power may be considered behind-the-meter if it is electrical power produced at a generation station that is subject to metering by a utility-scale generation-side meter (e.g., settlement meter), and the BTM power is utilized before being metered at the utility-scale generation-side meter. In one embodiment, the utility-scale generation-side meter for the generation station is located at the generation station's POI. In another embodiment, the utility-scale generation-side meter for the generation station is at a location other than the POI for the generation station—for example, a substation between the generation station and the generation station's POI.

In another embodiment, equipment may be considered behind-the-meter if it is electrically connected to a generation station that supplies power to a grid, and the BTM equipment receives power from the generation station that is not subject to T&D charges, but power received from the grid that is supplied by the generation station is subject to T&D charges.

In another embodiment, power may be considered behind-the-meter if it is electrical power produced at a generation station that supplies power to a grid, and the BTM power is not subject to T&D charges before being used by electrical equipment, but power received from the grid that is supplied by the generation station is subject to T&D charges.

In another embodiment, equipment may be considered behind-the-meter if the BTM equipment receives power generated from the generation station and that received power is not routed through the electrical grid before being delivered to the BTM equipment.

In another embodiment, power may be considered behind-the-meter if it is electrical power produced at a generation station, and BTM equipment receives that generated power, and that generated power received by the BTM equipment is not routed through the electrical grid before being delivered to the BTM equipment.

For purposes herein, BTM equipment may also be referred to as a behind-the-meter load ("BTM load") when the BTM equipment is actively consuming BTM power.

Beneficially, where BTM power is not subject to traditional T&D costs, a wind farm or other type of generation station can be connected to BTM loads which can allow the generation station to selectively avoid the adverse or less-than optimal cost structure occasionally associated with supplying power to the grid by shunting generated power to the BTM load.

An arrangement that positions and connects a BTM load to a generation station can offer several advantages. In such arrangements, the generation station may selectively choose whether to supply power to the grid or to the BTM load, or both. The operator of a BTM load may pay to utilize BTM power at a cost less than that charged through a consumer meter (e.g., 106*d*, 106*f*) located at a distribution network (e.g., 106*a-c*) receiving power from the grid. The operator of a BTM load may additionally or alternatively pay less than the market rate to consume excess power generated at the generation station during curtailment. As a result, the generation station may direct generated power based on the "best" price that the generation station can receive during a given time frame, and/or the lowest cost the generation station may incur from negative market pricing during curtailment. The "best" price may be the highest price that the generation station may receive for its generated power during a given duration, but can also differ within embodiments and may depend on various factors, such as a prior PPA. In one example, by having a behind-the-meter option available, a generation station may transition from supplying all generated power to the grid to supplying some or all generated power to one or more BTM loads when the market price paid for power by grid operators drops below a predefined threshold (e.g., the price that the operator of the BTM load is willing to pay the generation station for power). Thus, by having an alternative option for power consumption (i.e., one or more BTM loads), the generation station can selectively utilize the different options to maximize the price received for generated power. In addition, the generation station may also utilize a BTM load to avoid or reduce the economic impact in situations when supplying power to the grid would result in the generation station incurring a net cost.

Providing BTM power to a load can also benefit the BTM load operator. A BTM load may be able to receive and utilize BTM power received from the generation station at a cost that is lower than the cost for power from the grid (e.g., at a customer meter 106*d*, 106*f*). This is primarily due to avoidance in T&D costs and the market effects of curtailment. As indicated above, the generation station may be willing to divert generated power to the BTM load rather than supplying the grid due to changing market conditions, or during maintenance periods, or for other non-market conditions. Furthermore, in some situations, the BTM load may even be able to obtain and utilize BTM power from a generation station at no cost or even at negative pricing since the generation station may be receiving tax credits (e.g., Production Tax Credits) for produced wind or is slow to self-curtail.

Another example of cost-effective use of BTM power is when the generation station 202 is selling power to the grid at a negative price that is offset by a production tax credit. In certain circumstances, the value of the production tax credit may exceed the price the generation station 202 would have to pay to the grid power to offload generation's station 202 generated power. Advantageously, one or more flexible datacenters 220 may take the generated power behind-the-meter, thereby allowing the generation station 202 to produce and obtain the production tax credit, while selling less power to the grid at the negative price.

Another example of cost-effective behind-the-meter power is when the generation station 202 is selling power to the grid at a negative price because the grid is oversupplied and/or the generation station 202 is instructed to stand down and stop producing altogether. A grid operator may select and direct certain generation stations to go offline and stop supplying power to the grid. Advantageously, one or more flexible datacenters may be used to take power behind-the-meter, thereby allowing the generation station 202 to stop supplying power to the grid, but still stay online and make productive use of the power generated.

Another example of beneficial behind-the-meter power use is when the generation station 202 is producing power that is, with reference to the grid, unstable, out of phase, or at the wrong frequency, or the grid is already unstable, out of phase, or at the wrong frequency. A grid operator may select certain generation stations to go either offline and stop producing power, or to take corrective action with respect to the grid power stability, phase, or frequency. Advantageously, one or more flexible datacenters 220 may be used to selectively consume power behind-the-meter, thereby allowing the generation station 202 to stop providing power to the grid and/or provide corrective feedback to the grid.

Another example of beneficial behind-the-meter power use is that cost-effective behind-the-meter power availability may occur when the generation station 202 is starting up or testing. Individual equipment in the power generation equipment 210 may be routinely offline for installation, maintenance, and/or service and the individual units must be tested prior to coming online as part of overall power generation equipment 210. During such testing or maintenance time, one or more flexible datacenters may be intermittently powered by the one or more units of the power generation equipment 210 that are offline from the overall power generation equipment 210.

Another example of beneficial behind-the-meter power use is that datacenter control systems 216 at the flexible datacenters 220 may quickly ramp up and ramp down power consumption by computing systems in the flexible datacenters 220 based on power availability from the generation station 202. For instance, if the grid requires additional power and signals the demand via a higher local price for power, the generation station 202 can supply the grid with power nearly instantly by having active flexible datacenters 220 quickly ramp down and turn off computing systems (or switch to a stored energy source), thereby reducing an active BTM load.

Another example of beneficial behind-the-meter power use is in new photovoltaic generation stations 202. For example, it is common to design and build new photovoltaic generation stations with a surplus of power capacity to account for degradation in efficiency of the photovoltaic panels over the life of the generation stations. Excess power availability at the generation station can occur when there is excess local power generation and/or low grid demand. In high incident sunlight situations, a photovoltaic generation station 202 may generate more power than the intended capacity of generation station 202. In such situations, a photovoltaic generation station 202 may have to take steps to protect its equipment from damage, which may include taking one or more photovoltaic panels offline or shunting their voltage to dummy loads or the ground. Advantageously, one or more flexible datacenters (e.g., the flexible datacenters 220) may take power behind-the-meter at the Generations Station 202, thereby allowing the generation station 202 to operate the power generation equipment 210 within operating ranges while the flexible datacenters 220 receive BTM power without transmission or distribution costs.

Thus, for at least the reasons described herein, arrangements that involves providing a BTM load as an alternative option for a generation station to direct its generated power to can serve as a mutually beneficial relationship in which both the generation station and the BTM load can economically benefit. The above-noted examples of beneficial use of BTM power are merely exemplary and are not intended to limit the scope of what one of ordinary skill in the art would recognize as benefits to unutilized BTM power capacity, BTM power pricing, or BTM power consumption.

Within example embodiments described herein, various types of utility-scale power producers may operate as generation stations 202 that are capable of supplying power to one or more loads behind-the-meter. For instance, renewable energy sources (e.g., wind, solar, hydroelectric, wave, water current, tidal), fossil fuel power generation sources (coal, natural gas), and other types of power producers (e.g., nuclear power) may be positioned in an arrangement that enables the intermittent supply of generated power behind-the-meter to one or more BTM loads. One of ordinary skill in the art will recognize that the generation station 202 may vary based on an application or design in accordance with one or more example embodiments.

In addition, the particular arrangement (e.g., connections) between the generation station and one or more BTM loads can vary within examples. In one embodiment, a generation station may be positioned in an arrangement wherein the generation station selectively supplies power to the grid and/or to one or more BTM loads. As such, power cost-analysis and other factors (e.g., predicted weather conditions, contractual obligations, etc.) may be used by the generation station, a BTM load control system, a remote master control system, or some other system or enterprise, to selectively output power to either the grid or to one or more BTM loads in a manner that maximizes revenue to the generation station. In such an arrangement, the generation station may also be able to supply both the grid and one or more BTM loads simultaneously. In some instances, the arrangement may be configured to allow dynamic manipulation of the percentage of the overall generated power that is supplied to each option at a given time. For example, in some time periods, the generation station may supply no power to the BTM load.

In addition, the type of loads that are positioned behind-the-meter can vary within example embodiments. In general, a load that is behind-the-meter may correspond to any type of load capable of receiving and utilizing power behind-the-meter from a generation station. Some examples of loads include, but are not limited to, datacenters and electric vehicle (EV) charging stations.

Preferred BTM loads are loads that can be subject to intermittent power supply because BTM power may be available intermittently. In some instances, the generation station may generate power intermittently. For example, wind power station 102*c* and/or photovoltaic power station 102*d* may only generate power when resource are available or favorable. Additionally or alternatively, BTM power availability at a generation station may only be available intermittently due to power market fluctuations, power system conditions (e.g., power factor fluctuation or generation station startup and testing), and/or operational directives from grid operators or generation station operators.

Some example embodiments of BTM loads described herein involve using one or more computing systems to serve as a BTM load at a generation station. In particular, the computing system or computing systems may receive power behind-the-meter from the generation station to perform various computational operations, such as processing or storing information, performing calculations, mining for cryptocurrencies, supporting blockchain ledgers, and/or executing applications, etc. Multiple computing systems positioned behind-the-meter may operate as part of a "flexible" datacenter that is configured to operate only intermittently and to receive and utilize BTM power to carry out various computational operations similar to a traditional datacenter. In particular, the flexible datacenter may include computing systems and other components (e.g., support infrastructure, a control system) configured to utilize BTM power from one or more generation stations. The flexible datacenter may be configured to use particular load ramping abilities (e.g., quickly increase or decrease power usage) to effectively operate during intermittent periods of time when power is available from a generation station and supplied to the flexible datacenter behind-the-meter, such as during situations when supplying generated power to the grid is not favorable for the generation station. In some instances, the amount of power consumed by the computing systems at a flexible datacenter can be ramped up and down quickly, and potentially with high granularity (i.e., the load can be changed in small increments if desired). This may be done based on monitored power system conditions or other information analyses as discussed herein. As recited above, this can enable a generation station to avoid negative power market pricing and to respond quickly to grid directives. And by extension, the flexible datacenter may obtain BTM power at a price lower than the cost for power from the grid.

Various types of computing systems can provide granular behind-the-meter ramping. Preferably, the computing systems utilizing BTM power is utilized to perform computational tasks that are immune to, or not substantially hindered by, frequent interruptions or slow-downs in processing as the computing systems ramp down or up. In some embodiments, a control system may be used to activate or de-activate one or more computing systems in an array of computing systems sited behind the meter. For example, the control system may provide control instructions to one or more blockchain miners (e.g., a group of blockchain miners), including instructions for powering on or off, adjusting frequency of computing systems performing operations (e.g., adjusting the processing frequency), adjusting the quantity of operations being performed, and when to operate within a low power mode (if available).

Within examples, a control system may correspond to a specialized computing system or may be a computing system within a flexible datacenter serving in the role of the control system. The location of the control system can vary within examples as well. For instance, the control system may be located at a flexible datacenter or physically separate from the flexible datacenter. In some examples, the control system may be part of a network of control systems that manage computational operations, power consumption, and other aspects of a fleet of flexible datacenters.

Some embodiments may involve using one or more control systems to direct time-insensitive (e.g., interruptible) computational tasks to computational hardware, such as central processing units (CPUs) and graphics processing units (GPUs), sited behind the meter, while other hardware is sited in front of the meter (i.e., consuming metered grid power via a customer meter (e.g., 106*d*, 106*f*)) and possibly remote from the behind-the-meter hardware. As such, parallel computing processes, such as Monte Carlo simulations, batch processing of financial transactions, graphics rendering, machine learning, neural network processing, queued operations, and oil and gas field simulation models, are good candidates for such interruptible computational operations.

Figure 2:
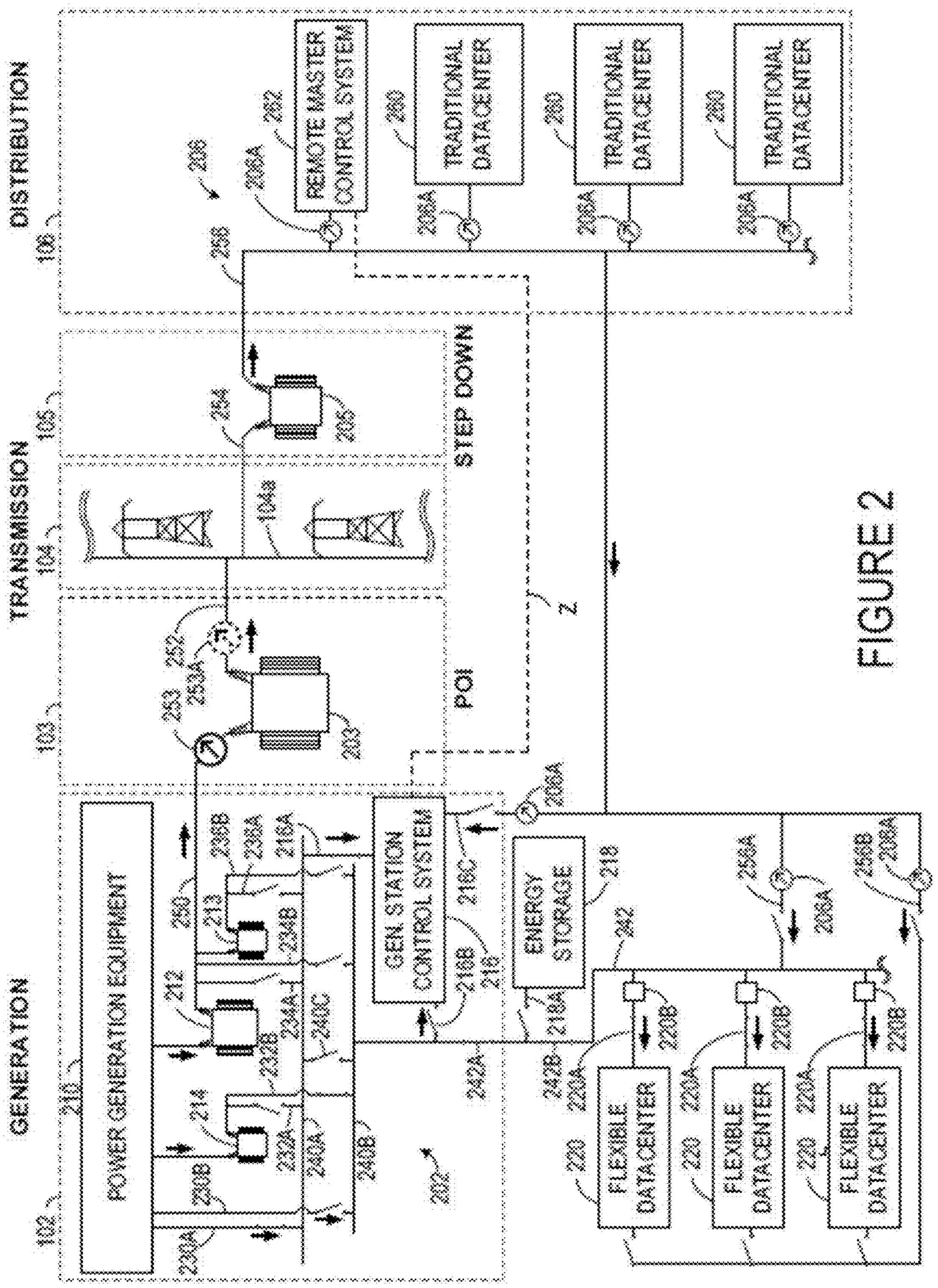
FIG. 2 shows a behind-the-meter arrangement, including one or more flexible datacenters, according to one or more example embodiments.

FIG. 2 shows a behind-the-meter arrangement, including one or more flexible datacenters, according to one or more example embodiments. Dark arrows illustrate a typical power delivery direction. Consistent with FIG. 1, the arrangement illustrates a generation station 202 in the generation segment 102 of a Wide-Area Synchronous Grid. The generation station 202 supplies utility-scale power (typically >50 MW) via a generation power connection 250 to the Point of Interconnection 103 between the generation station 202 and the rest of the grid. Typically, the power supplied on connection 250 may be at 34.5 kV AC, but it may be higher or lower. Depending on the voltage at connection 250 and the voltage at transmission lines 104*a*, a transformer system 203 may step up the power supplied from the generation station 202 to high voltage (e.g., 115 kV+AC) for transmission over connection 252 and onto transmission lines 104*a* of transmission segment 104. Grid power carried on the transmission segment 104 may be from generation station 202 as well as other generation stations (not shown). Also consistent with FIG. 1, grid power is consumed at one or more distribution networks, including example distribution network 206. Grid power may be taken from the transmission lines 104*a* via connector 254 and stepped down to distribution network voltages (e.g., typically 4 kV to 26 kV AC) and sent into the distribution networks, such as distribution network 206 via distribution line 256. The power on distribution line 256 may be further stepped down (not shown) before entering individual consumer facilities such as a remote master control system 262 and/or traditional datacenters 260 via customer meters 206A, which may correspond to customer meters 106*d* in FIG. 1, or customer meters 106*f* in FIG. 1 if the respective consumer facility includes a local customer power system, such as 106*e* (not shown in FIG. 2).

Consistent with FIG. 1, power entering the grid from generation station 202 is metered by a utility-scale generation-side meter. A utility-scale generation-side meter 253 is shown on the low side of transformer system 203 and an alternative location is shown as 253A on the high side of transformer system 203. Both locations may be considered settlement metering points for the generation station 202 at the POI 103. Alternatively, a utility-scale generation-side meter for the generation station 202 may be located at another location consistent with the descriptions of such meters provided herein.

Generation station 202 includes power generation equipment 210, which may include, as examples, wind turbines and/or photovoltaic panels. Power generation equipment 210 may further include other electrical equipment, including but not limited to switches, busses, collectors, inverters, power quality and conditioning equipment, and power unit transformers (e.g., transformers in wind turbines).

As illustrated in FIG. 2, generation station 202 is configured to connect with BTM equipment which may function as BTM loads. In the illustrated embodiment of FIG. 2, the BTM equipment includes flexible datacenters 220. Various configurations to supply BTM power to flexible datacenters 220 within the arrangement of FIG. 2 are described herein.

In one configuration, generated power may travel from the power generation equipment 210 over one or more connectors 230A, 230B to one or more electrical busses 240A, 240B, respectively. Each of the connectors 230A, 230B may be a switched connector such that power may be routed independently to 240A and/or 240B. For illustrative purposes only, connector 230B is shown with an open switch, and connector 230A is shown with a closed switch, but either or both may be reversed in some embodiments. Aspects of this configuration can be used in various embodiments when BTM power is supplied without significant power conversion to BTM loads.

In various configurations, the busses 240A and 240B may be separated by an open switch 240C or combined into a common bus by a closed switch 240C.

In another configuration, generated power may travel from the power generation equipment 210 to the high side of a local step-down transformer 214. The generated power may then travel from the low side of the local step-down transformer 214 over one or more connectors 232A, 232B to the one or more electrical busses 240A, 240B, respectively. Each of the connectors 232A, 232B may be a switched connector such that power may be routed independently to 240A and/or 240B. For illustrative purposes only, connector 232A is shown with an open switch, and connector 232B is shown with a closed switch, but either or both may be reversed in some embodiments. Aspects of this configuration can be used when it is preferable to connect BTM power to the power generation equipment 210, but the generated power must be stepped down prior to use at the BTM loads.

In another configuration, generated power may travel from the power generation equipment 210 to the low side of a local step-up transformer 212. The generated power may then travel from the high side of the local step-up transformer 212 over one or more connectors 234A, 234B to the one or more electrical busses 240A, 240B, respectively. Each of the connectors 234A, 234B may be a switched connector such that power may be routed independently to 240A and/or 240B. For illustrative purposes only, both connectors 234A, 234B are shown with open switches, but either or both may be closed in some embodiments. Aspects of this configuration can be used when it is preferable to connect BTM power to the outbound connector 250 or the high side of the local step-up transformer 212.

In another configuration, generated power may travel from the power generation equipment 210 to the low side of the local step-up transformer 212. The generated power may then travel from the high side of the local step-up transformer 212 to the high side of local step-down transformer 213. The generated power may then travel from the low side of the local step-down transformer 213 over one or more connectors 236A, 236B to the one or more electrical buses 240A, 240B, respectively. Each of the connectors 236A, 236B may be a switched connector such that power may be routed independently to 240A and/or 240B. For illustrative purposes only, both connectors 236A, 236B are shown with open switches, but either or both may be closed in some embodiments. Aspects of this configuration can be used when it is preferable to connect BTM power to the outbound connector 250 or the high side of the local step-up transformer 212, but the power must be stepped down prior to use at the BTM loads.

In one embodiment, power generated at the generation station 202 may be used to power a generation station control system 216 located at the generation station 202, when power is available. The generation station control system 216 may typically control the operation of the generation station 202. Generated power used at the generation station control system 216 may be supplied from bus 240A via connector 216A and/or from bus 240B via connector 216B. Each of the connectors 216A, 216B may be a switched connector such that power may be routed independently to 240A and/or 240B. While the generation station control system 216 can consume BTM power when powered via bus 240A or bus 240B, the BTM power taken by the generation station control system 216 is insignificant in terms of rendering an economic benefit. Further, the generation station control system 216 is not configured to operate intermittently, as it generally must remain always on. Further still, the generation station control system 216 does not have the ability to quickly ramp a BTM load up or down. In some instances, the generation station control system 216 may receive and use power from the electrical grid.

In another embodiment, grid power may alternatively or additionally be used to power the generation station control system 216. As illustrated here, metered grid power from a distribution network, such as distribution network 206 for simplicity of illustration purposes only, may be used to power generation station control system 216 over connector 216C. Connector 216C may be a switched connector so that metered grid power to the generation station control system 216 can be switched on or off as needed. More commonly, metered grid power would be delivered to the generation station control system 216 via a separate distribution network (not shown), and also over a switched connector. Any such grid power delivered to the generation station control system 216 is metered by a customer meter 206A and subject to T&D costs.

In another embodiment, when power generation equipment 210 is in an idle or off state and not generating power, grid power may backfeed into generation station 202 through POI 103 and such grid power may power the generation station control system 216.

In some configurations, an energy storage system 218 may be connected to the generation station 202 via connector 218A, which may be a switched connector. For illustrative purposes only, connector 218A is shown with an open switch but in some embodiments it may be closed. The energy storage system 218 may be connected to bus 240A and/or bus 240B and store energy produced by the power generation equipment 210. The energy storage system may also be isolated from generation station 202 by switch 242A. In times of need, such as when the power generation equipment in an idle or off state and not generating power, the energy storage system may feed power to, for example, the flexible datacenters 220. The energy storage system may also be isolated from the flexible datacenters 220 by switch 242B.

In a preferred embodiment, as illustrated, power generation equipment 210 supplies BTM power via connector 242 to flexible datacenters 220. The BTM power used by the flexible datacenters 220 was generated by the generation station 202 and did not pass through the POI 103 or utility-scale generation-side meter 253, and is not subject to T&D charges. Power received at the flexible datacenters 220 may be received through respective power input connectors 220A. Each of the respective connectors 220A may be a switched connector that can electrically isolate the respective flexible datacenter 220 from the connector 242. Power equipment 220B may be arranged between the flexible datacenters 220 and the connector 242. The power equipment 220B may include, but is not limited to, power conditioners, unit transformers, inverters, and isolation equipment. As illustrated, each flexible datacenter 220 may be served by a respective power equipment 220B. However, in another embodiment, one power equipment 220B may serve multiple flexible datacenter 220.

In one embodiment, flexible datacenters 220 may be considered BTM equipment located behind-the-meter and electrically connected to the power generation equipment 210 behind (i.e., prior to) the generation station's POI 103 with the rest of the electrical grid.

In one embodiment, BTM power produced by the power generation equipment 210 is utilized by the flexible datacenters 220 behind (i.e., prior to) the generation station's POI with an electrical grid.

In another embodiment, flexible datacenters 220 may be considered BTM equipment located behind-the-meter as the flexible datacenters 220 are electrically connected to the generation station 202, and generation station 202 is subject to metering by utility-scale generation-side meter 253 (or 253A, or another utility-scale generation-side meter), and the flexible datacenters 220 receive power from the generation station 202, but the power received by the flexible datacenters 220 from the generation station 202 has not passed through a utility-scale generation-side meter. In this embodiment, the utility-scale generation-side meter 253 (or 253A) for the generation station 202 is located at the generation station's 202 POI 103. In another embodiment, the utility-scale generation-side meter for the generation station 202 is at a location other than the POI for the generation station 202—for example, a substation (not shown) between the generation station 202 and the generation station's POI 103.

In another embodiment, power from the generation station 202 is supplied to the flexible datacenters 220 as BTM power, where power produced at the generation station 202 is subject to metering by utility-scale generation-side meter 253 (or 253A, or another utility-scale generation-side meter), but the BTM power supplied to the flexible datacenters 220 is utilized before being metered at the utility-scale generation-side meter 253 (or 253A, or another utility-scale generation-side meter). In this embodiment, the utility-scale generation-side meter 253 (or 253A) for the generation station 202 is located at the generation station's 202 POI 103. In another embodiment, the utility-scale generation-side meter for the generation station 202 is at a location other than the POI for the generation station 202—for example, a substation (not shown) between the generation station 202 and the generation station's POI 103.

In another embodiment, flexible datacenters 220 may be considered BTM equipment located behind-the-meter as they are electrically connected to the generation station 202 that supplies power to the grid, and the flexible datacenters 220 receive power from the generation station 202 that is not subject to T&D charges, but power otherwise received from the grid that is supplied by the generation station 202 is subject to T&D charges.

In another embodiment, power from the generation station 202 is supplied to the flexible datacenters 220 as BTM power, where electrical power is generated at the generation station 202 that supplies power to a grid, and the generated power is not subject to T&D charges before being used by flexible datacenters 220, but power otherwise received from the connected grid is subject to T&D charges.

In another embodiment, flexible datacenters 220 may be considered BTM equipment located behind-the-meter because they receive power generated from the generation station 202 intended for the grid, and that received power is not routed through the electrical grid before being delivered to the flexible datacenters 220.

In another embodiment, power from the generation station 202 is supplied to the flexible datacenters 220 as BTM power, where electrical power is generated at the generation station 202 for distribution to the grid, and the flexible datacenters 220 receive that power, and that received power is not routed through the electrical grid before being delivered to the flexible datacenters 220.

In another embodiment, metered grid power may alternatively or additionally be used to power one or more of the flexible datacenters 220, or a portion within one or more of the flexible datacenters 220. As illustrated here for simplicity, metered grid power from a distribution network, such as distribution network 206, may be used to power one or more flexible datacenters 220 over connector 256A and/or 256B. Each of connector 256A and/or 256B may be a switched connector so that metered grid power to the flexible datacenters 220 can be switched on or off as needed. More commonly, metered grid power would be delivered to the flexible datacenters 220 via a separate distribution network (not shown), and also over switched connectors. In some instances, grid power may be distributed to the flexible datacenters 220 via a backfeed process that involves measuring the amount of grid power via a subtraction meter. Any such grid power delivered to the flexible datacenters 220 is metered by customer meters 206A and subject to T&D costs. In one embodiment, connector 256B may supply metered grid power to a portion of one or more flexible datacenters 220. For example, connector 256B may supply metered grid power to control and/or communication systems for the flexible datacenters 220 that need constant power and cannot be subject to intermittent BTM power. Connector 242 may supply solely BTM power from the generation station 202 to high power demand computing systems within the flexible datacenters 220, in which case at least a portion of each flexible datacenters 220 so connected is operating as a BTM load. In another embodiment, connector 256A and/or 256B may supply all power used at one or more of the flexible datacenters 220, in which case each of the flexible datacenters 220 so connected would not be operating as a BTM load.

In another embodiment, when power generation equipment 210 is in an idle or off state and not generating power, grid power may backfeed into generation station 202 through POI 103 and such grid power may power the flexible datacenters 220. Backfeed may enable power generation equipment 210 to maintain a safe state using minimal backfed power until operations resume at the power generation equipment 210.

The flexible datacenters 220 are shown in an example arrangement relative to the generation station 202. Particularly, generated power from the generation station 202 may be supplied to the flexible datacenters 220 through a series of connectors and/or busses (e.g., 232B, 240B, 242, 220A). As illustrated, in other embodiments, connectors between the power generation equipment 210 and other components may be switched open or closed, allowing other pathways for power transfer between the power generation equipment 210 and components, including the flexible datacenters 220. Additionally, the connector arrangement shown is illustrative only and other circuit arrangements are contemplated within the scope of supplying BTM power to a BTM load at generation station 202. For example, there may be more or fewer transformers, or one or more of transformers 212, 213, 214 may be transformer systems with multiple steppings and/or may include additional power equipment including but not limited to power conditioners, filters, switches, inverters, and/or AC/DC-DC/AC isolators. As another example, metered grid power connections to flexible datacenters 220 are shown via both 256A and 256B; however, a single connection may connect one or more flexible datacenters 220 (or power equipment 220B) to metered grid power and the one or more flexible datacenters 220 (or power equipment 220B) may include switching apparatus to direct BTM power and/or metered grid power to control systems 216, communication systems, and/or computing systems as desired.

In some examples, BTM power may arrive at the flexible datacenters 220 in a three-phase AC format. As such, power equipment (e.g., power equipment 220B) at one or more of the flexible datacenters 220 may enable each flexible datacenter 220 to use one or more phases of the power. For instance, the flexible datacenters 220 may utilize power equipment (e.g., power equipment 220B, or alternatively or additionally power equipment that is part of the flexible datacenter 220) to convert BTM power received from the generation station 202 for use at computing systems at each flexible datacenter 220. In other examples, the BTM power may arrive at one or more of the flexible datacenters 220 as DC power. As such, the flexible datacenters 220 may use the DC power to power computing systems. In some such examples, the DC power may be routed through a DC-to-DC converter that is part of power equipment 220B and/or flexibles datacenter 220.

In some configurations, a flexible datacenter 220 may be arranged to only have access to power received behind-the-meter from a generation station 202. In the arrangement of FIG. 2, the flexible datacenters 220 may be arranged only with a connection to the generation station 202 and depend solely on power received behind-the-meter from the generation station 202. Alternatively or additionally, the flexible datacenters 220 may receive power from energy storage system 218.

In some configurations, one or more of the flexible datacenters 220 can be arranged to have connections to multiple sources that are capable of supplying power to a flexible datacenter 220. To illustrate a first example, the flexible datacenters 220 are shown connected to connector 242, which can be connected or disconnected via switches to the energy storage system 218 via connector 218A, the generation station 202 via bus 240B, and grid power via metered connector 256A. In one embodiment, the flexible datacenters 220 may selectively use power received behind-the-meter from the generation station 202, stored power supplied by the energy storage system 218, and/or grid power. For instance, flexible datacenters 220 may use power stored in the energy storage system 218 when costs for using power supplied behind-the-meter from the generation station 202 are disadvantageous. By having access to the energy storage system 218 available, the flexible datacenters 220 may use the stored power and allow the generation station 202 to subsequently refill the energy storage system 218 when cost for power behind-the-meter is low. Alternatively, the flexible datacenters 220 may use power from multiple sources simultaneously to power different components (e.g., a first set and a second set of computing systems). Thus, the flexible datacenters 220 may leverage the multiple connections in a manner that can reduce the cost for power used by the computing systems at the flexible datacenters 220. The flexible datacenters 220 control system 216 or the remote master control system 262 may monitor power conditions and other factors to determine whether the flexible datacenters 220 should use power from either the generation station 202, grid power, the energy storage system 218, none of the sources, or a subset of sources during a given time range. Other arrangements are possible as well. For example, the arrangement of FIG. 2 illustrates each flexible datacenter 220 as connected via a single connector 242 to energy storage system 218, generation station 202, and metered grid power via 256A. However, one or more flexible datacenters 220 may have independent switched connections to each energy source, allowing the one or more flexible datacenters 220 to operate from different energy sources than other flexible datacenters 220 at the same time.

The selection of which power source to use at a flexible datacenter (e.g., the flexible datacenters 220) or another type of BTM load can change based on various factors, such as the cost and availability of power from both sources, the type of computing systems using the power at the flexible datacenters 220 (e.g., some systems may require a reliable source of power for a long period), the nature of the computational operations being performed at the flexible datacenters 220 (e.g., a high priority task may require immediate completion regardless of cost), and temperature and weather conditions, among other possible factors. As such, a datacenter control system 216 at the flexible datacenters 220, the remote master control system 262, or another entity (e.g., an operator at the generation station 202) may also influence and/or determine the source of power that the flexible datacenters 220 use at a given time to complete computational operations.

In some example embodiments, the flexible datacenters 220 may use power from the different sources to serve different purposes. For example, the flexible datacenters 220 may use metered power from grid power to power one or more systems at the flexible datacenters 220 that are configured to be always-on (or almost always on), such as a control and/or communication system and/or one or more computing systems (e.g., a set of computing systems performing highly important computational operations). The flexible datacenters 220 may use BTM power to power other components within the flexible datacenters 220, such as one or more computing systems that perform less critical computational operations.

In some examples, one or more flexible datacenters 220 may be deployed at the generation station 202. In other examples, flexible datacenters 220 may be deployed at a location geographically remote from the generation station 202, while still maintaining a BTM power connection to the generation station 202.

In another example arrangement, the generation station 202 may be connected to a first BTM load (e.g., a flexible datacenter 220) and may supply power to additional BTM loads via connections between the first BTM load and the additional BTM loads (e.g., a connection between a flexible datacenter 220 and another flexible datacenter 220).

The arrangement in FIG. 2, and components included therein, are for non-limiting illustration purposes and other arrangements are contemplated in examples. For instance, in another example embodiment, the arrangement of FIG. 2 may include more or fewer components, such as more BTM loads, different connections between power sources and loads, and/or a different number of datacenters. In addition, some examples may involve one or more components within the arrangement of FIG. 2 being combined or further divided.

Within the arrangement of FIG. 2, a control system 216, such as the remote master control system 262 or another component (e.g., a control system 216 associated with the grid operator, the generation station control system 216, or a datacenter control system 216 associated with a traditional datacenter or one or more flexible datacenters) may use information to efficiently manage various operations of some of the components within the arrangement of FIG. 2. For example, the remote master control system 262 or another component may manage distribution and execution of computational operations at one or more traditional datacenters 260 and/or flexible datacenters 220 via one or more information-processing algorithms. These algorithms may utilize past and current information in real-time to manage operations of the different components. These algorithms may also make some predictions based on past trends and information analysis. In some examples, multiple computing systems may operate as a network to process information.

Turning now to FIGS. 8-11, a site with a plurality of computing systems that establish one or more datacenters may be configured to receive electrical power for operation of the computer systems directly from one or more power generation stations 210, such that the power received is BTM power as discussed above. Alternatively, the plurality of computing systems may be configured to receive power from an electrical grid 106. Still alternatively, the plurality of computing systems may be configured to receive power from either of one or more power generation stations 210 or the electrical grid.

The plurality of computing systems, may be controlled by the remote master control system 262, which is sometimes referred to as the Network Operations Center (NOC). The remote master control system 262 may be in communication with each of the plurality of computing systems individually, or in other embodiments with a control system that is directly associated with the plurality of computing systems. Still alternatively, the remote master control system 262 may be in communication with multiple independent control system, each of which are associated with different subsets of plurality of computing systems. Alternatively, for computing systems that receive BTM power, the control system may be a local control system such as a generation station control system or a dedicated control system for one or more flexible datacenters. For the sake of brevity, the respective control system that operates the datacenter (which is one or more of the datacenters or flexible datacenters described above) will be referred to herein as a control system 216 (which can the relevant control system 216 or 262 depicted on FIG. 2)—and one of ordinary skill will readily comprehend the type of control system used with a thorough review and understanding of this specification.

The plurality of computing systems may be disposed at a single site, some of the plurality of computing systems may be disposed at different sites. The control system 216 may control the plurality of computing systems all disposed at the same site or at differing sites. Differing sites may be different enclosures that are disposed proximate to each other (such that environmental factors—temperature, humidity, barometric pressure, wind speed and direction) would occur simultaneously at differing sites, or in other embodiments, differing sites may be disposed a distance away from each other such that one or more of the environmental factors for each site may be different in some respect (at least at a single time instance when the environmental factors are identified by sensors 903 (discussed below) that are disposed at each site.

The control system 216 may be in communication with various entities, depending upon the configuration of the plurality of computing systems. For example, when the computing systems are configured to receive power from a grid, the control system 216 is configured to be in communication with the grid—either with the grid operator directly, or in some embodiments with a QSE (Qualified Scheduling Entity), i.e. a party that operates on behalf of the grid operator to receive information from outside entities, such as resource entities (RE) or load serving entities (LSE), which often are retail electric providers (REP). Alternatively, when the computing systems are configured to receive power directly from a power generator, i.e. when the computing systems received BTM power directly from a power generator, the remote master control system 262 communicates directly with the power generator.

Grid operators typically require that entities that supply or use power from a grid to supply the grid operator (either directly or via a QSE) with information about the power that they can provide to the grid during future periods, typically during the next day, the grid operators also typically require that the entities that provide various ancillary services provide the grid operator with, for example, an amount of power that they can use in future periods. This information allows the grid operator to ensure that the grid will reliably have sufficient power available in the future period for the anticipated power demand, and for the grid operator to ensure that during times where there is excess power generated over the anticipated power demanded there are adequate loads available to use excess power generated.

Similarly, in situations where a plurality of computing systems are configured to receive power directly from a power generation system, the power generation system may require that the computing systems provide the power generation system with the amount of BTM power that it can receive during the future period.

The information that is typically required from a load (e.g. the plurality of computing systems) is the maximum power that is anticipated to be used by the load in the upcoming time period, which may be referred to as the MPC—maximum power consumption. This MPC is typically the maximum power that can be used by the load over the upcoming time period with the load operating at steady state. The MPC may be calculated by the control system 216, which calculates the MPC for the entire set of computing systems. Alternatively, the plurality of computing systems may be divided into two or more subsets of computing systems, such as multiple subsets that are enclosed within differing enclosures in the same or different locations.

The embodiments where the load operates as an ancillary service to the grid, the grid (either directly or via a QSE) may provide payment to the load in exchange for the load's agreement to operate during the upcoming time period based upon instructions from the grid/QSE, such as to reduce power if instructed to do so by the grid/QSE (often within a certain period of time within receipt of the instructions) or to change the power at which the load is operating based upon certain operating conditions—e.g. reduce power consumed by the load if the frequency upon the grid lowers to a certain level blow a nominal frequency setpoint.

Similarly, when a load is directly connected to a power producer, the power producer may provide payments to the load (or perhaps offer rebates for the cost of power provided by the power producer) in exchange for the load's agreement to modify the load's power level based upon instructions received from a power producer.

In the above circumstances, the load provides the power provider (either the grid, or the power producer for BTM power) with the MPC that the load can accept during the next future time period. The next future time period may be the next 24 hour day (day ahead market), which is sometimes a calendar-based 24 hour day and must be provided by a fixed time before the next calendar 24 hour day such as by 15:00 or 16:00 hours on the day prior. In other embodiments, the next future time period may be a future 12 hour period, a future 8 hour period, a future hour period, or other time periods. Similarly, in circumstances where the load receives BTM power from a power generator, the load may provide its MPC to the power generator for future time periods, in advance of those time periods.

In addition to providing the MPC, the load may also provide its Low Power Consumption ("LPC"), which is the amount of power required to maintain the plurality of computing systems operating (not including the power needed for the computing systems to perform any useful computational tasks). The LPC is the power needed to run the plurality of computing systems so that they are available to perform computational tasks, including power of supporting equipment needed to be in operation to allow the computing systems to be in operation, such as power to operate needed environmental equipment to support the computing systems (e.g. power to operate an HVAC system, a fire prevention system, and the like) as well as power to operate the control systems 216 needed to distribute computational tasks stored for future operation or received in real time amongst all of the computing systems within the plurality, and based upon the operational status of each computing system within the plurality.

Finally, the plurality of computing systems must determine the volume of computational tasks that the computing systems can run during a given period of time, i.e. to the maximum level of sustained computing ability (as limited by either the processing capacity of the processors of each of the computing systems of each of the computing systems, or possibly as limited by the capacity of the firmware or software installed within each of the plurality of computing systems within the plurality), and the corresponding amount of electrical power that is required to operate the computing systems within the plurality up to this limit. This amount of calculated power is called the full power consumption (FPC) and is an amount of power used by the computing systems that is in addition to the LPC needed to operate the computing systems so that the computing systems are available to perform computational tasks. The computational tasks that may be performed by the computing systems may be tasks such as data storage, calculations, application processing, parallel processing, data manipulation, cryptocurrency mining, and maintenance of a distributed ledger, as discussed herein. The MPC that is calculated and reported as discussed above, is the sum of the FPC and the LPC. As discussed herein, because the MPC may change during a time period, a load may calculate its MPC and before reporting the MPC for the future time period, may adjust the MPC upward by a certain amount or by a certain percentage to take into account future fluctuations, as long as the adjusted MPC remains at or below the highest possible power needed to operate the computing systems that will be available during the upcoming future period at the upper capacity of the plurality of computing systems to perform computational tasks (in addition to the highest power level needed for LPC). This adjusted MPC may be reported to the grid (by way of QSE) or to the power generator as appropriate.

In some embodiments, control system 216 may calculate the current MPC of the plurality of computing systems, during operation, continuously, or periodically with relatively short future time periods. As discussed above, the control system 216 may calculate the MPC for the entire plurality of computing systems, or it may receive calculated MPCs for several different subsets of computing systems and combine them.

The control system 216 monitors the actual power consumption for the plurality of computing systems and compares the actual power consumption to the MPC that was communicated previously to the grid/QSE or the generation system as the case may be.

If the control system 216 calculates that actual power is greater than MPC, the control system 216 directs the operation of one or more of the plurality of computing systems to reduce the actual power consumed to the MPC or to a level that is below MPC.

When the control system 216 reduces power consumption of the one or more computing systems, the control system 216 may instruct one or more computing systems for perform less computations, which will reduce the activity of the processors of those computing systems, thereby causing those computing systems to draw less current. Alternatively or additionally, control system 216 may cause one or some of the computing systems to discontinue performing any computations and either remain at an idle state or completely power down the computing systems. These instructions cause the plurality of computing systems combined to use less power for computational activity (thereby reducing the FPC of the computing systems). In embodiments where some of the computing systems are idled or powered down, the LPC may also decrease both due to the computing systems using less current to remain powered (some shut down) or due to being transferred to an idle state, as well as possibly a reduced need for HVAC or other cooling methods to cool the plurality of computing systems.

After the operation of the plurality of computing systems have been modified as discussed above, the control system 216 calculates the power use of the plurality of computing systems and determines a difference between the previously communicated MPC and the current power draw, with the difference between a reduced power consumption (RPC), which is a function of the reduced volume of calculations performed as well as in some circumstances a reduction in LPC needed to operate the computing systems. In situations where the remote master control system 216 identifies an RPC, the previously calculated and previously report MPC is modified by the amount of the RPC (Modified MPC) and the Modified MPC is reported to the grid/QSE or the power generator as appropriate.

In some circumstances environmental factors, such as a different temperature in the environments that each enclose one or more computing systems may cause the amount of powered used to change for a given schedule of computational operations.

The actual power used differs from the MPC that was previously calculated and reported for various possible factors, which may result in changes in to the LPC (only) or changes to both the LPC as well as the power needed by the plurality of computing systems to perform the computational tasks that were assigned by the control system 216 in order to result in the MPC that was calculated.

Possible factors that may affect the LPC are the number of computing systems that are operating to use the electrical power to satisfy the award, the power state of each of the computing systems within the plurality of computing systems that are operating—i.e. whether some computing systems are operating at full capacity, or some of the computing systems are operating at idle—i.e. the specific computing system is not needed to operate above its idle state to satisfy the award), the temperature within each environment that houses one or more of the plurality of computing systems.

Further, as can be understood, material properties of components that form computing systems may change significantly as the temperature of those components change, which results in a change the amount of electricity that is used by the computing system to operate, both in idle state and in a state where the computing system performs quantitative tasks. Accordingly, as the temperature surrounding an environment that houses one or more computing systems within a datacenter changes, the temperature within the environment also may change and the electrical power needed to operate the computing system also changes, such that at higher environmental temperatures, the electrical power needed to operate the computing systems also increases. One of ordinary skill in the art with a thorough review and understanding of this specification would be able to determine without undue experimentation and only routine measurement and evaluation techniques, for each specific computing system of the plurality of computing systems, and with known processing power needed to run on a known firmware for the computing system, a correlation between a change in electrical power needed to power each specific computing system based changes in temperature that are within a range of possible environmental temperatures for operation, and at various levels of operation of the computing systems (i.e. at idle, at 10% computing capacity, at 50% percent computing capacity, at 75% computing capacity, at 95% computing capacity, and at 100% computing capacity—other levels are possible). One of ordinary skill in the art can determine the power requirements for the specific computing system and the entire plurality of computing systems for different temperatures at different computational levels and save those within the non-volatile memory of the control system 216 for use in predicting future power requires, as discussed below, as well as to calculate expected realtime power levels with emergent changes, as also discussed below. In some embodiments, the control system 216 may be capable of identifying the firmware associated with each computing system and update its stored correlations based upon updates to the firmware associated with each computing system. With this information correlated and saved, the control system 216 can, depending upon which computing systems are currently operating in order to attempt to maintain an MPC, and depending upon the changes to one or more specific computing systems in order to modify the power used due to various changes, as discussed below, identify the amount of power use that is increased or decreased with those changes (RPC, as discussed below).

One or more sensors 901 (FIG. 6A) may be used to monitor the temperature, and/or other parameters such as humidity or barometric pressure within the one or more environments 902 where the plurality of computing systems reside, with the monitored temperature received by the control system 216. Similarly, one or more sensors 903 may measure one or more of the temperature, humidity, and/or barometric pressure just outside of the environment. If a temperature change is noted the control system 216 determines based upon the previously determined temperature/power data discussed above the contribution that the change in temperature makes to the power used by the plurality of computing systems. If the temperature rises the energy needed to perform the scheduled computational tasks similarly rises, which may put the total power used above MPC. In this situation, the control system 216 takes action as discussed above to reduce the operation of one or more of the plurality of computing systems to reduce the total power used to MPC. As discussed above, the actions to reduce the operation may also cause LPC to decrease. After the actions have been taken, the control system 216 measures the power draw reduction, which is considered to be the RPC. After the computational tasks have been reduced and/or some of the computing systems have been reduced in operation, or returned to idle, or powered down (or a combination of all three for various computing systems within the plurality), the control system 216 calculates a modified MPC, that equals to the previous MPC as modified by the RPC. In the situation above, the modified MPC is greater than the previously identified MPC—meaning that the computing systems could take on a greater load than the MPC previously reported. The control system 216 may then report the now higher MPC to the grid/QSE or power generator. When reporting MPC or other information to the grid/QSE or power generator as discussed within this specification, the data may be communicated via a telemetry system. Alternatively or additionally, the data may be reported by various wired or wireless data communication technologies known in the art, such as WiFi, Bluetooth, or various wired communication systems, including the internet.

In other situations, such as when the temperature decreases (thereby causing the power needed to run the plurality of computing systems for the same computational tasks to decrease), or in situations where some of the plurality of computing systems go off line (for needed maintenance, or the like) the amount of power that the computing systems use will be lower than the previously communicated MPC. In this instance, the control system 216 may revise the scheduled computational tasks to increase the power usage of the remaining computing systems that are operating if those computing systems are operating below the limits of their processor. If the plurality of computing systems are restored to operating at MPC the system continues to be operated in this manner. In circumstances where the decrease in power usage cannot be brought up to the previously communicated MPC, the system determines a negative RPC (reduction in power used) and the system communicates the now lower MPC to the grid/QSE or power generator.

In some embodiments, the control system 216 may monitor predicted future weather for the location where the environments (902, FIG. 6A, which may be a building, a trailer, or other structure) that enclose the plurality of computing systems are located. In some embodiments, when the control system 216 receives a weather forecast of increased temperature for the location where the environment is located the control system 216 determines whether there would be an increase in LPC or FPC if the computing systems would need to operate in steady state at the increased temperature (using the data gathered regarding the effects of temperature on the plurality of computing systems as discussed herein). In some embodiments, the control system 216 may based upon received predicted future weather received for the environments where the computing systems are located (within enclosures) in first and second consecutive future time periods (or in other embodiments more than two consecutive future time periods). If there would be an increase in LPC, the control system 216 would adjust both the LPC and FPC for the first and second future time periods (and further time periods as warranted).

The control system 216 then calculates the predicted MPC for the plurality of computing systems for the first and second future time periods (and other time periods as warranted), and reports the calculated MPCs to the grid/QSE or power generator for the first and second (or additional) future time periods.

As with the examples discussed above and elsewhere herein, the calculated LPC and FPC may be initially calculated independently for each computing system within the plurality of computing systems, and the calculation may be using the correlation between power usage and temperature for the various levels of operation in comparison to the computing capacity as discussed above. Upon calculation of the LPC and FPC for each computing system, the control system 216 then calculates the total LPC and FPC for all of the computing systems currently operating to determine the expected future LPC and FPC for various future time periods as discussed above. The control system 216 then reports the expected LPC and FPC (which may be reported as the future MPC—which is a sum of LPC and FPC) for the future time periods to either the grid/QSE or to the power generator.

In some embodiments, the control system 216 may identify a currently rapidly changing temperature or other weather parameter (humidity, barometric pressure, wind speed or direction)—either due to receipt of data of the current weather received from a weather reporting provider—or based upon data received from one or more sensors 903 that are disposed outside of the enclosures—that that is occurring at the location where the environment(s) that enclose(s) the one or more computing systems. The control system 216 then calculates the change to the LPC and FPC for the operation of the plurality of computing systems based upon the current weather parameter change and based upon the currently assigned computational tasks for each of the plurality of computing systems. In this embodiment, the control system 216 may also monitor signals from one or more sensors 902 that monitor temperature within the one or more environments to determine whether the actual temperature of the computing systems has changed along with the change in the weather parameter associated with the area where the environment is located. The control system 216 then reports the changed MPC (equal to the current LPC plus FPC due to the changed weather) to the grid/QSE or power generator.

In some embodiments, if the previous MPC was based upon a full computational capacity of the plurality of computing systems at the predicted environmental temperature, if the weather change causes the current power being consumed by the operating computing systems to decrease below the previously reported MPC, the control system 216 may distribute further computational tasks to one or more of the computing systems (assuming that those computing systems have processor capacity to handle further computational tasks) to increase the FPC of those computing systems to attempt to increase the current power consumption to or toward the previously reported MPC.

In some embodiments, the control system 216 may identify that one or more computing systems is unable to continue performing any computational tasks or is unable to continue performing all previously assigned computational tasks, and therefore the power consumed by that computing system (or plurality of computing systems) reduces, either to zero if the equipment is shut down, or to a lower value if the computing system is idled or must operate at a lower computational volume or speed. The control system 216 then calculates the change to the LPC and FPC for the operation of the plurality of computing systems based upon the reduced operation of the one or more computing systems and calculates the changed LPC (if any, such as if any of the computing systems are completely shut down) and the changed FPC due to the reduction of or elimination of computational tasks performed by the one or more computing systems. The control system 216 then calculates the changed total LPC and FPC. The control system 216 may assess whether any of the remaining computing systems have bandwidth to accept further computational tasks, and if so, the control system 216 reassigns computational tasks as possible to those remaining computing systems to restore to the full FPC or a partial FPC as possible. Depending upon the amount of FPC that could be restored (if any) based upon this reassignment, the control system 216 determines the new current LPC and FPC and if the current MPC has changed from the current MPC (that was previously communicated and is effective for the current period) the control system 216 communicates the new MPC to the grid/QSE or power generator system.

In other embodiments, the control system 216 monitors the operation of the plurality of computing systems, including the amount of power used by each computing system within the plurality as well as status and completion of the computational tasks that each computing system is performing. In some circumstances, the control system 216 may identify that a specific computing system within the plurality (or a group within the plurality) needs to either be reduced to idle operation or shut down, or taken to an operational state where the computing system is not performing computational tasks, such as to perform maintenance or updates to the computing system. In that circumstance, the control system 216 determines whether computational tasks for the computing systems that need to be reduced or eliminated can be redistributed to other computing systems that will continue in operation and if this is possible the control system 216 reassigns the computational tasks. The control system 216 then determines a new LPC (if any) and the new FPC for the operational arrangement with one or more of the plurality of computing systems either shut down or reduced in power or set to idle) and reports this new MPC to the grid/QSE or power generator.

As can be easily understood, the opposite of the above paragraph is also performed by the control system 216 when computing systems that were previously idle, previously powered down, or previously were undergoing maintenance when a previously calculated future MPC was reported, are brought back online to be available to perform computational tasks. Returning the computing systems to perform computational tasks may increase the LPC due to the restored or increased operation of those computing systems, and the overall FPC will increase due to the additional power consumption available with the computational processing of this returned computing system. In this instance, the control system 216 calculates a newly revised increased MPC and communicates the new MPC to the grid/QSE or to the power generator.

In other embodiments, the system may operate the plurality of computing systems as follows. The control system 216, based upon a current temperature (or a predicted future temperature) and the number and type (including firmware type for each computing system) of computing systems that are available for performing computational tasks and to receive power from a power source (either from the grid, or BTM power directly from a power generator) calculates a LPC for the plurality of computing systems as well as an FPC with each computing system of the plurality operating at steady state with full computational operation, which is based upon temperature of the environment (as maintained by the associated environmental (HVAC, etc.) of the environments where the computing systems are located, as well as other factors. The control system 216 reports this initial MPC to the grid/QSE or the power generator.

At the start of the previously reported time period, the control system 216 causes the plurality of computing systems to operate as reported at steady state. If needed, such as for potential reasons discussed above, the control system 216 actively reduces the power consumption of one or more of the plurality of computing systems, such as by shutting down, reducing to idle, or reducing the processor operator to less than maximum operations which will cause the LPC and/or FPC of the plurality of computing systems to decrease. The control system 216 identifies the decrease in MPC that is based at least in part on the reduced power consumption of the one or more computing systems and reports the reduced MPC. If possible, the control system 216 redistributes the some or all of the computational tasks that were previously scheduled for the computing systems that have been altered to computing systems that remain operational and the control system 216 determines an intermediate MPC, which is reported. As the computing systems continue to operate in this modified set-up the power consumption of the computing systems with increased computing tasks may increase to an increased level that establishes a new steady-state MPC, which is reported.

In some situations the control system 216 may receive a signal or instruction (operational directive—which may be received directly from a grid operator, a scheduling entity (QSE) or a power generator when the power used by the system is BTM power) that requires that the total amount of power used by the computing systems to be decreased. This situation may be caused by a specific instruction from the grid/QSE or the power generator to reduce the power that is used by the system. Alternatively, the control system 216 may note that the frequency of the electrical power received from the grid or the power generator has decreased below a threshold value that is indicative of the grid or power generator having difficulty managing the total load required of the grid or the generational requirements of the power generator. In these situations, the control system 216 acts to reduce the amount of power used by the plurality of computing systems as discussed above.

When in the above situation, upon identification of a need to reduce power consumed, the control system 216 may immediately reduce the operations of the plurality of computing systems to decrease the initial MPC by a fixed amount. After the initial modification of the operation of the plurality of computing systems, and after determining the reduced current MPC (reduced MPC) (which may be reported), the control system 216 may then assess whether power usage can be increased and establish a plan to distribute computational activities to increase the power consumption of some or all of the computing systems to new power level (intermediate MPC) that is within the received operational directive or the allowed parameters (i.e. allowed load when frequency of the power received). The controller reports the intermediate MPC. The controller then causes the plurality of computing systems to begin operating with the scheduled computational tasks of the intermediate MPC. As the computing systems operate the temperatures of the components increase, which further increases the power used by the systems until a new steady-state MPC is reached. The control system 216 reports that the new steady-state MPC has been reached. In situations where the reduction in power was not based upon receipt of an operational directive—or in situations where a received operational directive has been withdrawn, or in situations where the reduction in power was due an indication that the power may not be available (e.g. lowered frequency of power received by system) but the operational directive or when no further reduction in power is necessary) the controller can operate the plurality of computing systems so that the new steady-state MPC equals the previous MPC (before the power reduction was implemented). In other situations the new steady-state MPC may be at an acceptable power level but below the previous MPC.

Several methods related to managing power of datacenters and of reporting the ability to receive power from a supplier of power are provided. Generally, the methods are performed by a control system 216, which may be a control system 216 that specifically operates one or more datacenters, which may be flexible datacenters 220 or datacenters that are configured to received power from an electrical grid. Alternatively the datacenter may be capable of selectively receiving power from either the power generator directly (BTM power) or to receive power from a grid. In some embodiments the methods can be performed by a control system 216 that also controls the operation of the power generation station 102 (or assists in the control of the power generation station, or provides inputs or instructions to the control of the power generation station 102). The control system 216 is in communication with grid or a grid dispatching system (QSE), which coordinates the receipt of power from one or more power generation systems and the usage of the power from the grid from the grid's customers. Further, the methods below can be performed by a control system 216 for a datacenter that receives power to operate from an electrical grid.

Figure 8:
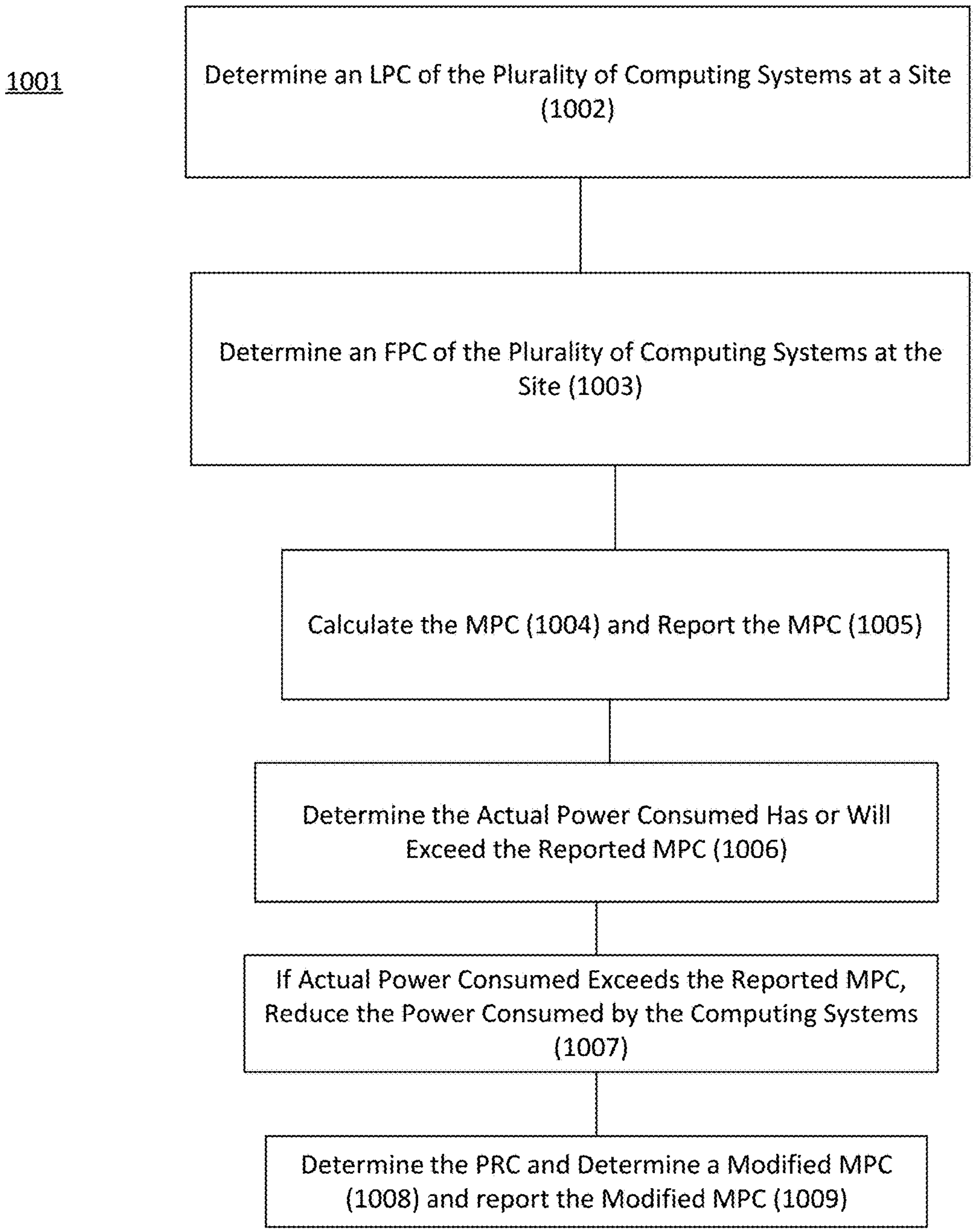
FIG. 8 is a flowchart of a method of dynamically updating a reported maximum power consumption for a site with a plurality of computing systems.

As depicted in FIG. 8, a method (1001) of dynamically updating a reported maximum power consumption for site with a plurality of computing systems. The method includes determining a low power consumption ("LPC") based at least in part on a minimum power consumption of the plurality of computing systems at the site and a power consumption of supporting equipment is provided (1002). In some embodiments of the method, the supporting equipment (such as computing/controlling equipment, HVAC equipment, fire suppression equipment, and the like) is co-located at the site and supports operation of the plurality of computing systems. The method includes the step of determining a full power consumption ("FPC") based at least in part on a power consumption of the plurality of computing systems when operating at full power (1003). The maximum power consumption (MPC) is determined, which is at least the sum of the determined LPC and FPC (1003), and the MPC is reported (1004). The MPC is reported to the entity that is providing power to the datacenter, such as the grid or QSE or the power generation station. The next step is determining whether the actual power consumption by the datacenter, which includes one or more pluralities of computing systems) at the site (which can include a single location or multiple locations) exceeds or will exceed the MPC that was reported (1006). If the actual power consumption exceeds the reported MPC, the power consumed by the one or more computing systems is reduced (1007) in order to maintain the actual power consumption at or below the MPC. Determine the amount of reduction of power consumption (RPC) and then determine a modified MPC based upon the RPC (1008) and report the modified MPC (1009).

In some embodiments the initially calculated MPC includes the sum of the LPC and the FPC and an initial amount of power to be received. The additional amount may be within a range of about 1% to about 10% of the sum of LPC and FPC, inclusive of the bounds of this range and all values within the range, such as about 2%, 4%, 6%, and 8%. The term "about" is defined herein to include the reference value as well as a range of plus or minus 10% of the reference value.

In some embodiments, the method step of determining the LPC and in some embodiments the step of determining the FPC includes the step of determining the type of each computing system of the plurality of computing systems, as well as the firmware that is installed within each computing system and any capabilities or limitations to software that is installed on each computing system to enable the computing system to perform the desired computational tasks. The control system 216 has in its non-volatile memory, or in a memory that is accessible by the control system 216, a correlation between the power consumption available for each computing system with firmware and software installations. As discussed above, the control system 216 has stored in its non-volatile memory, or memory that the control system 216 has access to, a correlation the electrical power used by each computing system within the range of environmental temperatures that are possible for operation of the computing system and at various levels of operation of the computing system. The controller accesses these stored correlations when identifying the LPC and FPC which are based at least in part on these above correlations, as well as when determining the RPC.

In some embodiments, the MPC and the RPC, and the modified MPC are reported via a telemetry system. The MPC and RPC may alternatively or additionally be reported by a conventional wired or wireless communications or data transfer system.

Figure 9:
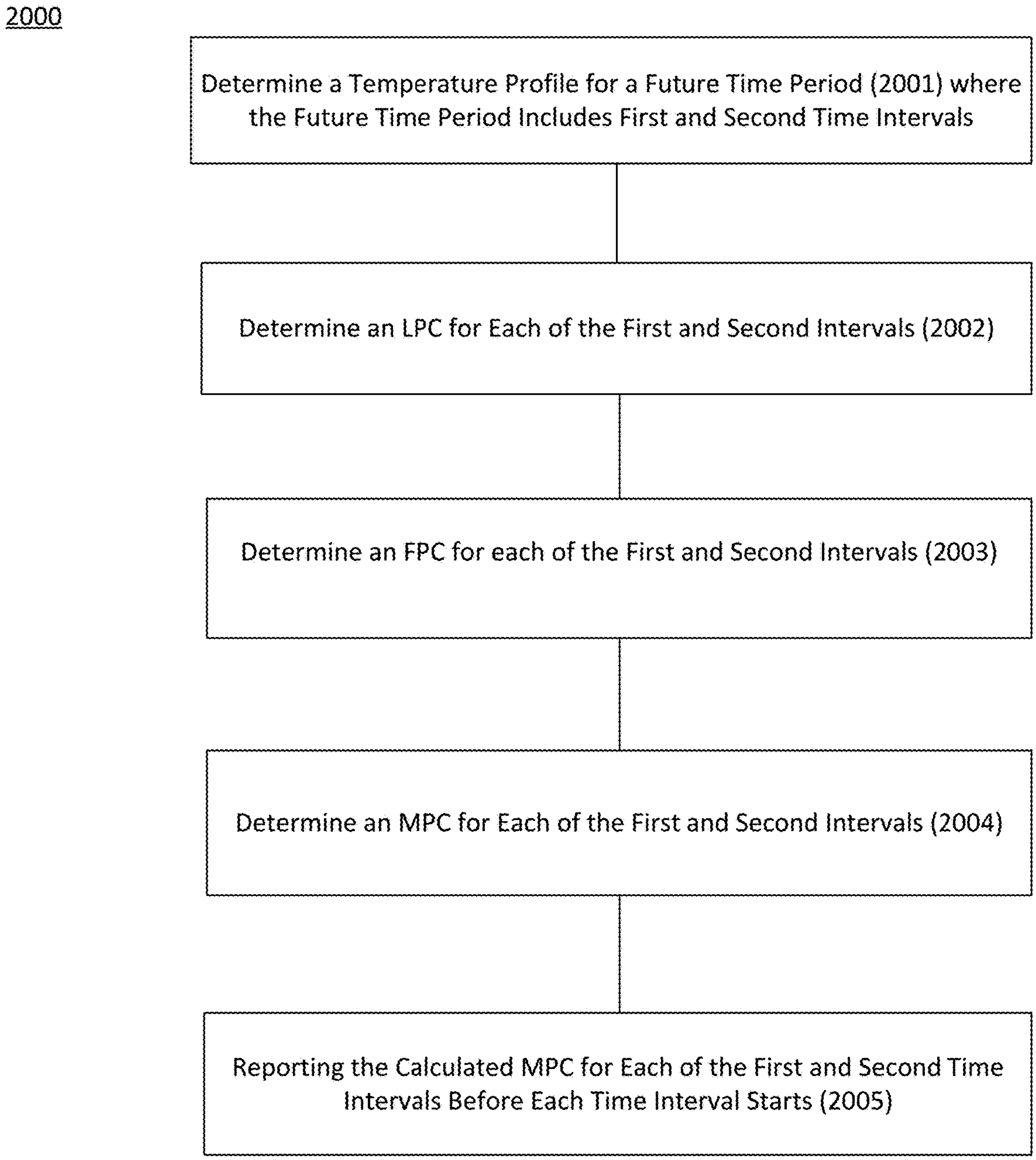
FIG. 9 is a flowchart of a method of dynamically updating a reported maximum power consumption for a site with a plurality of computing systems.

As depicted in FIG. 9, another method (2000) is provided. The method dynamically updates a reported maximum power consumption for a site with a plurality of computing systems. The method includes determining a temperature profile for a future time period (2001), wherein the temperature profile comprise at least a first temperature during a first time interval in the future time period and a second temperature during a second time interval in the future time period. Then a LPC for the first time interval and the second time interval are each determined (2002), with the LPC determined at least in part based upon a minimum power consumption of the plurality of computing systems at the site and a power consumption of supporting equipment. In some embodiments, the supporting equipment is co-located at the site and supports operation of the plurality of computing systems. A full power consumption ("FPC") for the first time interval and the second time interval are each calculated (2003) based at least in part on a power consumption of the plurality of computing systems when operating at full power and further based at least in part on the respective first temperature and second temperature for each time interval. The MPC for the first time interval and the second time interval are each calculated (2004), which comprises at least the sum of the LPC and the FPC for each respective time interval. Then the calculated MPC is reported for each time interval via a telemetry system prior to the respective time interval (2005).

In the above method, the step of determining the FPC for the first and second time intervals may be based at least in part on the power consumption of the plurality of computing systems when operating at full power and/or based at least in part on the predicted temperatures surrounding the environment during the first and second time periods, and the correlation between power and temperature (for the anticipated percentage of computational operation as discussed above).

Figure 10:
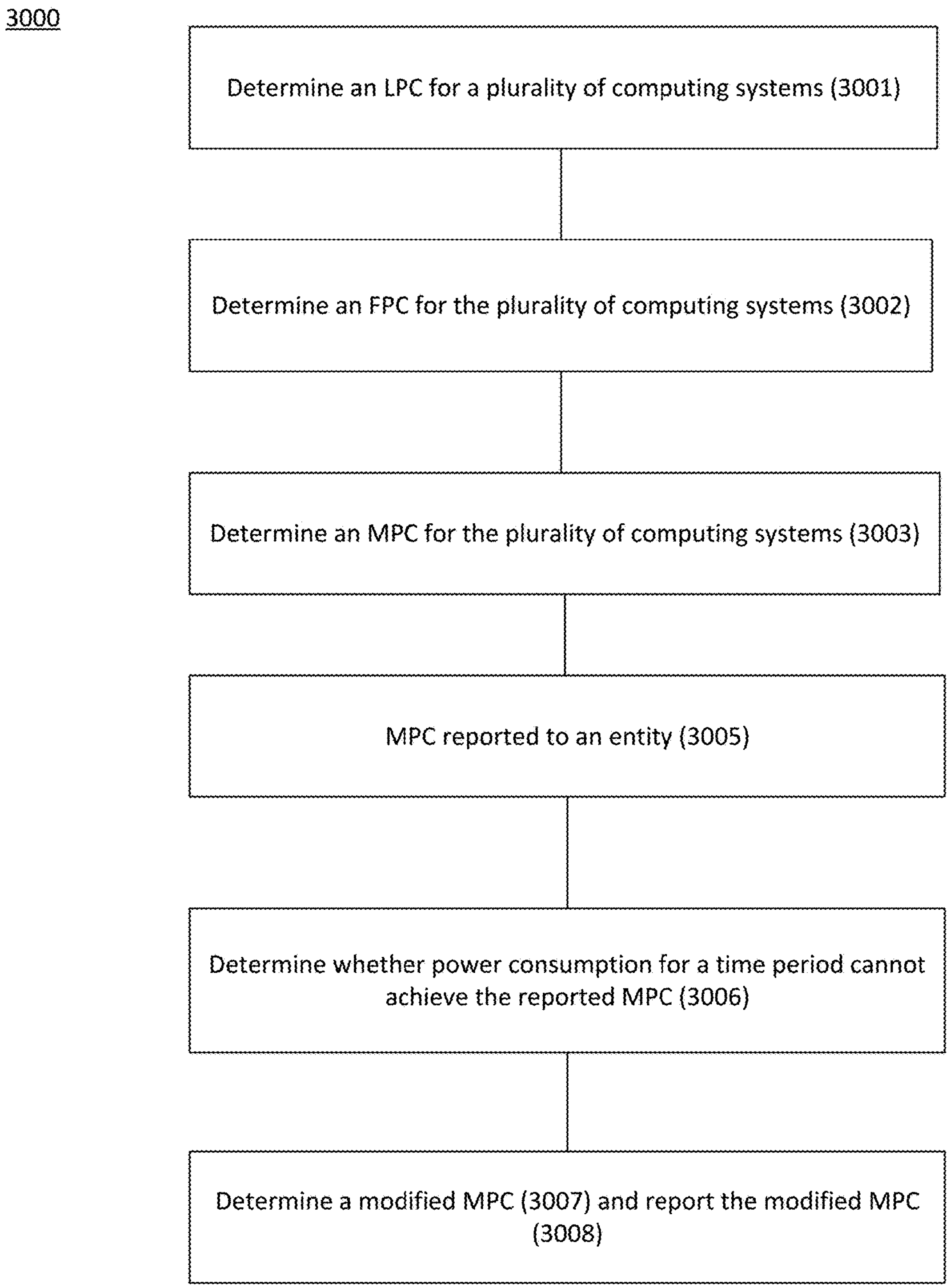
FIG. 10 is a flowchart of a method of dynamically updating a reported maximum power consumption for a site with a plurality of computing systems.

As depicted in FIG. 10, another method that may be performed (3000) is as follows. The method is for dynamically updating a reported maximum power consumption (MPC) for a site with a plurality of computing systems. The method includes the steps of determining a LPC based at least in part on a minimum power consumption of the plurality of computing systems at the site and a power consumption of supporting equipment (3001), wherein the supporting equipment is co-located at the site and supports operation of the plurality of computing systems. The method further includes the step of determining a full power consumption ("FPC") based at least in part on a power consumption of the plurality of computing systems when operating at full power (3002). Additionally, the step of determining a maximum power consumption ("MPC") comprising at least the sum of the LPC and the FPC (3004) is performed. The method further includes the steps of reporting to the entity that provides power to the datacenter (3005), which may be a grid directly, a QSE, or a power generation entity. The reports may be via a telemetry system and/or by wired or wireless communication systems that are known in the art. The method further includes the step of determining power consumption for a time period at the site cannot achieve the MPC (3006), determining a modified MPC (3007); and, reporting the modified MPC (3008). As above, the reporting may occur via the telemetry system and/or via a known wired or wireless communication system.

The method discussed above may be performed when the time period is the current time period. Alternatively the time period may be a future time period, such as next day. In some embodiments, when determining that actual power consumption at the site cannot achieve the MPC, the step of determining the power consumption at the site is based at least in part on the power capacity determined with respect to the power at temperature data discussed above. Further, the step of determining the modified MPC includes determining the status of at least computing system of the plurality of computing systems and determining power consumption data for the at least one computing system based at least in part on stored power consumption information for the at least one computing system. The method discussed above may be modified such that determining a modified MPC includes determining the status of at least computing system of the plurality of computing systems and determining power consumption data for the at least one computing system based at least in part on stored power consumption information correlated with the status for the at least one computing system. The method discussed above may be modified (in addition to one or more of the modifications herein) by determining a modified MPC that includes determining identifying information of at least one computing system of the plurality of computing systems, determining power consumption data for the at least one computing system based at least in part on stored power consumption information for the at least one computing system correlated with temperature data.

Figure 11:
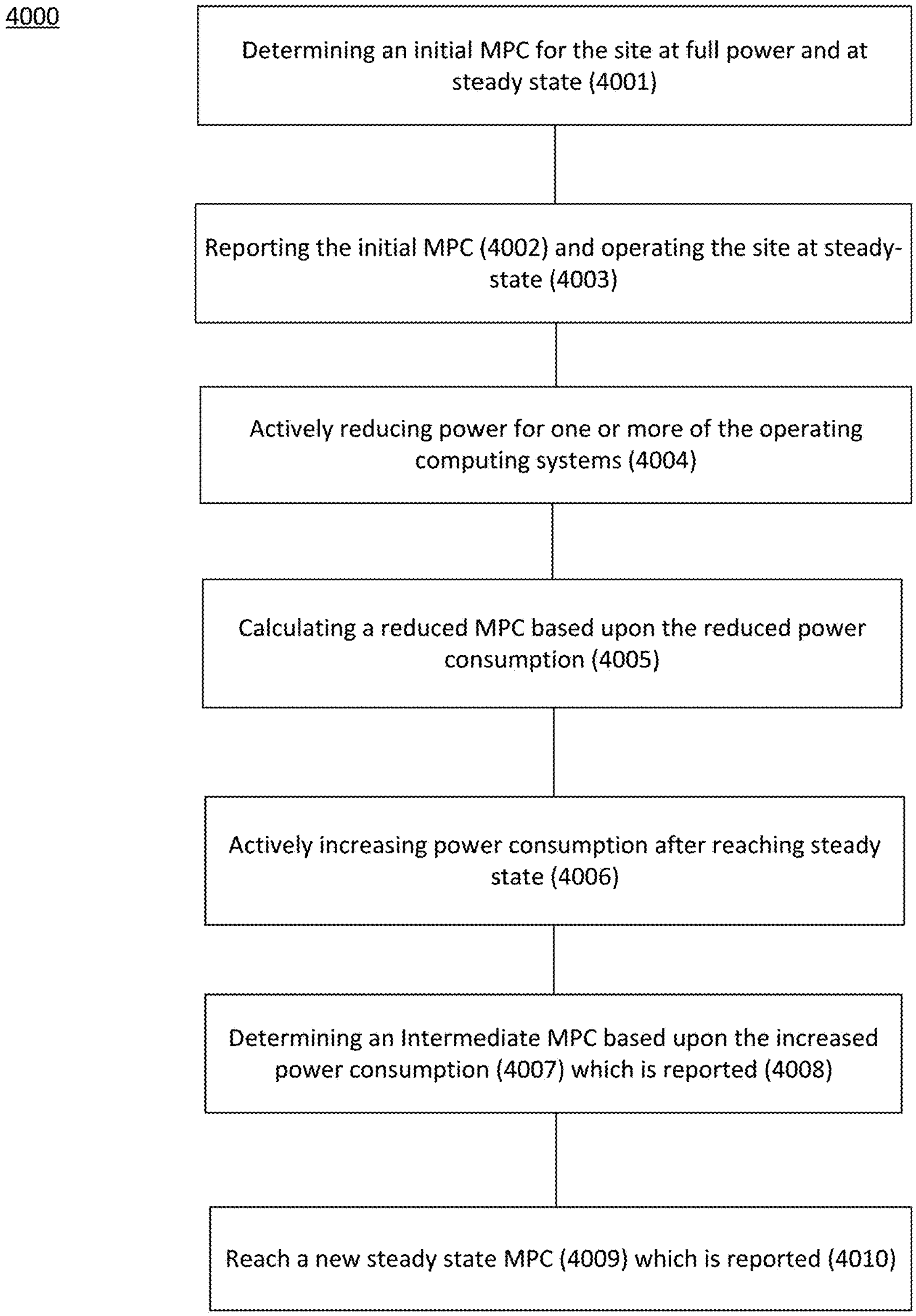
FIG. 11 is a flowchart of a method of dynamically updating a reported maximum power consumption for a site with a plurality of computing systems

As depicted in FIG. 11, another method (4000) is provided, which is a method of dynamically updating a reported maximum power consumption for a site with a plurality of computing systems. The method includes determining an initial MPC for the site based at least in part on a power consumption of the plurality of computing systems each operating at full power at a respective steady state temperature (4001) and reporting the initial MPC (4002). The datacenter is operated with the plurality of computing systems at full power at the steady state temperature (4003). After operating in steady state the amount of power consumption is actively reduced of one or more computing systems of the plurality of computing systems (4004). After the power consumption is reduced, a reduced MPC based at least in part on the reduced power consumption of the one or more computing systems is determined (4005) and reporting the reduced MPC is reported (4005). After steady state, the power consumed by one or more computing systems is actively increased (4006) and after the active increase, an intermediate MPC is determined based at least in part on the increased power consumption of the one or more computing systems (4007) and reported (4008). After sufficient time, the computing systems may heat up and a steady-state MPC based at least in part on a passive increased power consumption of the one or more computing systems is determined (4009) and report (4010).

The method described above may be modified by one or more of the steps below. The step of actively reducing power consumption of one or more computing systems of the plurality of computing systems may include actively reducing power consumption of one or more computing systems of the plurality of computing systems in response to monitoring changes of a frequency of electrical power on a power grid.

The step of actively reducing power consumption of one or more computing systems of the plurality of computing systems may include actively reducing power consumption of one or more computing systems of the plurality of computing systems in response to monitoring changes of a frequency of electrical power from a power generator.

The step of actively reducing power consumption of one or more computing systems of the plurality of computing systems may include actively reducing power consumption of one or more computing systems of the plurality of computing systems in response to an operational directive from a grid operator.

The step of actively reducing power consumption of one or more computing systems of the plurality of computing systems may include actively reducing power consumption of one or more computing systems of the plurality of computing systems in response to an operational directive from a scheduling entity.

The step of actively reducing power consumption of one or more computing systems of the plurality of computing systems may include actively reducing power consumption of one or more computing systems of the plurality of computing systems in response to an operational directive from a power generator.

The step of determining the intermediate MPC based at least in part on the increased power consumption of the one or more computing systems may include reducing the initial MPC by a fixed amount.

The fixed amount within the method above may be based at least in part upon temperature data, and based upon the correlation between computing system (and firmware) and temperature and power level as discussed above.

Where the new steady-state MPC may be equal to the initial MPC.

In one or more of the methods above, in a step of calculating the LPC of the plurality of computing systems, the datacenter control system 216 takes into account the factors that are discussed above that can affect the amount of power needed to allow for operation of the plurality of computing systems (e.g. the power needed to maintain the computing systems in the idle state or in a state that is capable performing computational tasks as assigned). This calculation of the LPC may include a review of a weather forecast for the area where the environments 902 that enclose the plurality of computing systems and considering whether the LPC will change due to predicted weather changes during the next period, as described above. The FPC of the one or more computing systems may vary in the same manner as the LPC, and the FPC may vary to a larger or smaller percentage, which may be experimentally determined as discussed above.

In some embodiments and method steps, the LPC may also be adjusted in view of the anticipated or planned maintenance that might be performed upon one or more of the computing systems within the datacenter that would result in those computing systems not being operated or being operated at idle state. The need for maintenance could also affect the FPC for the upcoming period.

if, when performing one or more of the methods describe above the datacenter control system 216 216 determines that the plurality of computing systems does not have sufficient previously commissioned computing tasks ready to be performed by the plurality of computing systems during the a future time to maintain an MPC, the datacenter control system 216 may communicate with preexisting computing customers to determine whether additional computational tasks are available for the plurality of computing systems to perform.

During one or more of the methods described above, the datacenter control system 216 monitors the operation and performance of the plurality of computing systems, as well as the temperature of the computing systems, at least on a periodic basis calculates the current LPC and FPC.

During datacenter operations, the datacenter control system 216 may communicate with the grid/QSE or power generator on a fixed schedule (e.g. every 5 minutes, every 15 minutes, or another periodicity as appropriate) with the current MPC of the datacenters controlled by datacenter control system 216. In addition to the fixed schedule communication, in some embodiments, the datacenter control system 216 may also communicate when the immediate MPC has changed—such as due to rapidly changing weather where the environments where one or more computing systems are located, or due to the failure of a computing system within the plurality (1011). Upon determining that the MPC is immediately modified, the control system 216 may modify the operation of one or more of the plurality of computing systems, such as shutting down, idling, or reducing the speed of one or more computing systems (or a combination of two or three of these possibilities).

The control system 216 may communicate with the plurality of computer systems, such as with an arrangement of FIG. 2, using various communication technologies, including wired and wireless communication technologies. For instance, it may use wired (not illustrated) or wireless communication to communicate with datacenter control systems (such as the datacenter control system 216 that controls the operation of the one or more computing systems at the flexible datacenters 220 (or datacenter powered from grid power).

In the example arrangement shown in FIG. 2, the flexible datacenters 220 represent example loads that can receive power behind-the-meter from the generation station 202. In such a configuration, the flexible datacenters 220 may obtain and utilize power behind-the-meter from the generation station 202 to perform various computational operations. Performance of a computational operation may involve one or more computing systems providing resources useful in the computational operation. For instance, the flexible datacenters 220 may include one or more computing systems configured to store information, perform calculations and/or parallel processes, perform simulations, mine cryptocurrencies, and execute applications, among other potential tasks. The computing systems can be specialized or generic and can be arranged at each flexible datacenter 220 in a variety of ways (e.g., straight configuration, zig-zag configuration) as further discussed with respect to FIGS. 6A, 6B. Furthermore, although the example arrangement illustrated in FIG. 2 shows configurations where flexible datacenters 220 serve as BTM loads, other types of loads can be used as BTM loads within examples.

The arrangement of FIG. 2 includes the traditional datacenters 260 coupled to metered grid power. The traditional datacenters 260 using metered grid power to provide computational resources to support computational operations. One or more enterprises may assign computational operations to the traditional datacenters 260 with expectations that the datacenters reliably provide resources without interruption (i.e., non-intermittently) to support the computational operations, such as processing abilities, networking, and/or volatile storage. Similarly, one or more enterprises may also request computational operations to be performed by the flexible datacenters 220. The flexible datacenters 220 differ from the traditional datacenters 260 in that the flexible datacenters 220 are arranged and/or configured to be connected to BTM power, are expected to operate intermittently, and are expected to ramp load (and thus computational capability) up or down regularly in response to control directives. In some examples, the flexible datacenters 220 and the traditional datacenters 260 may have similar configurations and may only differ based on the source(s) of power relied upon to power internal computing systems. Preferably, however, the flexible datacenters 220 include particular fast load ramping abilities (e.g., quickly increase or decrease power usage) and are intended and designed to effectively operate during intermittent periods of time. Either the flexible datacenters 220 or the traditional datacenters 260 may be controlled by the control system 216 to operate in accordance with the methods described above. One of ordinary skill in the art would comprehend with a thorough review and understanding of this disclosure how either type of datacenter would be operated.

Figure 3:
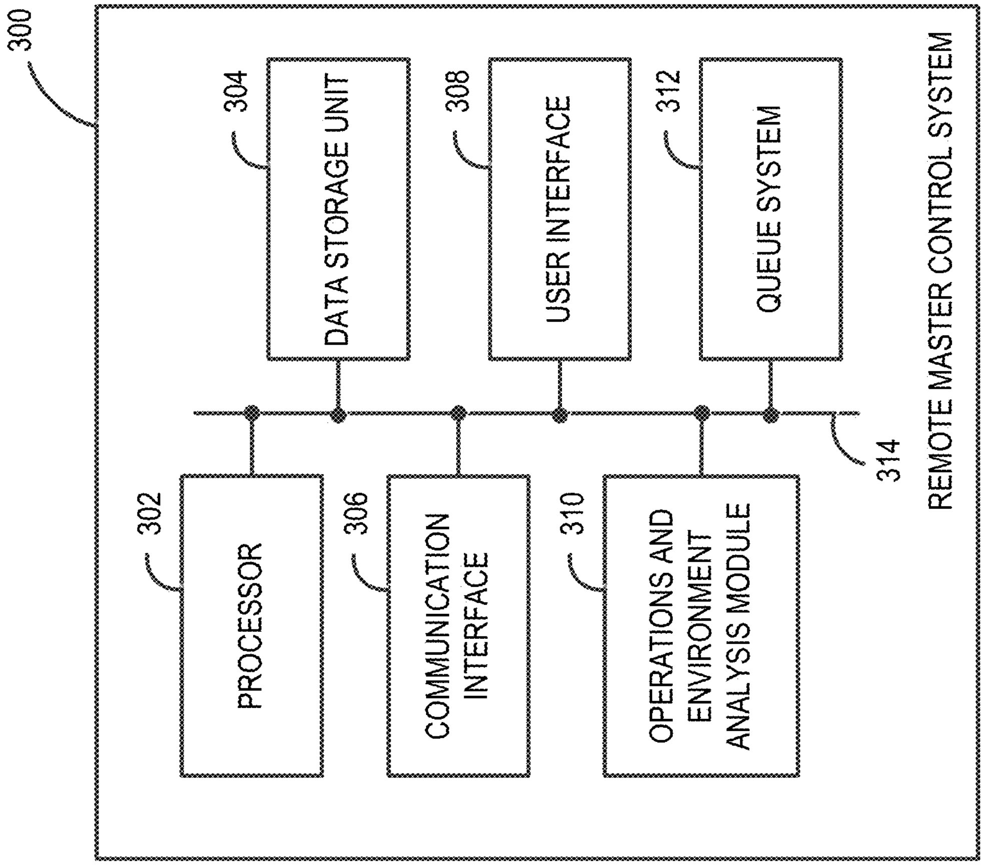
FIG. 3 shows a block diagram of a remote master control system, according to one or more example embodiments.

FIG. 3 shows a block diagram of the external electricity distributor 300 according to one or more example embodiments, and which may serve as the remote master control system 216 of FIG. 2. External electricity distributor 262 may take the form of remote master control system 216 300, or may include less than all components in remote master control system 216 300, different components than in remote master control system 216 300, and/or more components than in remote master control system 216 300. In embodiments where the methods are used to control a datacenter that receives grid power, the external electricity distributor and communicate with a the remote master control system 216 300, which is the control system 216 discussed above.

The remote master control system 216 300 may perform one or more operations described herein and may include a processor 302, a data storage unit 304, a communication interface 306, a user interface 308, an operations and environment analysis module 310, and a queue system 312. In other examples, the remote master control system 216 300 may include more or fewer components in other possible arrangements.

As shown in FIG. 3, the various components of the remote master control system 216 300 can be connected via one or more connection mechanisms (e.g., a connection mechanism 314). In this disclosure, the term “connection mechanism” means a mechanism that facilitates communication between two or more devices, systems, components, or other entities. For instance, a connection mechanism can be a simple mechanism, such as a cable, PCB trace, or system bus, or a relatively complex mechanism, such as a packet-based communication network (e.g., LAN, WAN, and/or the Internet). In some instances, a connection mechanism can include a non-tangible medium (e.g., where the connection is wireless).

As part of the arrangement of FIG. 2, the remote master control system 216 300 (corresponding to remote master control system 262) may perform a variety of operations, such as management and distribution of computational operations among datacenters, monitoring operational, economic, and environment conditions, and power management. For instance, the remote master control system 216 300 may obtain computational operations from one or more enterprises for performance at one or more datacenters. The remote master control system 216 300 may subsequently use information to distribute and assign the computational operations to one or more datacenters (e.g., the flexible datacenters 220) that have the resources (e.g., particular types of computing systems and available power) available to complete the computational operations. In some examples, the remote master control system 216 300 may assign all incoming computational operation requests to the queue system 312 and subsequently assign the queued requests to computing systems based on an analysis of current market and power conditions.

Although the remote master control system 216 300 is shown as a single entity, a network of computing systems may perform the operations of the remote master control system 216 300 in some examples. For example, the remote master control system 216 300 may exist in the form of computing systems (e.g., datacenter control systems 216) distributed across multiple datacenters.

The remote master control system 216 300 may include one or more processors 302. As such, the processor 302 may represent one or more general-purpose processors (e.g., a microprocessor) and/or one or more special-purpose processors (e.g., a digital signal processor (DSP)). In some examples, the processor 302 may include a combination of processors within examples. The processor 302 may perform operations, including processing data received from the other components within the arrangement of FIG. 2 and data obtained from external sources, including information such as weather forecasting systems, power market price systems, and other types of sources or databases.

The data storage unit 304 may include one or more volatile, non-volatile, removable, and/or non-removable storage components, such as magnetic, optical, or flash storage, and/or can be integrated in whole or in part with the processor 302. As such, the data storage unit 304 may take the form of a non-transitory computer-readable storage medium, having stored thereon program instructions (e.g., compiled or non-compiled program logic and/or machine code) that, when executed by the processor 302, cause the remote master control system 216 300 to perform one or more acts and/or functions, such as those described in this disclosure. Such program instructions can define and/or be part of a discrete software application. In some instances, the remote master control system 216 300 can execute program instructions in response to receiving an input, such as from the communication interface 306, the user interface 308, or the operations and environment analysis module 310. The data storage unit 304 may also store other information, such as those types described in this disclosure.

In some examples, the data storage unit 304 may serve as storage for information obtained from one or more external sources. For example, data storage unit 304 may store information obtained from one or more of the traditional datacenters 260, a generation station 202, a system associated with the grid, and flexible datacenters 220. As examples only, data storage 304 may include, in whole or in part, local storage, dedicated server-managed storage, network attached storage, and/or cloud-based storage, and/or combinations thereof.

The communication interface 306 can allow the remote master control system 216 300 to connect to and/or communicate with another component according to one or more protocols. For instance, the communication interface 306 may be used to obtain information related to current, future, and past prices for power, power availability, current and predicted weather conditions, and information regarding the different datacenters (e.g., current workloads at datacenters, types of computing systems available within datacenters, price to obtain power at each datacenter, levels of power storage available and accessible at each datacenter, etc.). In an example, the communication interface 306 can include a wired interface, such as an Ethernet interface or a high-definition serial-digital-interface (HD-SDI). In another example, the communication interface 406 can include a wireless interface, such as a cellular, satellite, WiMAX, or WI-FI interface. A connection can be a direct connection or an indirect connection, the latter being a connection that passes through and/or traverses one or more components, such as such as a router, switcher, or other network device. Likewise, a wireless transmission can be a direct transmission or an indirect transmission. The communication interface 306 may also utilize other types of wireless communication to enable communication with datacenters positioned at various locations.

The communication interface 306 may enable the remote master control system 216 300 to communicate with the components of the arrangement of FIG. 2. In addition, the communication interface 306 may also be used to communicate with the various datacenters, power sources, and different enterprises submitting computational operations for the datacenters to support.

The user interface 308 can facilitate interaction between the remote master control system 216 300 and an administrator or user, if applicable. As such, the user interface 308 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 308 can include hardware and/or software components that facilitate interaction between remote master control system 216 300 and the user of the system.

In some examples, the user interface 308 may enable the manual examination and/or manipulation of components within the arrangement of FIG. 2. For instance, an administrator or user may use the user interface 308 to check the status of, or change, one or more computational operations, the performance or power consumption at one or more datacenters, the number of tasks remaining within the queue system 312, and other operations. As such, the user interface 308 may provide remote connectivity to one or more systems within the arrangement of FIG. 2.

The operations and environment analysis module 310 represents a component of the remote master control system 216 300 associated with obtaining and analyzing information to develop instructions/directives for components within the arrangement of FIG. 2. The information analyzed by the operations and environment analysis module 310 can vary within examples and may include the information described above with respect predicting and/or directing the use of BTM power. For instance, the operations and environment analysis module 310 may obtain and access information related to the current power state of computing systems operating as part of the flexible datacenters 220 and other datacenters that the remote master control system 216 300 has access to. This information may be used to determine when to adjust power usage or mode of one or more computing systems. In addition, the remote master control system 216 300 may provide instructions a flexible datacenter 220 to cause a subset of the computing systems to transition into a low power mode to consume less power while still performing operations at a slower rate. The remote master control system 216 300 may also use power state information to cause a set of computing systems at a flexible datacenter 220 to operate at a higher power consumption mode. In addition, the remote master control system 216 300 may transition computing systems into sleep states or power on/off based on information analyzed by the operations and environment analysis module 310.

In some examples, the operations and environment analysis module 310 may use location, weather, activity levels at the flexible datacenters or the generation station, and power cost information to determine control strategies for one or more components in the arrangement of FIG. 2. For instance, the remote master control system 216 300 may use location information for one or more datacenters to anticipate potential weather conditions that could impact access to power. In addition, the operations and environment analysis module 310 may assist the remote master control system 216 300 determine whether to transfer computational operations between datacenters based on various economic and power factors.

The queue system 312 represents a queue capable of organizing computational operations to be performed by one or more datacenters. Upon receiving a request to perform a computational operation, the remote master control system 216 300 may assign the computational operation to the queue until one or more computing systems are available to support the computational operation. The queue system 312 may be used for organizing and transferring computational tasks in real time.

The organizational design of the queue system 312 may vary within examples. In some examples, the queue system 312 may organize indications (e.g., tags, pointers) to sets of computational operations requested by various enterprises. The queue system 312 may operate as a First-In-First-Out (FIFO) data structure. In a FIFO data structure, the first element added to the queue will be the first one to be removed. As such, the queue system 312 may include one or more queues that operate using the FIFO data structure.

In some examples, one or more queues within the queue system 312 may use other designs of queues, including rules to rank or organize queues in a particular manner that can prioritize some sets of computational operations over others. The rules may include one or more of an estimated cost and/or revenue to perform each set of computational operations, an importance assigned to each set of computational operations, and deadlines for initiating or completing each set of computational operations, among others. Examples using a queue system are further described below with respect to FIG. 9.

In some examples, the remote master control system 216 300 may be configured to monitor one or more auctions to obtain computational operations for datacenters to support. Particularly, the remote master control system 216 300 may use resource availability and power prices to develop and submit bids to an external or internal auction system for the right to support particular computational operations. As a result, the remote master control system 216 300 may identify computational operations that could be supported at one or more flexible datacenters 220 at low costs.

Figure 4:
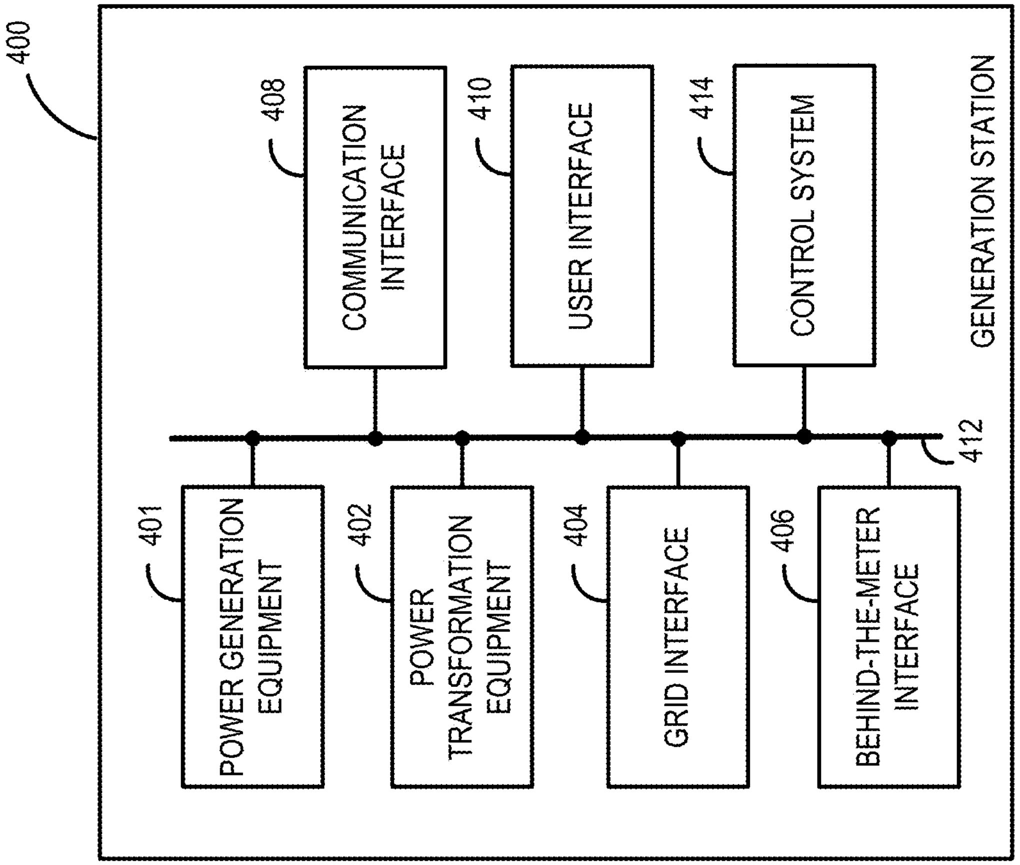
FIG. 4 a block diagram of a generation station, according to one or more example embodiments.

FIG. 3 is a block diagram of a generation station 400, which may operate as the power generation equipment 210 of FIG. 2, according to one or more example embodiments. Generation station 202 may take the form of generation station 400, or may include less than all components in generation station 400, different components than in generation station 400, and/or more components than in generation station 400. The generation station 400 includes a power generation equipment 401, a communication interface 408, a behind-the-meter interface 406, a grid interface 404, a user interface 410, a generation station control system 216 414, and power transformation equipment 402, power generation equipment 210 may take the form of power generation equipment 401, or may include less than all components in power generation equipment 401, different components than in power generation equipment 401, and/or more components than in power generation equipment 401. Generation station control system 216 may take the form of generation station control system 216 414, or may include less than all components in generation station control system 216 414, different components than in generation station control system 216 414, and/or more components than in generation station control system 216 414. Some or all of the components generation station 400 may be connected via a communication interface 516. These components are illustrated in FIG. 4 to convey an example configuration for the generation station 400 (corresponding to generation station 202 shown in FIG. 2). In other examples, the generation station 400 may include more or fewer components in other arrangements.

The generation station 400 can correspond to any type of grid-connected utility-scale power producer capable of supplying power to one or more loads. The size, amount of power generated, and other characteristics of the generation station 400 may differ within examples. For instance, the generation station 400 may be a power producer that provides power intermittently. The power generation may depend on monitored power conditions, such as weather at the location of the generation station 400 and other possible conditions. As such, the generation station 400 may be a temporary arrangement, or a permanent facility, configured to supply power. The generation station 400 may supply BTM power to one or more loads and supply metered power to the electrical grid. Particularly, the generation station 400 may supply power to the grid as shown in the arrangement of FIG. 2.

The power generation equipment 401 represents the component or components configured to generate utility-scale power. As such, the power generation equipment 401 may depend on the type of facility that the generation station 400 corresponds to. For instance, the power generation equipment 401 may correspond to electric generators that transform kinetic energy into electricity. The power generation equipment 401 may use electromagnetic induction to generate power. In other examples, the power generation equipment 401 may utilize electrochemistry to transform chemical energy into power. The power generation equipment 401 may use the photovoltaic effect to transform light into electrical energy. In some examples, the power generation equipment 401 may use turbines to generate power. The turbines may be driven by, for example, wind, water, steam or burning gas. Other examples of power production are possible.

The communication interface 408 enables the generation station 400 to communicate with other components within the arrangement of FIG. 2. As such, the communication interface 408 may operate similarly to the communication interface 306 of the remote master control system 216 300 and the communication interface 503 of the flexible datacenter 500.

The generation station control system 216 414 may be one or more computing systems configured to control various aspects of the generation station 400.

The BTM interface 406 is a module configured to enable the power generation equipment 401 to supply BTM power to one or more loads and may include multiple components. The arrangement of the BTM interface 406 may differ within examples based on various factors, such as the number of flexible datacenters 220 (or 500) coupled to the generation station 400, the proximity of the flexible datacenters 220 (or 500), and the type of generation station 400, among others. In some examples, the BTM interface 406 may be configured to enable power delivery to one or more flexible datacenters positioned near the generation station 400. Alternatively, the BTM interface 406 may also be configured to enable power delivery to one or more flexible datacenters 220 (or 500) positioned remotely from the generation station 400.

The grid interface 404 is a module configured to enable the power generation equipment 401 to supply power to the grid and may include multiple components. As such, the grid interface 404 may couple to one or more transmission lines (e.g., transmission lines 404*a* shown in FIG. 2) to enable delivery of power to the grid.

The user interface 410 represents an interface that enables administrators and/or other entities to communicate with the generation station 400. As such, the user interface 410 may have a configuration that resembles the configuration of the user interface 308 shown in FIG. 3. An operator may utilize the user interface 410 to control or monitor operations at the generation station 400.

The power transformation equipment 402 represents equipment that can be utilized to enable power delivery from the power generation equipment 401 to the loads and to transmission lines linked to the grid. Example power transformation equipment 402 includes, but is not limited to, transformers, inverters, phase converters, and power conditioners.

Figure 5:
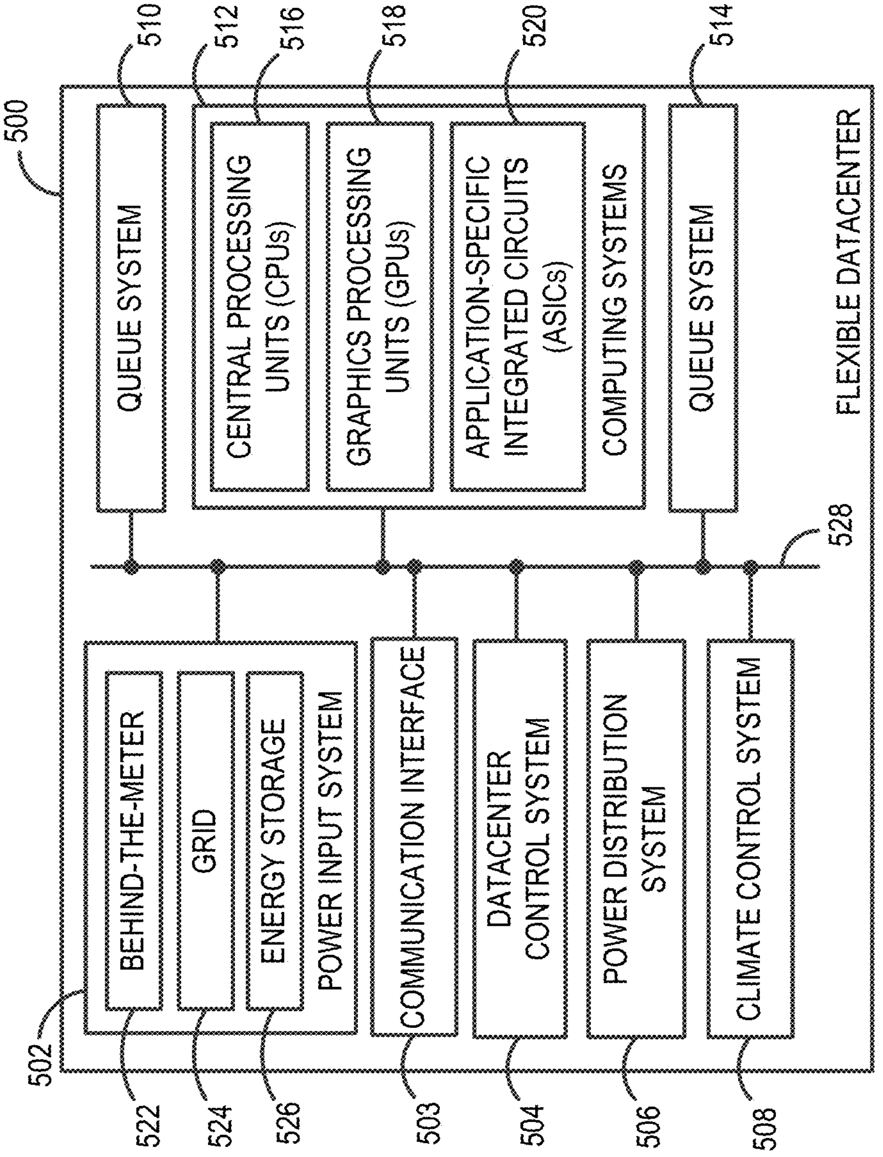
FIG. 5 shows a block diagram of a flexible datacenter, according to one or more example embodiments.

FIG. 5 shows a block diagram of a flexible datacenter 500, according to one or more example embodiments, including the flexible datacenter 220 of FIG. 2 and discussed above. Flexible datacenters 220 may take the form of flexible datacenter 500, or may include less than all components in flexible datacenter 500, different components than in flexible datacenter 500, and/or more components than in flexible datacenter 500. In the example embodiment shown in FIG. 5, the flexible datacenter 500 includes a power input system 502, a communication interface 503, a datacenter control system 216 504, a power distribution system 506, a climate control system 216 508, one or more sets of computing systems 512, and a queue system 514. These components are shown connected by a communication bus 528. In other embodiments, the configuration of flexible datacenter 500 can differ, including more or fewer components. In addition, the components within flexible datacenter 500 may be combined or further divided into additional components within other embodiments.

The example configuration shown in FIG. 5 represents one possible configuration for a flexible datacenter. As such, each flexible datacenter may have a different configuration when implemented based on a variety of factors that may influence its design, such as location and temperature that the location, particular uses for the flexible datacenter, source of power supplying computing systems within the flexible datacenter, design influence from an entity (or entities) that implements the flexible datacenter, and space available for the flexible datacenter. Thus, the embodiment of flexible datacenter 220 shown in FIG. 2 represents one possible configuration for a flexible datacenter out of many other possible configurations.

The flexible datacenter 500 may include a design that allows for temporary and/or rapid deployment, setup, and start time for supporting computational operations. For instance, the flexible datacenter 500 may be rapidly deployed at a location near a source of generation station power (e.g., near a wind farm or solar farm). Rapid deployment may involve positioning the flexible datacenter 500 at a target location and installing and/or configuring one or more racks of computing systems within. The racks may include wheels to enable swift movement of the computing systems. Although the flexible datacenter 500 could theoretically be placed anywhere, transmission losses may be minimized by locating it proximate to BTM power generation.

The physical construction and layout of the flexible datacenter 500 can vary. In some instances, the flexible datacenter 500 may utilize a metal container (e.g., a metal container 602 shown in FIG. 6A). In general, the flexible datacenter 500 may utilize some form of secure weatherproof housing designed to protect interior components from wind, weather, and intrusion. The physical construction and layout of example flexible datacenters are further described with respect to FIGS. 6A-6B.

Within the flexible datacenter 500, various internal components enable the flexible datacenter 500 to utilize power to perform some form of operations. The power input system 502 is a module of the flexible datacenter 500 configured to receive external power and input the power to the different components via assistance from the power distribution system 506. As discussed with respect to FIG. 2, the sources of external power feeding a flexible datacenter can vary in both quantity and type (e.g., the generation stations 202, 400, grid-power, energy storage systems). Power input system 502 includes a BTM power input sub-system 522, and may additionally include other power input sub-systems (e.g., a grid-power input sub-system 524 and/or an energy storage input sub-system 526). In some instances, the quantity of power input sub-systems may depend on the size of the flexible datacenter and the number and/or type of computing systems being powered.

In some embodiments, the power input system 502 may include some or all of flexible datacenter Power Equipment 220B. The power input system 502 may be designed to obtain power in different forms (e.g., single phase or three-phase behind-the-meter alternating current ("AC") voltage, and/or direct current ("DC") voltage). As shown, the power input system 502 includes a BTM power input sub-system 522, a grid power input sub-system 524, and an energy input sub-system 526. These sub-systems are included to illustrate example power input sub-systems that the flexible datacenter 500 may utilize, but other examples are possible. In addition, in some instances, these sub-systems may be used simultaneously to supply power to components of the flexible datacenter 500. The sub-systems may also be used based on available power sources.

In some implementations, the BTM power input sub-system 522 may include one or more AC-to-AC step-down transformers used to step down supplied medium-voltage AC to low voltage AC (e.g., 120V to 600V nominal) used to power computing systems 512 and/or other components of flexible datacenter 500. The power input system 502 may also directly receive single-phase low voltage AC from a generation station as BTM power, from grid power, or from a stored energy system such as energy storage system 218. In some implementations, the power input system 502 may provide single-phase AC voltage to the datacenter control system 216 504 (and/or other components of flexible datacenter 500) independent of power supplied to computing systems 512 to enable the datacenter control system 216 504 to perform management operations for the flexible datacenter 500. For instance, the grid power input sub-system 524 may use grid power to supply power to the datacenter control system 216 504 to ensure that the datacenter control system 216 504 can perform control operations and communicate with the remote master control system 216 300 (or 262) during situations when BTM power is not available. As such, the datacenter control system 216 504 may utilize power received from the power input system 502 to remain powered to control the operation of flexible datacenter 500, even if the computational operations performed by the computing system 512 are powered intermittently. In some instances, the datacenter control system 216 504 may switch into a lower power mode to utilize less power while still maintaining the ability to perform some functions.

The power distribution system 506 may distribute incoming power to the various components of the flexible datacenter 500. For instance, the power distribution system 506 may direct power (e.g., single-phase or three-phase AC) to one or more components within flexible datacenter 500. In some embodiments, the power distribution system 506 may include some or all of flexible datacenter Power Equipment 220B.

In some examples, the power input system 502 may provide three phases of three-phase AC voltage to the power distribution system 506. The power distribution system 506 may controllably provide a single phase of AC voltage to each computing system or groups of computing systems 512 disposed within the flexible datacenter 500. The datacenter control system 216 504 may controllably select which phase of three-phase nominal AC voltage that power distribution system 506 provides to each computing system 512 or groups of computing systems 512. This is one example manner in which the datacenter control system 216 504 may modulate power delivery (and load at the flexible datacenter 500) by ramping-up flexible datacenter 500 to fully operational status, ramping-down flexible datacenter 500 to offline status (where only datacenter control system 216 504 remains powered), reducing load by withdrawing power delivery from, or reducing power to, one or more of the computing systems 512 or groups of the computing systems 512, or modulating power factor correction for the generation station 300 (or 202) by controllably adjusting which phases of three-phase nominal AC voltage are used by one or more of the computing systems 512 or groups of the computing systems 512. The datacenter control system 216 504 may direct power to certain sets of computing systems based on computational operations waiting for computational resources within the queue system 514. In some embodiments, the flexible datacenter 500 may receive BTM DC power to power the computing systems 512.

One of ordinary skill in the art will recognize that a voltage level of three-phase AC voltage may vary based on an application or design and the type or kind of local power generation. As such, a type, kind, or configuration of the operational AC-to-AC step down transformer (not shown) may vary based on the application or design. In addition, the frequency and voltage level of three-phase AC voltage, single-phase AC voltage, and DC voltage may vary based on the application or design in accordance with one or more embodiments.

As discussed above, the datacenter control system 216 504 may be the datacenter control system 216 discussed above. The datacenter control system 216 504 may perform operations described herein, such as dynamically modulating power delivery to one or more of the computing systems 512 disposed within flexible datacenter 500. For instance, the datacenter control system 216 504 may modulate power delivery to one or more of the computing systems 512 based on various factors, such as BTM power availability or an operational directive from a generation station 262 or 300 control system 216, a remote master control system 262 or 300, or a grid operator, including the forward looking award discussed above, which may be modified periodically and immediately due to the TPC and LPC for the monitored and controlled BTM flexible datacenters 220 as discussed above. In some examples, the datacenter control system 216 504 may provide computational operations to sets of computing systems 512 and modulate power delivery based on priorities assigned to the computational operations. For instance, an important computational operation (e.g., based on a deadline for execution and/or price paid by an entity) may be assigned to a particular computing system or set of computing systems 512 that has the capacity, computational abilities to support the computational operation. In addition, the datacenter control system 216 504 may also prioritize power delivery to the computing system or set of computing systems 512.

In some example, the datacenter control system 216 504 may further provide directives to one or more computing systems to change operations in some manner. For instance, the datacenter control system 216 504 may cause one or more computing systems 512 to operate at a lower or higher frequency, change clock cycles, or operate in a different power consumption mode (e.g., a low power mode). These abilities may vary depending on types of computing systems 512 available at the flexible datacenter 500. As a result, the datacenter control system 216 504 may be configured to analyze the computing systems 512 available either on a periodic basis (e.g., during initial set up of the flexible datacenter 500) or in another manner (e.g., when a new computational operation is assigned to the flexible datacenter 500).

The datacenter control system 216 504 may also implement directives received from the remote master control system 262 or 300. For instance, the remote master control system 262 or 300 may direct the flexible datacenter 500 to switch into a low power mode. As a result, one or more of the computing systems 512 and other components may switch to the low power mode in response.

The datacenter control system 216 504 may utilize the communication interface 503 to communicate with the external electricity distributor 262 or 300, other datacenter control systems 216 of other datacenters, and other entities. As such, the communication interface 503 may include components and operate similar to the communication interface 306 of the external electricity distributor 300 described with respect to FIG. 4.

The flexible datacenter 500 may also include a climate control system 216 508 to maintain computing systems 512 within a desired operational temperature range. The climate control system 216 508 may include various components, such as one or more air intake components, an evaporative cooling system, one or more fans, an immersive cooling system, an air conditioning or refrigerant cooling system, and one or more air outtake components. One of ordinary skill in the art will recognize that any suitable heat extraction system configured to maintain the operation of computing systems 512 within the desired operational temperature range may be used.

The flexible datacenter 500 may further include an energy storage system 510. The energy storage system 510 may store energy for subsequent use by computing systems 512 and other components of flexible datacenter 500. For instance, the energy storage system 510 may include a battery system. The battery system may be configured to convert AC voltage to DC voltage and store power in one or more storage cells. In some instances, the battery system may include a DC-to-AC inverter configured to convert DC voltage to AC voltage, and may further include an AC phase-converter, to provide AC voltage for use by flexible datacenter 500.

The energy storage system 510 may be configured to serve as a backup source of power for the flexible datacenter 500. For instance, the energy storage system 510 may receive and retain power from a BTM power source at a low cost (or no cost at all). This low-cost power can then be used by the flexible datacenter 500 at a subsequent point, such as when BTM power costs more. Similarly, the energy storage system 510 may also store energy from other sources (e.g., grid power). As such, the energy storage system 510 may be configured to use one or more of the sub-systems of the power input system 502.

In some examples, the energy storage system 510 may be external to the flexible datacenter 500. For instance, the energy storage system 510 may be an external source that multiple flexible datacenters utilize for back-up power.

The computing systems 512 represent various types of computing systems configured to perform computational operations. Performance of computational operations include a variety of tasks that one or more computing systems may perform, such as data storage, calculations, application processing, parallel processing, data manipulation, cryptocurrency mining, and maintenance of a distributed ledger, among others. As shown in FIG. 5, the computing systems 512 may include one or more CPUs 516, one or more GPUs 518, and/or one or more Application-Specific Integrated Circuits (ASIC's) 520. Each type of computing system 512 may be configured to perform particular operations or types of operations.

Due to different performance features and abilities associated with the different types of computing systems, the datacenter control system 216 504 may determine, maintain, and/or relay this information about the types and/or abilities of the computing systems, quantity of each type, and availability to the remote master control system 262 or 300 on a routine basis (e.g., periodically or on-demand) This way, the remote master control system 262 or 300 may have current information about the abilities of the computing systems 512 when distributing computational operations for performance at one or more flexible datacenters. Particularly, the remote master control system 262 or 300 may assign computational operations based on various factors, such as the types of computing systems available and the type of computing systems required by each computing operation, the availability of the computing systems, whether computing systems can operate in a low power mode, and/or power consumption and/or costs associated with operating the computing systems, among others.

The quantity and arrangement of these computing systems 512 may vary within examples. In some examples, the configuration and quantity of computing systems 512 may depend on various factors, such as the computational tasks that are performed by the flexible datacenter 500. In other examples, the computing systems 512 may include other types of computing systems as well, such as DSPs, SIMDs, neural processors, and/or quantum processors.

As indicated above, the computing systems 512 can perform various computational operations, including in different configurations. For instance, each computing system may perform a particular computational operation unrelated to the operations performed at other computing systems. Groups of the computing systems 512 may also be used to work together to perform computational operations.

In some examples, multiple computing systems may perform the same computational operation in a redundant configuration. This redundant configuration creates a backup that prevents losing progress on the computational operation in situations of a computing failure or intermittent operation of one or more computing systems. In addition, the computing systems 512 may also perform computational operations using a check point system. The check point system may enable a first computing system to perform operations up to a certain point (e.g., a checkpoint) and switch to a second computing system to continue performing the operations from that certain point. The check point system may also enable the datacenter control system 216 504 to communicate statuses of computational operations to the rexternal electricity distributor 262 or 300. This can further enable the external electricity distributor 262 300 to transfer computational operations between different flexible datacenters allowing computing systems at the different flexible datacenters to resume support of computational operations based on the check points.

The queue system 514 may operate similar to the queue system 312 of the external electricity distributor00 shown in FIG. 3. Particularly, the queue system 514 may help store and organize computational tasks assigned for performance at the flexible datacenter 500. In some examples, the queue system 514 may be part of a distributed queue system such that each flexible datacenter in a fleet of flexible datacenter includes a queue, and each queue system 514 may be able to communicate with other queue systems. In addition, the external electricity distributor 262 or 300 may be configured to assign computational tasks to the queues located at each flexible datacenter (e.g., the queue system 514 of the flexible datacenter 500). As such, communication between the external electricity distributor 262 or 300 and the datacenter control system 216 504 and/or the queue system 514 may allow organization of computational operations for the flexible datacenter 500 to support.

Figure 6A:
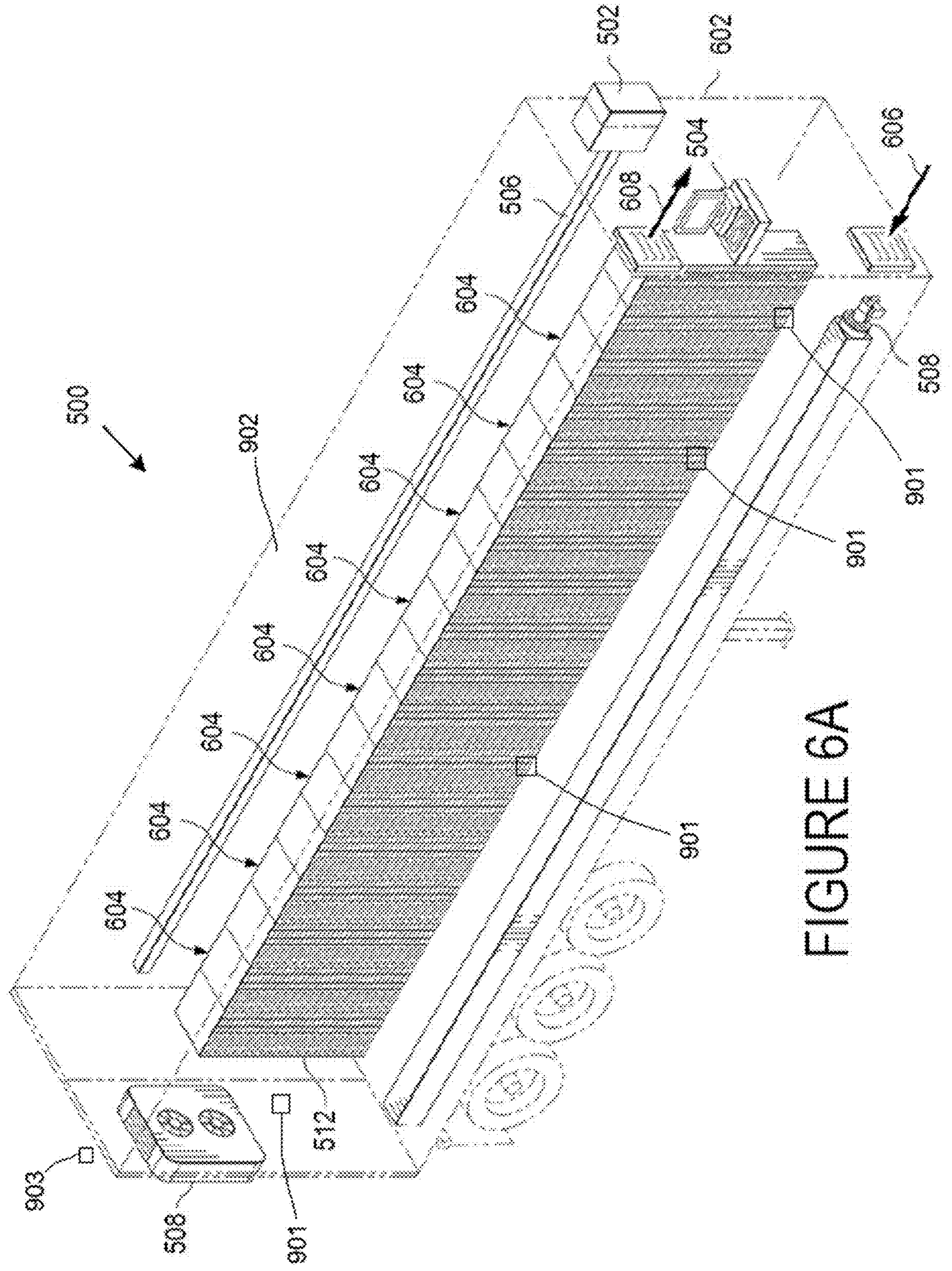
FIG. 6A shows a structural arrangement of a flexible datacenter, according to one or more example embodiments.

FIG. 6A shows another structural arrangement for a flexible datacenter, according to one or more example embodiments. The particular structural arrangement shown in FIG. 6A may be implemented at flexible datacenter 500. The illustration depicts the flexible datacenter 500 as a mobile container 702 equipped with the power input system 502, the power distribution system 506, the climate control system 216 508, the datacenter control system 216 504, and the computing systems 512 arranged on one or more racks 604. These components of flexible datacenter 500 may be arranged and organized according to an example structural region arrangement. As such, the example illustration represents one possible configuration for the flexible datacenter 500, but others are possible within examples.

As discussed above, the structural arrangement of the flexible datacenter 500 may depend on various factors, such as the ability to maintain temperature within the mobile container 602 within a desired temperature range. The desired temperature range may depend on the geographical location of the mobile container 602 and the type and quantity of the computing systems 512 operating within the flexible datacenter 500 as well as other possible factors. As such, the different design elements of the mobile container 602 including the inner contents and positioning of components may depend on factors that aim to maximize the use of space within mobile container 602, lower the amount of power required to cool the computing systems 512, and make setup of the flexible datacenter 500 efficient. For instance, a first flexible datacenter positioned in a cooler geographic region may include less cooling equipment than a second flexible datacenter positioned in a warmer geographic region.

As shown in FIG. 6A, the mobile container 602 may be a storage trailer disposed on permanent or removable wheels and configured for rapid deployment. In other embodiments, the mobile container 602 may be a storage container (not shown) configured for placement on the ground and potentially stacked in a vertical or horizontal manner (not shown). In still other embodiments, the mobile container 602 may be an inflatable container, a floating container, or any other type or kind of container suitable for housing a mobile flexible datacenter. As such, the flexible datacenter 500 may be rapidly deployed on site near a source of unutilized behind-the-meter power generation. And in still other embodiments, the flexible datacenter 500 might not include a mobile container. For example, the flexible datacenter 500 may be situated within a building or another type of stationary environment.

Figure 6B:
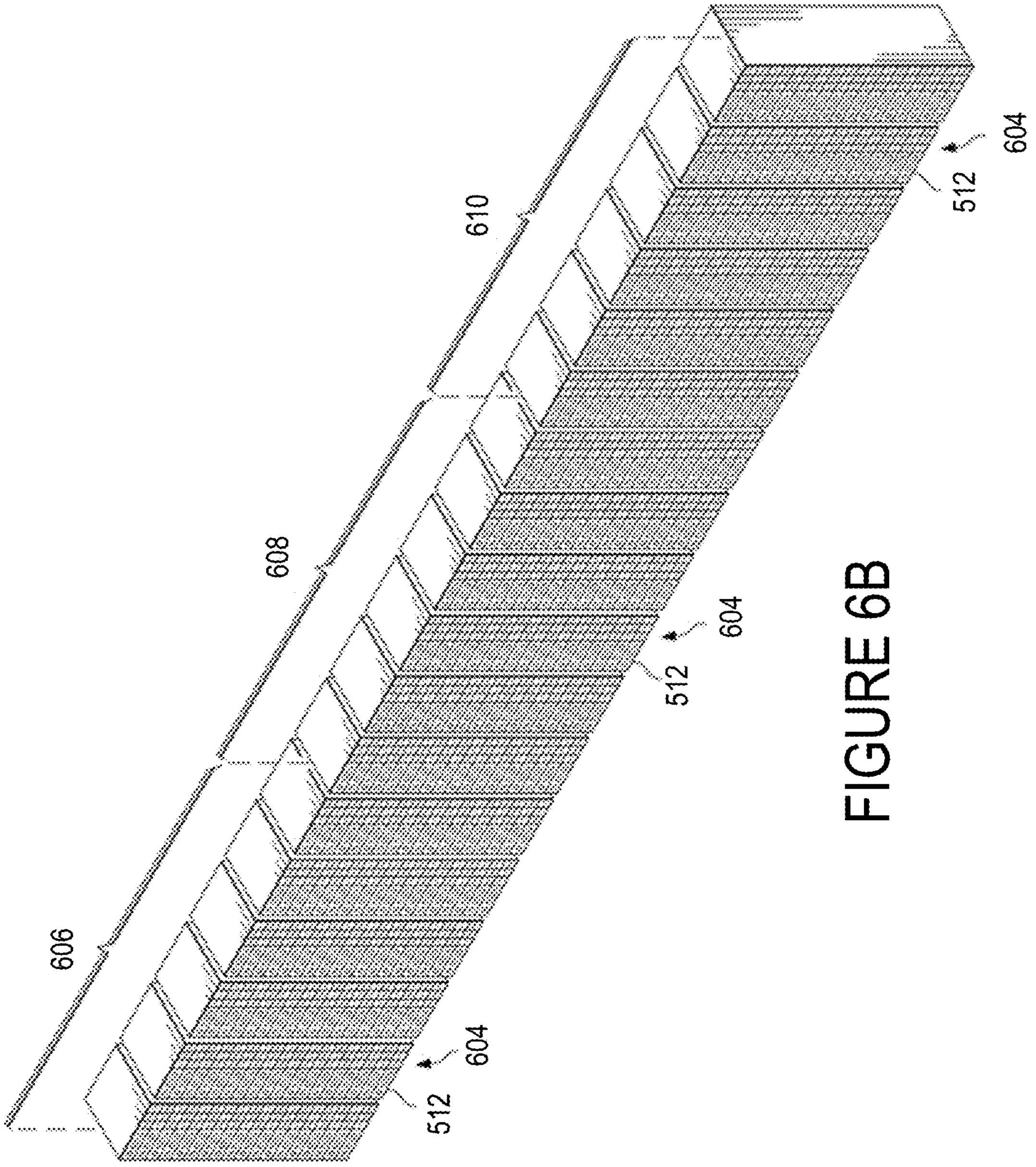
FIG. 6B shows a set of computing systems arranged in a straight configuration, according to one or more example embodiments.

FIG. 6B shows the computing systems 512 in a straight-line configuration for installation within the flexible datacenter 500, according to one or more example embodiments. As indicated above, the flexible datacenter 500 may include a plurality of racks 604, each of which may include one or more computing systems 512 disposed therein. As discussed above, the power input system 502 may provide three phases of AC voltage to the power distribution system 506. In some examples, the power distribution system 506 may controllably provide a single phase of AC voltage to each computing system 512 or group of computing systems 512 disposed within the flexible datacenter 500. As shown in FIG. 6B, for purposes of illustration only, eighteen total racks 604 are divided into a first group of six racks 606, a second group of six racks 608, and a third group of six racks 610, where each rack contains eighteen computing systems 512. The power distribution system (506 of FIG. 5) may, for example, provide a first phase of three-phase AC voltage to the first group of six racks 606, a second phase of three-phase AC voltage to the second group of six racks 608, and a third phase of three-phase AC voltage to the third group of six racks 610. In other embodiments, the quantity of racks and computing systems can vary.

An operational directive may be based on current dispatchability, forward looking forecasts for when behind-the-meter power is, or is expected to be, available, economic considerations, reliability considerations, operational considerations, or the discretion of the generation station control system 216 414, the external electricity distributor 300, or the grid operator 702. For example, the generation station control system 216 414, the external electricity distributor 300, or the grid operator 702 may issue an operational directive to flexible datacenter 500 to go offline and power down. When the datacenter ramp-down condition is met, the datacenter control system 216 504 may disable power delivery to the plurality of computing systems (e.g., 512). The datacenter control system 216 504 may disable 714 the power input system 502 from providing power (e.g., three-phase nominal AC voltage) to the power distribution system 506 to power down the computing systems 512 while the datacenter control system 216 504 remains powered and is capable of returning service to operating mode at the flexible datacenter 500 when behind-the-meter power becomes available again.

While the flexible datacenter 500 is online and operational, changed conditions or an operational directive may cause the datacenter control system 216 504 to modulate power consumption by the flexible datacenter 500. The datacenter control system 216 504 may determine, or the generation station control system 216 414, the external electricity distributor 300, or the grid operator 702 may communicate, that a change in local conditions may result in less power generation, availability, or economic feasibility, than would be necessary to fully power the flexible datacenter 500. In such situations, the datacenter control system 216 504 may take steps to reduce or stop power consumption by the flexible datacenter 500 (other than that required to maintain operation of datacenter control system 216 504).

Alternatively, the generation station control system 216 414, the external electricity distributor 300, or the grid operator 702, may issue an operational directive to reduce power consumption for any reason, the cause of which may be unknown. In response, the datacenter control system 216 504 may dynamically reduce or withdraw power delivery to one or more computing systems 512 to meet the dictate. The datacenter control system 216 504 may controllably provide three-phase nominal AC voltage to a smaller subset of computing systems (e.g., 512) to reduce power consumption. The datacenter control system 216 504 may dynamically reduce the power consumption of one or more computing systems by reducing their operating frequency or forcing them into a lower power mode through a network directive.

One of ordinary skill in the art will recognize that datacenter control system 216 504 may be configured to have a number of different configurations, such as a number or type or kind of the computing systems 512 that may be powered, and in what operating mode, that correspond to a number of different ranges of sufficient and available behind-the-meter power. As such, the datacenter control system 216 504 may modulate power delivery over a variety of ranges of sufficient and available unutilized behind-the-meter power availability.

The external electricity distributor 300 may provide directive to datacenter control systems of the fleet of flexible datacenters in a similar manner to that s described above, with the added flexibility to make high level decisions with respect to fleet that may be counterintuitive to a given station. The external electricity distributor 300 may make decisions regarding the issuance of operational directives to a given generation station based on, for example, the status of each generation station where flexible datacenters are deployed, the workload distributed across fleet, and the expected computational demand required for one or both of the expected workload and predicted power availability. In addition, the external electricity distributor 300 may shift workloads from the first plurality of flexible datacenters to the second plurality of flexible datacenters for any reason, including, for example, a loss of BTM power availability at one generation station and the availability of BTM power at another generation station. As such, the external electricity distributor 300 may communicate with the generation station control systems to obtain information that can be used to organize and distribute computational operations to the fleets of flexible datacenters.

Figure 7:
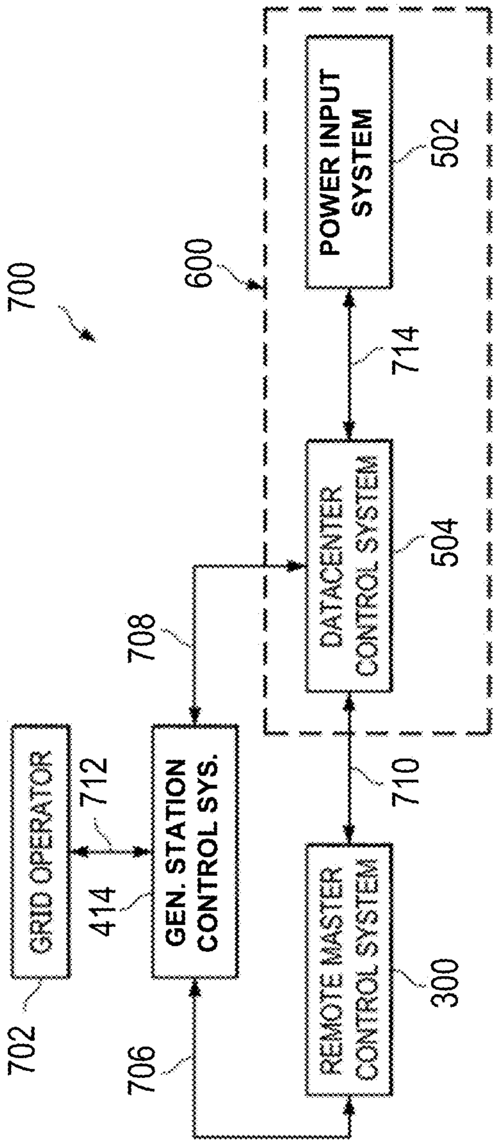
FIG. 7 shows a control distribution system for a flexible datacenter, according to one or more example embodiments.

FIG. 7 shows a control distribution system 700 of the flexible datacenter 500 according to one or more example embodiments. The system 700 includes a grid operator 702, a generation station control system 216, a remote master control system 216 300, which may be the external electricity distributor 262 discussed above, and a flexible datacenter 500. As such, the system 700 represents one example configuration for controlling operations of the flexible datacenter 500, but other configurations may include more or fewer components in other arrangements.

The datacenter control system 216 504 may independently, or cooperatively with one or more of the generation station control system 216 414, the remote master control system 216 300, and the grid operator 702, modulate power at the flexible datacenter 500. During operations, the power delivery to the flexible datacenter 500 may be dynamically adjusted based on conditions or operational directives. The conditions may correspond to economic conditions (e.g., cost for power, aspects of computational operations to be performed), power-related conditions (e.g., availability of the power, the sources offering power), demand response, and/or weather-related conditions, among others.

The generation station control system 216 414 may be one or more computing systems configured to control various aspects of a generation station (not independently illustrated, e.g., 216 or 400). As such, the generation station control system 216 414 may communicate with the remote master control system 216 300 over a networked connection 706 and with the datacenter control system 216 704 over a networked or other data connection 708.

As discussed with respect to FIGS. 2 and 3, the remote master control system 216 300 can be one or more computing systems located offsite, but connected via a network connection 710 to the datacenter control system 216 504. The remote master control system 216 300 may provide supervisory controls or override control of the flexible datacenter 500 or a fleet of flexible datacenters (not shown).

The grid operator 702 may be one or more computing systems that are configured to control various aspects of the power grid (not independently illustrated) that receives power from the generation station. The grid operator 702 may communicate with the generation station control system 216 300 over a networked or other data connection 712.

The datacenter control system 216 504 may monitor BTM power conditions at the generation station and determine when a datacenter ramp-up condition is met. The BTM power availability may include one or more of excess local power generation, excess local power generation that the grid cannot accept, local power generation that is subject to economic curtailment, local power generation that is subject to reliability curtailment, local power generation that is subject to power factor correction, conditions where the cost for power is economically viable (e.g., low cost to obtain power), low priced power, situations where local power generation is prohibitively low, start up situations, transient situations, or testing situations where there is an economic advantage to using locally generated behind-the-meter power generation, specifically power available at little to no cost and with no associated transmission or distribution losses or costs. For example, a datacenter control system 216 may analyze future workload and near term weather conditions at the flexible datacenter.

In some instances, the datacenter ramp-up condition may be met if there is sufficient behind-the-meter power availability and there is no operational directive from the generation station control system 216 414, the remote master control system 216 300, or the grid operator 702 to go offline or reduce power. As such, the datacenter control system 216 504 may enable 714 the power input system 502 to provide power to the power distribution system 506 to power the computing systems 512 or a subset thereof.

The datacenter control system 216 504 may optionally direct one or more computing systems 512 to perform predetermined computational operations (e.g., distributed computing processes). For example, if the one or more computing systems 512 are configured to perform distributed computing operations (e.g., hashing operations), the datacenter control system 216 504 may direct them to perform the distributed computing operations for a specific blockchain application, such as, for example, Bitcoin, Litecoin, or Ethereum. Alternatively, one or more computing systems 512 may be configured to perform high-throughput computing operations and/or high performance computing operations.

The remote master control system 216 300 may specify to the datacenter control system 216 504 what sufficient behind-the-meter power availability constitutes, or the datacenter control system 216 504 may be programmed with a predetermined preference or criteria on which to make the determination independently. For example, in certain circumstances, sufficient behind-the-meter power availability may be less than that required to fully power the entire flexible datacenter 500. In such circumstances, the datacenter control system 216 504 may provide power to only a subset of computing systems, or operate the plurality of computing systems in a lower power mode, that is within the sufficient, but less than full, range of power that is available or to maximize profitability. In addition, the computing systems 512 may adjust operational frequency, such as performing more or less processes during a given duration.

While the flexible datacenter 500 is online and operational, a datacenter ramp-down condition may be met when there is insufficient or anticipated to be insufficient, behind-the-meter power availability or there is an operational directive from the generation station control system 216 414, the remote master control system 216 300, or the grid operator 702. The datacenter control system 216 504 may monitor and determine when there is insufficient, or anticipated to be insufficient, behind-the-meter power availability. As noted above, sufficiency may be specified by the remote master control system 216 300 or the datacenter control system 216 504 may be programmed with a predetermined preference or criteria on which to make the determination independently.

An operational directive may be based on current dispatchability, forward looking forecasts for when behind-the-meter power is, or is expected to be, available, economic considerations, reliability considerations, operational considerations, or the discretion of the generation station control system 216 414, the remote master control system 216 300, or the grid operator 702. For example, the generation station control system 216 414, the remote master control system 216 300, or the grid operator 702 may issue an operational directive to flexible datacenter 500 to go offline and power down. When the datacenter ramp-down condition is met, the datacenter control system 216 504 may disable power delivery to the plurality of computing systems (e.g., 512). The datacenter control system 216 504 may disable 714 the power input system 502 from providing power (e.g., three-phase nominal AC voltage) to the power distribution system 506 to power down the computing systems 512 while the datacenter control system 216 504 remains powered and is capable of returning service to operating mode at the flexible datacenter 500 when behind-the-meter power becomes available again.

While the flexible datacenter 500 is online and operational, changed conditions or an operational directive may cause the datacenter control system 216 504 to modulate power consumption by the flexible datacenter 500. The datacenter control system 216 504 may determine, or the generation station control system 216 414, the remote master control system 216 300, or the grid operator 702 may communicate, that a change in local conditions may result in less power generation, availability, or economic feasibility, than would be necessary to fully power the flexible datacenter 500. In such situations, the datacenter control system 216 504 may take steps to reduce or stop power consumption by the flexible datacenter 500 (other than that required to maintain operation of datacenter control system 216 504).

Alternatively, the generation station control system 216 414, the remote master control system 216 300, or the grid operator 702, may issue an operational directive to reduce power consumption for any reason, the cause of which may be unknown. In response, the datacenter control system 216 504 may dynamically reduce or withdraw power delivery to one or more computing systems 512 to meet the dictate. The datacenter control system 216 504 may controllably provide three-phase nominal AC voltage to a smaller subset of computing systems (e.g., 512) to reduce power consumption. The datacenter control system 216 504 may dynamically reduce the power consumption of one or more computing systems by reducing their operating frequency or forcing them into a lower power mode through a network directive.

One of ordinary skill in the art will recognize that datacenter control system 216 504 may be configured to have a number of different configurations, such as a number or type or kind of the computing systems 512 that may be powered, and in what operating mode, that correspond to a number of different ranges of sufficient and available behind-the-meter power. As such, the datacenter control system 216 504 may modulate power delivery over a variety of ranges of sufficient and available unutilized behind-the-meter power availability.

Advantages of one or more embodiments of the present invention may include one or more of the following:

One or more embodiments of the present invention provides a green solution to two prominent problems: the exponential increase in power required for growing blockchain operations and the unutilized and typically wasted energy generated from renewable energy sources.

One or more embodiments of the present invention allows for the rapid deployment of mobile datacenters to local stations. The mobile datacenters may be deployed on site, near the source of power generation, and receive low cost or unutilized power behind-the-meter when it is available.

One or more embodiments of the present invention provide the use of a queue system to organize computational operations and enable efficient distribution of the computational operations across multiple datacenters.

One or more embodiments of the present invention enable datacenters to access and obtain computational operations organized by a queue system.

One or more embodiments of the present invention allows for the power delivery to the datacenter to be modulated based on conditions or an operational directive received from the local station or the grid operator.

One or more embodiments of the present invention may dynamically adjust power consumption by ramping-up, ramping-down, or adjusting the power consumption of one or more computing systems within the flexible datacenter, based upon changes to an existing award received from a external electricity distributor that controls the amount of power received into the grid from a power generation system that is physically capable to send BTM power to a flexible datacenter.

One or more embodiments of the present invention may be powered by behind-the-meter power that is free from transmission and distribution costs. As such, the flexible datacenter may perform computational operations, such as distributed computing processes, with little to no energy cost.

One or more embodiments of the present invention provides a number of benefits to the hosting local station. The local station may use the flexible datacenter to adjust a load, provide a power factor correction, to offload power, or operate in a manner that invokes a production tax credit and/or generates incremental revenue.

One or more embodiments of the present invention allows for continued shunting of behind-the-meter power into a storage solution when a flexible datacenter cannot fully utilize excess generated behind-the-meter power.

One or more embodiments of the present invention allows for continued use of stored behind-the-meter power when a flexible datacenter can be operational but there is not an excess of generated behind-the-meter power.

One or more embodiments of the present invention allows for management and distribution of computational operations at computing systems across a fleet of datacenters such that the performance of the computational operations take advantages of increased efficiency and decreased costs.

It will also be recognized by the skilled worker that, in addition to improved efficiencies in controlling power delivery from intermittent generation sources, such as wind farms and solar panel arrays, to regulated power grids, the invention provides more economically efficient control and stability of such power grids in the implementation of the technical features as set forth herein.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

For example, the disclosure is exemplified by one or more of the representative paragraphs described below:

Representative Paragraph 1: A method of dynamically updating a reported maximum power consumption for a site with a plurality of computing systems, the method comprising

- determining a low power consumption ("LPC") based at least in part on a minimum power consumption of the plurality of computing systems at the site and a power consumption of supporting equipment, wherein the supporting equipment is co-located at the site and supports operation of the plurality of computing systems;
- determining a full power consumption ("FPC") based at least in part on a power consumption of the plurality of computing systems when operating at full power;
- determining a maximum power consumption ("MPC") comprising at least the sum of the LPC and the FPC;
- reporting the MPC;
- determining that actual power consumption at the site exceeds or will exceed the MPC;
- reducing power consumption of one or more computing systems of the plurality of computing systems based at least in part on maintaining actual power consumption at or below the MPC;
- determining a reduced power consumption ("RPC") amount as a consequence of reducing power consumption of one or more computing systems of the plurality of computing systems;
- determining a modified MPC based at least in part on the RPC; and
- reporting the modified MPC.

Representative Paragraph 2. The method of Representative Paragraph 1, wherein the step of determining the MPC further comprises at least the sum of the LPC, the FPC, and an additional margin.

Representative Paragraph 3. The method of Representative Paragraph 2, where the additional margin is a percentage of the calculated LPC and/or the calculated FPC.

Representative Paragraph 4. The method of any one of Representative Paragraphs 1-3, wherein the site is two or more sites, wherein a first portion of the plurality of computing systems are disposed at a first site and a second portion of the plurality of computing systems are disposed at a second site.

Representative Paragraph 5. The method of Representative Paragraph 4, wherein the two or more sites are disposed a distance away from each other such that one or more environmental factors that may affect the operation of the computing systems disposed within each of the two or more sites may be receiving different environmental factors at a single measured time instance.

Representative Paragraph 6. The method of any one of Representative Paragraphs 1-5, wherein the MPC and the modified MPC are reported via telemetry.

Representative Paragraph 7. The method of any one of Representative Paragraphs 1-6, the LPC is determined based upon identifying a model of each of the plurality of computing systems and a firmware that installed on each of the plurality of computing systems.

Representative Paragraph 8. The method of Representative Paragraph 7, wherein the FPC is determined based upon identifying a model of each of the plurality of computing systems and a firmware that installed on each of the plurality of computing systems.

Representative Paragraph 9. The method of Representative Paragraph 8, wherein the RPC is determined at least in part by monitoring for temperature data at the site and identifying a power consumption that has been saved in an accessible memory, the power consumption being a predetermined correlation between the plurality of computing systems that are operating and temperature proximate to the plurality of computing systems.

Representative Paragraph 10. The method of any one of Representative Paragraphs 1-9, wherein the MPC is reported to a scheduling entity.

Representative Paragraph 11. The method of any one of Representative Paragraphs 1-9, wherein the MPC is reported to a grid operator.

Representative Paragraph 12. The method of any one of Representative Paragraphs 1-9, wherein the MPC is reported to a power generator.

Representative Paragraph 13. The method of any one of Representative Paragraphs 7-12, wherein the site is two or more sites, wherein a first portion of the plurality of computing systems are disposed at a first site and a second portion of the plurality of computing systems are disposed at a second site.

Representative Paragraph 14. A method of dynamically updating a reported maximum power consumption for a site with a plurality of computing systems, the method comprising

- determining a temperature profile for a future time period, wherein the temperature profile comprise at least a first temperature during a first time interval in the future time period and a second temperature during a second time interval in the future time period
- determining a low power consumption ("LPC") for the first time interval and the second time interval, wherein determining the LPC is based at least in part on a minimum power consumption of the plurality of computing systems at the site and a power consumption of supporting equipment, wherein the supporting equipment is co-located at the site and supports operation of the plurality of computing systems;
- determining a full power consumption ("FPC") for the first time interval and the second time interval based at least in part on a power consumption of the plurality of computing systems when operating at full power and further based at least in part on the respective first temperature and second temperature for each time interval;
- determining a maximum power consumption ("MPC") for the first time interval and the second time interval comprising at least the sum of the LPC and the FPC for each respective time interval; and reporting the MPC for each of the first and second time intervals via a telemetry system prior to the respective time interval.

Representative Paragraph 15. The method of Representative Paragraph 14, wherein determining the FPC for the first time interval and the second time interval based at least in part on the power consumption of the plurality of computing systems when operating at full power and further based at least in part on the respective first temperature and second temperature for each time interval comprises determining identifying information of at least one computing system of the plurality of computing systems, determining power consumption data for at least one computing systems based at least in part on stored power consumption correlation information for the at least one computing system correlated with temperature data.

Representative Paragraph 16. The method of Representative Paragraph 14, wherein determining the FPC for the first time interval and the second time interval based at least in part on the power consumption of the plurality of computing systems when operating at full power and further based at least in part on the respective first temperature and second temperature for each time interval comprises determining identifying information of each computing system of the plurality of computing systems, determining power consumption data for each computing systems based at least in part on stored power consumption correlation information for the at least one computing system correlated with temperature data.

Representative Paragraph 17. A method of dynamically updating a reported maximum power consumption for a site with a plurality of computing systems, the method comprising

- determining a low power consumption ("LPC") based at least in part on a minimum power consumption of the plurality of computing systems at the site and a power consumption of supporting equipment, wherein the supporting equipment is co-located at the site and supports operation of the plurality of computing systems;
- determining a full power consumption ("FPC") based at least in part on a power consumption of the plurality of computing systems when operating at full power;
- determining a maximum power consumption ("MPC") comprising at least the sum of the LPC and the FPC;
- reporting the MPC via a telemetry system;
- determining power consumption for a time period at the site cannot achieve the MPC;
- determining a modified MPC; and
- reporting the modified MPC via the telemetry system.

Representative Paragraph 18. The method of Representative Paragraph 17, wherein the time period comprises a current time period.

Representative Paragraph 19. The method of Representative Paragraph 17, wherein the time period is a future time period.

Representative Paragraph 20. The method of any one of Representative Paragraphs 17-19, wherein determining actual power consumption at the site cannot achieve the MPC for a time period comprises determining power consumption at the site cannot achieve the MPC based at least in part on determined temperature data at the site.

Representative Paragraph 21. The method of Representative Paragraph 20, wherein determining a modified MPC comprises determining the status of at least one computing system of the plurality of computing systems and determining power consumption data for the at least one computing system based at least in part on stored power consumption information for the at least one computing system based upon the determined temperature data at the site.

Representative Paragraph 22. The method of Representative Paragraph 21, wherein the modified MPC is determined by determining the status of each of the at least one computing systems of the plurality of computing systems and determining power consumption data for all of the computing systems based at least in part on stored power consumption information for each of the plurality of computing systems based upon the determined temperature data at the site.

Representative Paragraph 23. The method of Representative Paragraph 20, wherein determining a modified MPC comprises determining identifying information of at least one computing system of the plurality of computing systems, determining power consumption data for the at least one computing system based at least in part on stored power consumption information for the at least one computing system correlated with temperature data.

Representative Paragraph 24. A method of dynamically updating a reported maximum power consumption for a site with a plurality of computing systems, the method comprising determining an initial maximum power consumption ("MPC") for the site based at least in part on a power consumption of the plurality of computing systems each operating at full power at a respective steady state temperature;

reporting the initial MPC;

operating the plurality of computing systems at full power at the steady state temperature;

actively reducing power consumption of one or more computing systems of the plurality of computing systems;

determining a reduced MPC based at least in part on the reduced power consumption of the one or more computing systems and reporting the reduced MPC;

actively increasing power consumption of the one or more computing systems;

determining an intermediate MPC based at least in part on the increased power consumption of the one or more computing systems and reporting the intermediate MPC; and determining a new steady-state MPC based at least in part on a passive increased power consumption of the one or more computing systems and reporting the new steady-state MPC.

Representative Paragraph 25. The method of Representative Paragraph 24, wherein actively reducing power consumption of one or more computing systems of the plurality of computing systems comprises actively reducing power consumption of one or more computing systems of the plurality of computing systems in response to monitoring changes of a frequency of electrical power on a power grid.

Representative Paragraph 26. The method of Representative Paragraph 24, wherein actively reducing power consumption of one or more computing systems of the plurality of computing systems comprises actively reducing power consumption of one or more computing systems of the plurality of computing systems in response to monitoring changes of a frequency of electrical power from a power generator.

Representative Paragraph 27. The method of Representative Paragraph 24, wherein actively reducing power consumption of one or more computing systems of the plurality of computing systems comprises actively reducing power consumption of one or more computing systems of the plurality of computing systems in response to an operational directive from a grid operator.

Representative Paragraph 28. The method of Representative Paragraph 24, wherein actively reducing power consumption of one or more computing systems of the plurality of computing systems comprises actively reducing power consumption of one or more computing systems of the plurality of computing systems in response to an operational directive from a scheduling entity.

Representative Paragraph 29. The method of Representative Paragraph 24, wherein actively reducing power consumption of one or more computing systems of the plurality of computing systems comprises actively reducing power consumption of one or more computing systems of the plurality of computing systems in response to an operational directive from a power generator.

Representative Paragraph 30. The method of any one of Representative Paragraphs 24-29, wherein determining the intermediate MPC based at least in part on the increased power consumption of the one or more computing systems comprises reducing the initial MPC by a fixed amount.

Representative Paragraph 31. The method of Representative Paragraph 30, wherein the fixed amount is based at least in part on temperature data.

Representative Paragraph 32. The method of any one of Representative Paragraphs 24-31, wherein the passive increased power consumption is correlated with an increase in operating temperature of the each of the one or more computing systems.

Representative Paragraph 33. The method of any one of Representative Paragraphs 24-32, wherein the new steady-state MPC is the same as the initial MPC.

Representative Paragraph 34. The method of any one of Representative Paragraphs 24-33, wherein the step of actively reducing power consumption of one or more computing systems of the plurality of computing systems comprises discontinuing operating one or more of the plurality of computing systems and causing the discontinued operating one or more of the plurality of computing systems to shut down.

Representative Paragraph 35. The method of any one of Representative Paragraphs 24-34, wherein the step of actively reducing power consumption of one or more computing systems of the plurality of computing systems comprises causing operating one or more of the plurality of computing systems to transfer to an idle state where the one or more computing system is not assigned any calculational tasks.

Representative Paragraph 36. The method of any one of Representative Paragraphs 24-35, wherein the site is two or more sites, wherein a first portion of the plurality of computing systems are disposed at a first site and a second portion of the plurality of computing systems are disposed at a second site.

Representative Paragraph 37. The method of any one of Representative Paragraphs 24-36, the MPC is determined based upon identifying a model of each of the plurality of computing systems and a firmware that installed on each of the plurality of computing systems.

What is claimed is:

1. A method of dynamically updating a reported maximum power consumption for a site with a plurality of computing systems, the method comprising determining a low power consumption ("LPC") based at least in part on a minimum power consumption of the plurality of computing systems at the site and a power consumption of supporting equipment, wherein the supporting equipment is co-located at the site and supports operation of the plurality of computing systems;

determining a full power consumption ("FPC") based at least in part on a power consumption of the plurality of computing systems when operating at full power;

determining a maximum power consumption ("MPC") comprising at least the sum of the LPC and the FPC;

reporting the MPC;

determining that actual power consumption at the site exceeds or will exceed the MPC;

reducing power consumption of one or more computing systems of the plurality of computing systems based at least in part on maintaining actual power consumption at or below the MPC;

determining a reduced power consumption ("RPC") amount as a consequence of reducing power consumption of the one or more computing systems of the plurality of computing systems;

determining a modified MPC based at least in part on the RPC; and reporting the modified MPC.

2. The method of claim 1, wherein the step of determining the MPC further comprises at least the sum of the LPC, the FPC, and an additional margin.

3. The method of claim 2, where the additional margin is a percentage of the LPC and/or the FPC.

4. The method of claim 1, wherein the site is two or more sites, wherein a first portion of the plurality of computing systems are disposed at a first site and a second portion of the plurality of computing systems are disposed at a second site.

5. The method of claim 4, wherein the two or more sites are disposed a distance away from each other such that one or more environmental factors that may affect the operation of the computing systems disposed within each of the two or more sites may be receiving different environmental factors at a single measured time instance.

6. The method of claim 1, wherein the MPC and the modified MPC are reported via telemetry.

7. The method of claim 1, the LPC is determined based upon identifying a model of each of the plurality of computing systems and a firmware that is installed on each of the plurality of computing systems.

8. The method of claim 7, wherein the FPC is determined based upon the identified model of each of the plurality of computing systems and the firmware that is installed on each of the plurality of computing systems.

9. The method of claim 8, wherein the RPC is determined at least in part by monitoring for temperature data at the site and identifying a power consumption that has been saved in an accessible memory, the power consumption being a predetermined correlation between the plurality of computing systems that are operating and temperature proximate to the plurality of computing systems.

10. The method of claim 1, wherein the MPC is reported to a scheduling entity.

11. The method of claim 1, wherein the MPC is reported to a grid operator.

12. The method of claim 1, wherein the MPC is reported to a power generator.

* * * * *